US011180068B2

(12) United States Patent
Eichstedt et al.

(10) Patent No.: US 11,180,068 B2
(45) Date of Patent: Nov. 23, 2021

(54) VEHICLE CONVEYOR SYSTEM

(71) Applicant: Spartan Motors, Inc., Charlotte, MI (US)

(72) Inventors: Richard D. Eichstedt, Walkerton, IN (US); Spencer O. South, Mishawaka, IN (US); Glen R. Helmuth, Bourbon, IN (US)

(73) Assignee: The Shyft Group, Inc., Charlotte, MI (US)

( * ) Notice: Subject to any disclaimer, the term of this patent is extended or adjusted under 35 U.S.C. 154(b) by 0 days.

(21) Appl. No.: 16/718,426

(22) Filed: Dec. 18, 2019

(65) Prior Publication Data
US 2020/0198515 A1 Jun. 25, 2020

Related U.S. Application Data

(60) Provisional application No. 62/781,916, filed on Dec. 19, 2018.

(51) Int. Cl.
| *B60P 1/52* | (2006.01) |
| *B65G 67/20* | (2006.01) |
| *B60P 1/43* | (2006.01) |
| *B62D 33/04* | (2006.01) |

(52) U.S. Cl.
CPC .................... *B60P 1/52* (2013.01); *B60P 1/43* (2013.01); *B62D 33/04* (2013.01); *B65G 67/20* (2013.01)

(58) Field of Classification Search
CPC .... B60P 1/436; B60P 1/43; B60P 1/52; B65G 67/20
See application file for complete search history.

(56) References Cited

U.S. PATENT DOCUMENTS

| 2,904,196 | A | * | 9/1959 | Teixeira | B60P 1/52 414/534 |
| 3,406,849 | A | * | 10/1968 | Edwin | B60P 1/52 414/523 |
| 3,575,309 | A | * | 4/1971 | Peterson | B60P 1/4421 414/503 |
| 3,712,495 | A | * | 1/1973 | Carder | B64F 1/22 414/503 |
| 6,347,604 | B1 | * | 2/2002 | Lapere | A01K 45/005 119/843 |
| 6,655,897 | B1 | * | 12/2003 | Harwell | B60P 1/436 414/498 |
| 10,099,596 | B1 | * | 10/2018 | Biagi | B62D 53/062 |
| 10,434,923 | B2 | * | 10/2019 | Baker | E05D 5/0207 |
| 10,934,093 | B2 | * | 3/2021 | Gil | B60P 3/007 |
| 2002/0187021 | A1 | * | 12/2002 | Drost | B60P 1/43 414/111 |
| 2018/0334071 | A1 | * | 11/2018 | Stojkovic | B60P 1/43 |

* cited by examiner

*Primary Examiner* — Jonathan Snelting
(74) *Attorney, Agent, or Firm* — Barnes & Thornburg LLP

(57) ABSTRACT

An illustrative embodiment of a vehicle having a cargo area and a cab area is provided, wherein the cargo area may include a conveyor assembly. The conveyor assembly may include a conveyor assembly section and a pivotable conveyor assembly section. The conveyor assembly section includes at least one conveyor shelf panel which includes a support surface. The pivotable conveyor assembly section may include a bracket that supports a pivotable conveyor panel.

18 Claims, 61 Drawing Sheets

VEHICLE CONVEYOR SYSTEM

RELATED APPLICATION

The present disclosure relates to and claims priority to U.S. Provisional Patent Application, Ser. No. 62/781,916, filed on Dec. 19, 2018. The subject matter disclosed in that Provisional Application is hereby expressly incorporated into the present application.

TECHNICAL FIELD AND SUMMARY

The present disclosure relates to cargo and delivery vehicles. More particularly, the present disclosure relates to a conveyor assembly located in the cargo area of such vehicles. The conveyor assembly may be extendable to the exterior of the vehicle and may be movable with respect to shelving or other structures within the cargo area.

Cargo and delivery vehicles typically include forward cab and rearward cargo area sections. A typical cargo area may be sized and dimensioned to hold packages, supplies, uniforms, etc., for transport, delivery, and/or pickup. Such vehicles are commonly used by companies such as UPS, FedEx, DHL, USPS, Cintas, Aramark, G&K Services, and UniFirst, for example.

Typically, the cargo areas of such vehicles are relatively sizable, having room to fit many packages or other articles. When doing so, time may be a factor. This means the time it takes to load or unload such a vehicle can be an important metric. Accordingly, any time-saving mechanisms for loading and unloading the cargo area of these vehicles can be advantageous.

An illustrative embodiment of the present disclosure provides a vehicle having a cargo area and a cab area, wherein the cargo area includes a conveyor assembly. The conveyor assembly comprises: a conveyor assembly section and a pivotable conveyor assembly section. The conveyor assembly section includes: a plurality of conveyor shelf panels each of which includes a support surface, wherein the support surface includes a plurality of roller bearing assemblies supported by a frame, wherein the frame is supported by at least one first slideout assembly which includes at least one movable bar that moves with respect to the cargo area between a first use position and a first stowed position; wherein the each of the plurality of conveyor shelf panels are independently movable with respect to each other; and wherein at least one of the plurality of conveyor shelf panels is movable adjacent to the pivotable conveyor assembly section. The pivotable conveyor assembly section includes: a bracket having at least a top surface and side surface, wherein the top surface of the bracket supports a pivotable conveyor panel, and the side surface is attached to at least one second slideout assembly which includes at least one movable bar that moves with respect to the cargo area between the first use position and the first stowed position; a bearing member attached to a rod which is attached to the bracket, wherein the bearing member is movable along a floor of the cargo area, and wherein the bearing member and rod supports the bracket; wherein the pivotable conveyor panel is pivotable with respect to the bracket to move the pivotable conveyor panel between a second use position and a second stowed position, wherein the second use position locates at least a portion of the pivotable conveyor panel exterior of the cargo area and the second stowed position locates the pivotable conveyor panel interior of the cargo area; a ramp that is pivotally attached and linearly slidable, relative to the pivotable conveyor panel; at least one piston assembly attached to the pivotable conveyor panel at a first end and the bracket at a second end, wherein the at least one piston assembly limits a velocity at which the pivotable conveyor panel moves to the second use position; and a support member that includes at least one extension bar that is pivotally attached to the pivotable conveyor panel and is selectively engageable with a portion of the cargo area to support the pivotable conveyor panel when located in the second use position.

In the above and other illustrative embodiments, the vehicle may further comprise: the at least one first slideout assembly includes at least a second bar telescopingly engageable with the at least one movable bar that moves with respect to the cargo area between the first use position and the first stowed position; each of the plurality of roller bearing assemblies includes an axle supported by the frame and a plurality of roller bearings supported on the axle; each of the plurality of roller bearing assemblies include at least one axle supported at each end by at least one roller bracket, wherein the at least one roller bracket is supported by the one of the plurality of conveyor shelf panels, and wherein at least one roller bearing is supported by the axle; the at least one roller bracket is attached to an underside of the support surface, wherein the at least one roller bracket supports the axle at the underside of the support surface, wherein the support surface includes an opening disposed therethrough, and wherein at least a portion of the at least one roller bearing supported by the axle extends through the opening to a topside of the support surface opposite the underside of the support surface; the each of the plurality of conveyor shelf panels are independently movable adjacent a wall of the cargo area to the first stowed position and away from the wall of the cargo area to the first use position; the pivotable conveyor panel is pivotable with respect to the bracket to move the pivotable conveyor panel between the second use position that forms a linear pathway with at least one of the plurality of conveyor shelf panels, and the second stowed position that orients the pivotable conveyor panel transverse to the at least one of the plurality of conveyor shelf panels and no longer locates any portion of the pivotable conveyor panel exterior of the cargo area; the bracket is movable adjacent a wall of the cargo area to the first stowed position and away from the wall of the cargo area to the first use position; the bearing member attached to the rod is selected from the group consisting of at least one of a castor, a wheel, and a bearing surface; a ramp extender having a surface located adjacent the ramp and movable relative to the ramp; the ramp includes at least one sidewall that includes a slot sized to fit at least one fastener that selectively loosens and tightens to allow the ramp extender to move or hold with respect to the ramp; the ramp extender further comprises at least one magnet to selectively hold the ramp extender to a structure spaced apart from the cargo area; the support member includes a plurality of extension bars that are pivotally attached to the pivotable conveyor panel and are selectively engageable with a portion of the cargo area to support the pivotable conveyor panel when located in the second use position; and the pivotable conveyor panel is pivotable with respect to the bracket to move the pivotable conveyor panel to the second use position that forms a linear pathway with at least one of the plurality of conveyor shelf panels when the at least one of the plurality of conveyor shelf panels is located in its first use position.

Another illustrative embodiment of the present disclosure provides a vehicle having a cargo area and a cab area, wherein the cargo area includes a conveyor assembly. The conveyor assembly comprises a conveyor assembly section and a pivotable conveyor assembly section. The conveyor assembly section includes: at least one conveyor shelf panel which includes a support surface, wherein the support surface is supported by at least one movable bar that moves with respect to the cargo area between a first use position and a first stowed position; and wherein the at least one conveyor shelf panel is movable adjacent to the pivotable conveyor assembly section. The pivotable conveyor assembly section includes, a bracket that supports a pivotable conveyor panel; and a second at least one movable bar that moves the bracket with respect to the cargo area between the first use position and the first stowed position.

In the above and other illustrative embodiments, the vehicle may further include: a bearing member attached to a rod which is attached to the bracket, wherein the bearing member is movable along a floor of the cargo area, and wherein the bearing member and rod supports the bracket; the pivotable conveyor panel is pivotable with respect to the bracket to move the pivotable conveyor panel between a second use position and a second stowed position, wherein the second use position locates at least a portion of the pivotable conveyor panel exterior of the cargo area and the second stowed position locates the pivotable conveyor panel interior of the cargo area; a ramp that is pivotally attached and linearly slidable, relative to the pivotable conveyor panel; and at least one piston assembly attached to the pivotable conveyor panel at a first end and the bracket at a second end, wherein the at least one piston assembly limits a velocity at which the pivotable conveyor panel moves to the second use position.

Another illustrative embodiment of the present disclosure provides a vehicle having a cargo area and a cab area, wherein the cargo area includes a conveyor assembly. A conveyor assembly section that includes: a plurality of conveyor shelf panels, each of which include a support surface, wherein the support surface includes a plurality of roller bearing assemblies supported by a frame, wherein the frame is supported by at least one first slideout assembly which includes at least one movable bar that moves with respect to the cargo area between a first use position and a first stowed position.

Another illustrative embodiment of the present disclosure provides a vehicle having a cargo area and a cab area, wherein the cargo area includes a conveyor assembly. The conveyor assembly comprises a pivotable conveyor assembly section that includes: a bracket having at least a top surface and side surface, wherein the top surface of the bracket supports a pivotable conveyor panel, and the side surface is attached to at least one second slideout assembly which includes at least one movable bar that moves with respect to the cargo area between a first use position and a first stowed position; and a bearing member attached to a rod which is attached to the bracket, wherein the bearing member is movable along a floor of the cargo area, and wherein the bearing member and rod supports the bracket. The pivotable conveyor panel is pivotable with respect to the bracket to move the pivotable conveyor panel between a second use position and a second stowed position. The second use position locates at least a portion of the pivotable conveyor panel exterior of the cargo area and the second stowed position locates the pivotable conveyor panel interior of the cargo area.

Additional features and advantages of the vehicle conveyor system assembly will become apparent to those skilled in the art upon consideration of the following detailed descriptions of carrying out the vehicle conveyor system assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
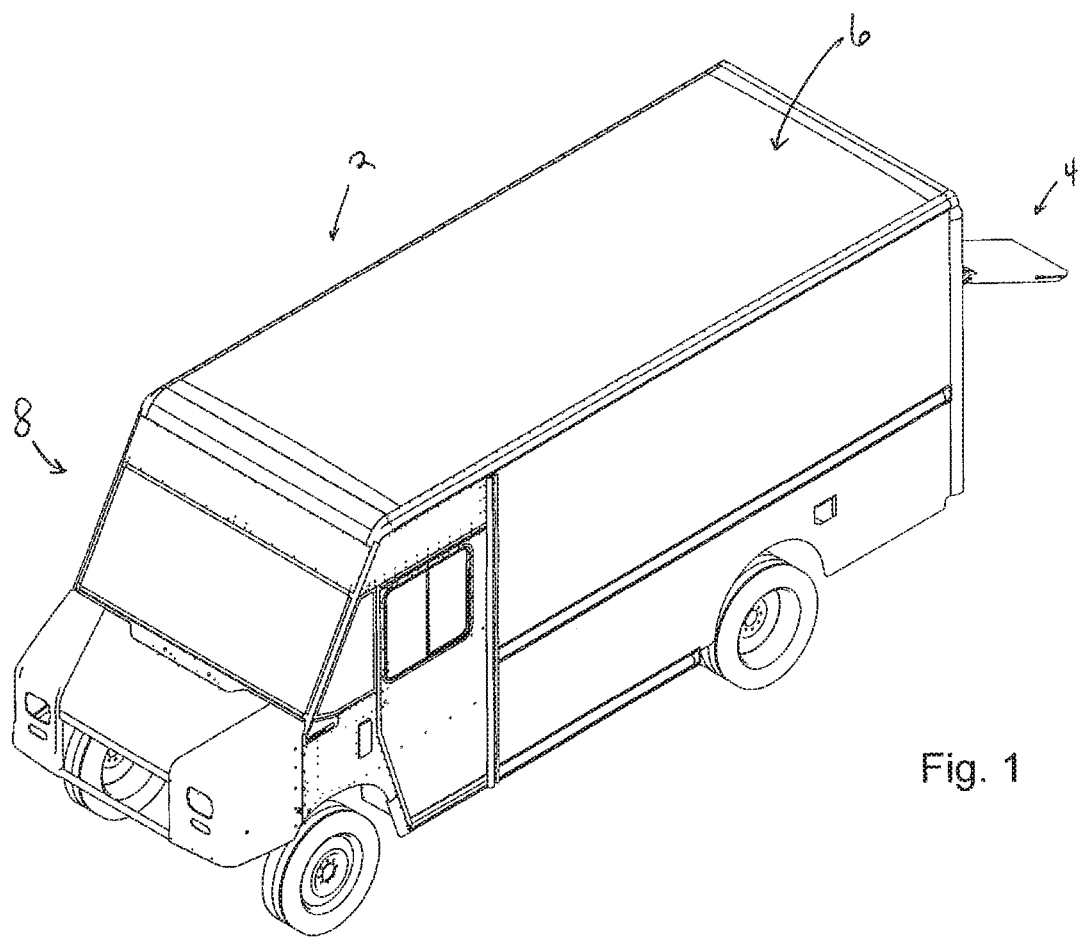
FIG. 1 is a front perspective view of a delivery/cargo vehicle.

Corresponding reference characters indicate corresponding parts throughout the several views. The exemplification set out herein illustrates embodiments of the vehicle conveyor system assembly, and such exemplification is not to be construed as limiting the scope of the vehicle conveyor system assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a conveyor assembly located in and supported by the cargo area of the vehicle. The conveyor assembly may include a longitudinally extending surface made up of rollers or other bearing surfaces or mechanisms that assist in making articles such as packages that are set on the surface to easily move along that surface through the cargo area and out of the vehicle under minimum manual effort or even automated force. In certain embodiments, the conveyor surface may be made of materials and structures that are known to those skilled in the art of conveyor systems. This allows the parcels or other articles contained in the cargo area of the vehicle to be set on a conveyor and moved out of same relatively quickly. It will be appreciated by the skilled artisan upon reading this disclosure how such a system may save time and effort moving articles into or out of the cargo area of the vehicle.

In an illustrative embodiment, the conveyor assembly is both located and contained in the cargo area of the vehicle. This means the conveyor assembly travels with the vehicle and can be used for any myriad of purposes and in locales that may not have its own conveyor system. This may expand the vehicle's usefulness. Furthermore, by having the conveyor assembly secured in the cargo area at all times means that other uses and efficiencies may exist.

Another illustrative embodiment of the present disclosure provides a conveyor assembly that is movably attached to and within the cargo area of the vehicle. Here, the conveyor assembly may be movable between stowed and use positions inside the cargo area of the vehicle. Illustratively, at least portions of the conveyor assembly may be movably attached to shelving or other like structures within the cargo area. A portion of the conveyor assembly may be slidable underneath the shelves in the cargo area to a stowed position. This keeps the conveyor assembly out of the way when not needed. Conversely, portions of the conveyor assembly may be moved relative to the shelves to a use position. In an embodiment, portions of the conveyor assembly may be attached to sliders that move the conveyors between stowed and use positions similar to a cabinet drawer. Another portion of the conveyor may be movably attached within the cargo area such that it can be positioned in a stowed position inside the vehicle and then moved to a use position that allows it to partially extend exterior of the cargo area of the vehicle. In an embodiment, this portion of the conveyor assembly may be attached to both sliders and a pivot mechanism. The sliders allow this portion of the conveyor assembly to align with the other portions of the conveyor assembly when in the use position and be pivoted along an axis illustratively perpendicular to the longitudinal extent of the conveyor assembly. This allows for this portion of the conveyor assembly to be both slid and pivoted between stowed and use positions. The effect of all of this is an on-board conveyor assembly in the cargo area of the vehicle that may be selectively used or stowed within the cargo area of the vehicle. In addition, a stowable ramp may be used on the conveyor assembly to provide a surface between the conveyor assembly and some other structure exterior of the vehicle.

A front perspective view of vehicle 2, with conveyor assembly 4 extending from the rear of cargo area 6, adjacent cab section 8 of vehicle 2, is shown in FIG. 1. It is appreciated that vehicle 2 may be a delivery or cargo vehicle—either of which may be configured to receive and transport parcels, uniforms, tools, parts, or any other articles needing transport. As shown herein, a portion of conveyor assembly 4 may extend outside of vehicle 2 in order to assist moving those articles either out of or into cargo area 6. The exterior of vehicle 2 means that this portion of conveyor assembly 4 may engage, link, abut, or be positioned adjacent some other structure, such as additional conveyors, storage containers, other transport means, etc., to conduct the transfer. It is appreciated with such an assembly being part of vehicle 2, transfer between the vehicle and exterior thereof may be made more efficient.

Figure 2:
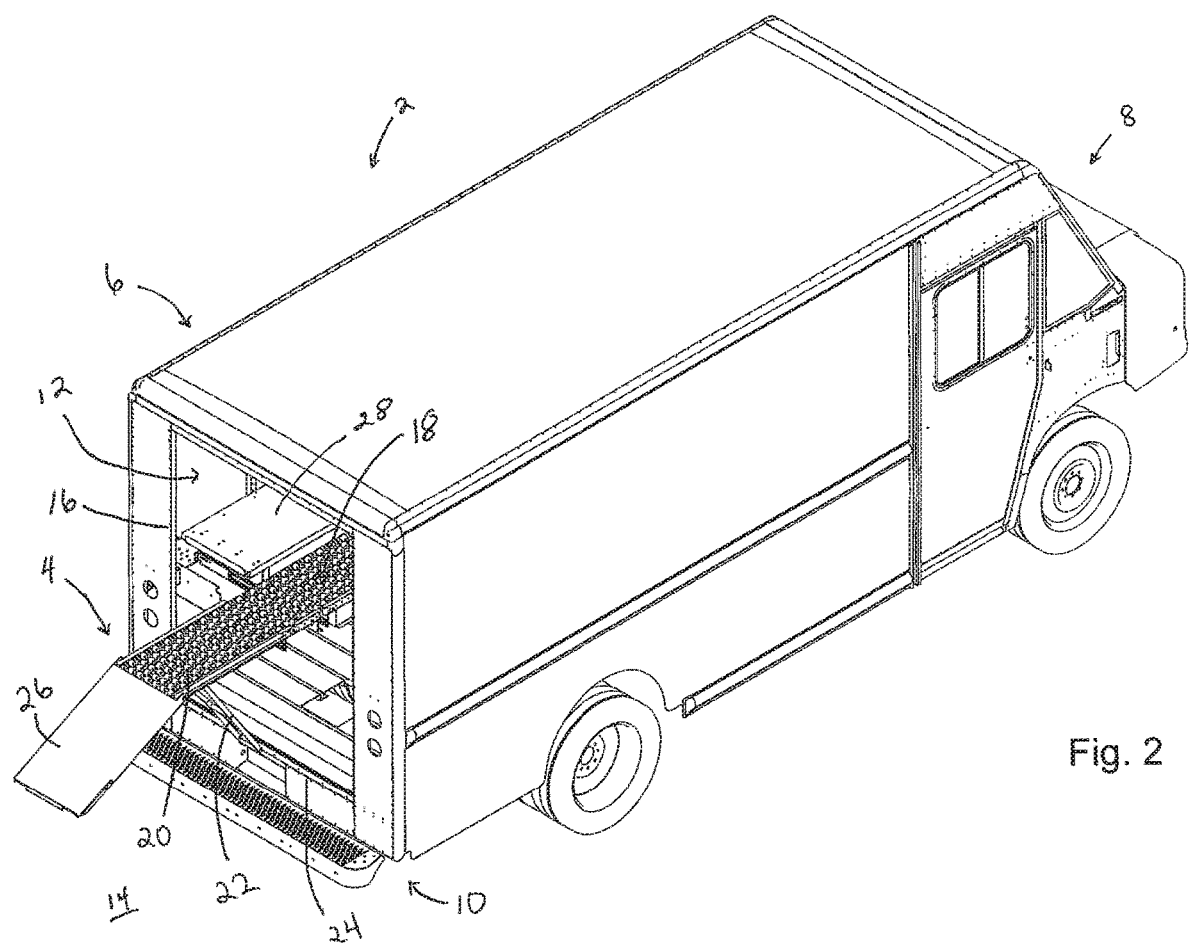
FIG. 2 is a rear perspective view of the delivery/cargo vehicle showing a conveyor assembly extending from the rear of the cargo area.

A rear perspective view of vehicle 2, showing conveyor assembly 4 extending from rear 10 of cargo area 6, is shown in FIG. 2. This view depicts how conveyor assembly 4 extends from interior 12 of cargo area 6 to exterior 14. This allows articles to be moved into and out of cargo area 6. Conveyor assembly 4 extends through opening 16 at rear 10 of cargo area 6. As shown, a conveyor section 18 is located within interior 12 of cargo area 6. It is located adjacent to and aligned with pivoting conveyor section 20 that extends from interior 12 to exterior 14 of cargo area 6. As shown, an illustrative support 22 engages both pivoting conveyor section 20 and rear tail section 24 in order to provide support to pivoting conveyor section 20 when large or heavy articles are resting thereon. Also shown in this view is ramp 26 extending from pivoting conveyor section 20 at exterior 14 from cargo area 6. Illustratively, ramp 26 may be pivotable with respect to pivoting conveyor section 20 so that conveyor assembly 4 may provide a surface to an exterior structure that may be at a different height from that of conveyor assembly 4. Additionally, ramp 26 may be slid or otherwise moved on to pivoting conveyor section 20 (see, also, FIGS. 19 and 20) so conveyor assembly 4 may be more easily stowed in limited space.

Figure 3:
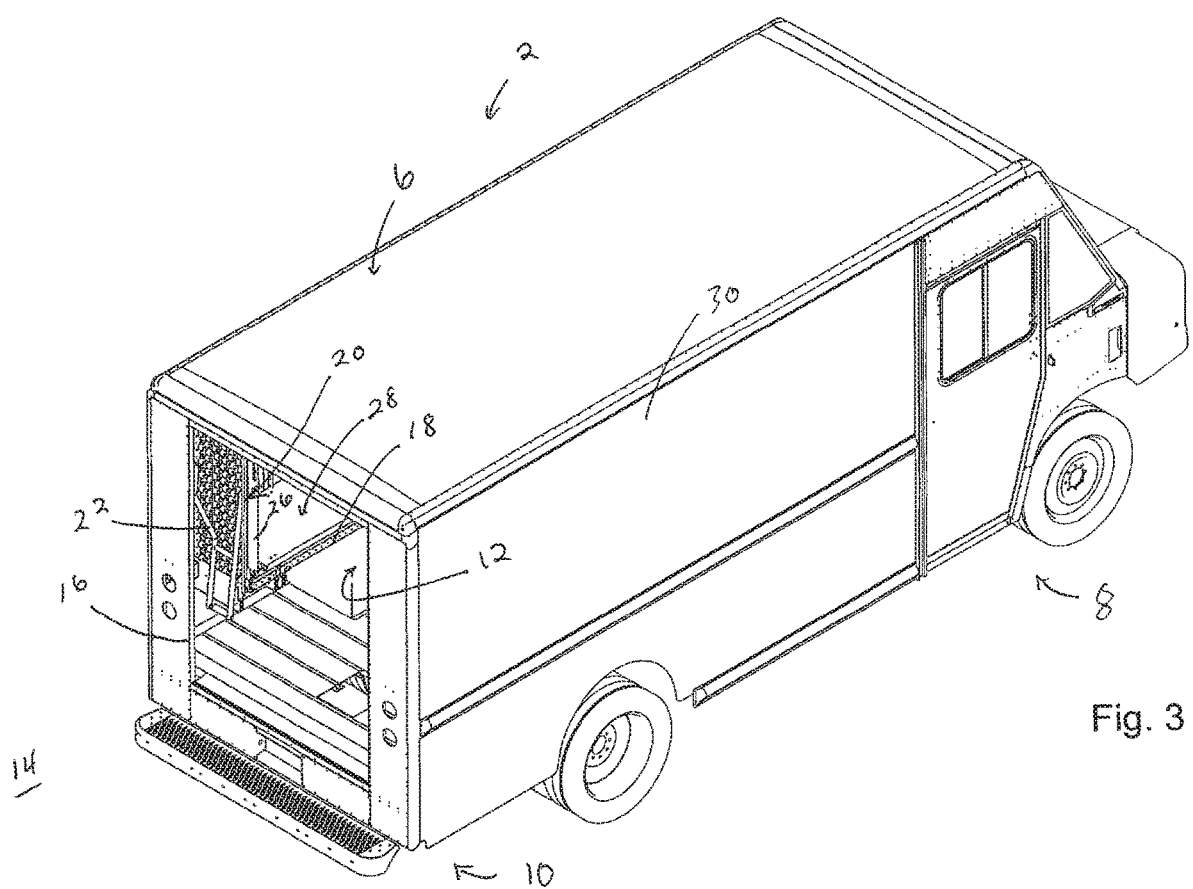
FIG. 3 is another rear perspective view of the vehicle showing the conveyor section pivoted to its folded stowed position.

To that end, another rear perspective view of vehicle 2 is shown in FIG. 3. This view depicts pivoting conveyor section 20 in the folded stowed position within interior 12 of cargo area 6. As shown, pivoting conveyor section 20 is illustratively folded upward from its original use position (see, also, FIG. 2) and support 22 folded therein. Also, ramp 26 may be moved onto pivoting conveyor section 20, as shown herein and in FIG. 20. It is appreciated from this view how pivoting conveyor section 20 of conveyor assembly 4 may be moved and stowed on board vehicle 2 in cargo area 6 in such a way as not to interfere with the operation or use of cargo area 6. In addition, conveyor section 18, as well as other conveyor sections, may be moved illustratively, underneath shelf panel 28 to a stowed position as well. Again, it is appreciated that by moving conveyor assembly 4 to a stowed position, it is out of the way so as to allow normal operation and use of cargo area 6. It is still further appreciated that, when in its stowed position, conveyor assembly 4 is located within interior 12 of cargo area 6. As this embodiment shows, even pivoting conveyor section 20, while in its stowed position, does not extend to exterior 14 rear of vehicle 2. The skilled artisan upon reading the present disclosure will appreciate that conveyor assembly 4 is illustratively shown oriented to move articles to and through rear 10, but can be configured as needed to extend in any direction within interior 12 of cargo area 6. For example, an embodiment of conveyor assembly 4 may extend perpendicular to the length of cargo area 6 and extend out through sidewall 30 of cargo area 6. It is for explanatory purposes that conveyor assembly 4 is shown oriented to exit opening 16 at rear 10 of cargo area 6.

Figure 4:
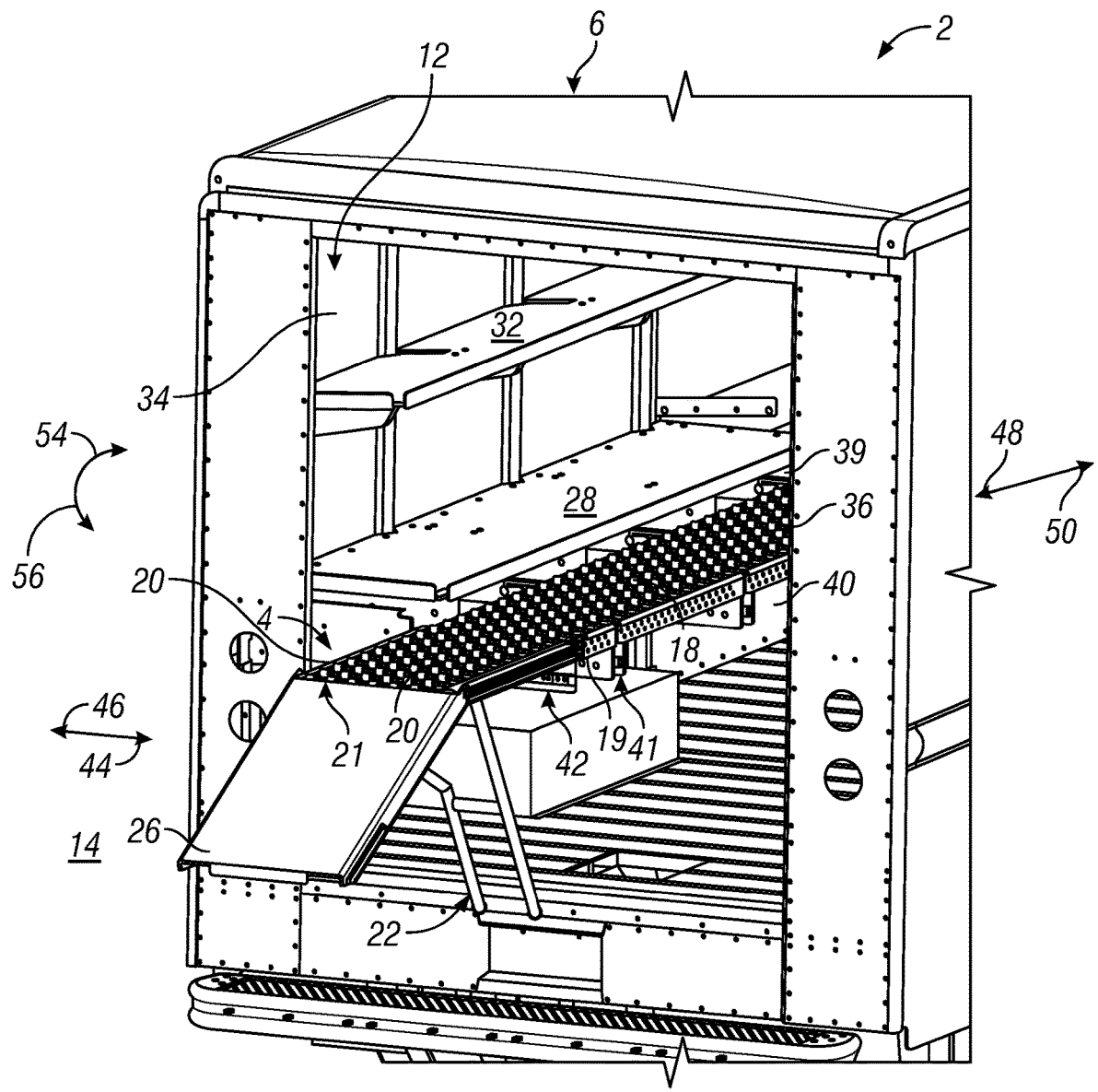
FIG. 4 is a rear partially cut away perspective view of the cargo area portion of the delivery/cargo vehicle.

A rear, partially cut away, perspective view of the cargo area 6 portion of vehicle 2 is shown in FIG. 4. This view further illustrates how conveyor assembly 4 is fitted into interior 12 of cargo area 6. As shown, shelf panels 28 and 32 are spaced apart on sidewall 34 of cargo area 6. Such shelving is illustrative and typical for such cargo or delivery vehicles. Parcels and other articles may be stacked on these shelves for delivery and/or transport. Conveyor assembly 4 is illustratively positioned just under shelf panel 28, for example, so that articles may be moved along illustrative pivoting conveyor section 20, conveyor section 18, and conveyor section 36, as shown. Having conveyor assembly 4 positioned within interior 12 allows articles to be easily slid along conveyor assembly 4, either to place onto shelf panel 28 or 32, or to be removed from shelf panels 28 or 32 and slid out of cargo area 6.

In addition to the advantages of having conveyor assembly 4 located in proximity of shelf panels 28 or 32, conveyor assembly 4 may also include slideout assemblies 38 (see, also, FIG. 5) and 40, as well as a pivoting slideout assembly 42. These slideout assemblies are configured to laterally move conveyor sections 20, 18, 36 in either direction 44 or 46 to stowed or use positions, respectively. In operation, slideout assemblies 38, 40, and 42 slide respective conveyor sections 20, 18, 36 similar to sliding cabinet drawers, into and out from, in this case, shelf panel 28. Sliding conveyor assembly 4 in direction 44 moves same underneath shelf panel 28 to a stowed position, out of the way in interior 12 of cargo area 6. This stowed position means conveyor assembly 4 does not occupy significant space within cargo area 6, which allows the area of that space to be used as normal. Conversely, conveyor assembly 4 may be pulled out in direction 46 to its use position as shown in FIG. 4, which allows articles to be moved along same in directions 48 and 50, so the articles may be either loaded onto or removed from cargo area 6.

Pivoting conveyor section 20 further includes extension section 19, which is an illustrative non-pivoting conveyor section that is also in line with conveyor section 18. Extension section 19 is a short section of illustratively non-pivoting conveyors that may fill in the distance between the last sidewall gusset and the rear structure. As shown, pivoting conveyor section 20 is pivotable with respect to extension section 19 (see FIG. 5). Extension section 19, with pivoting conveyor section 20, is movable in directions 44 and 46 via slideout assembly 41 and pivoting slideout assembly 42. Illustrative support 22 is pivotally mounted on pivoting conveyor section 20 and selectively engages rear tail section 24 in order to provide support to pivoting conveyor section 20. In particular, support 22 holds end 21 of pivoting conveyor section 20 upright to exterior 14 of cargo area 6. Ramp 26 extends from pivoting conveyor section 20 and also exterior 14 from cargo area 6.

Figure 5:
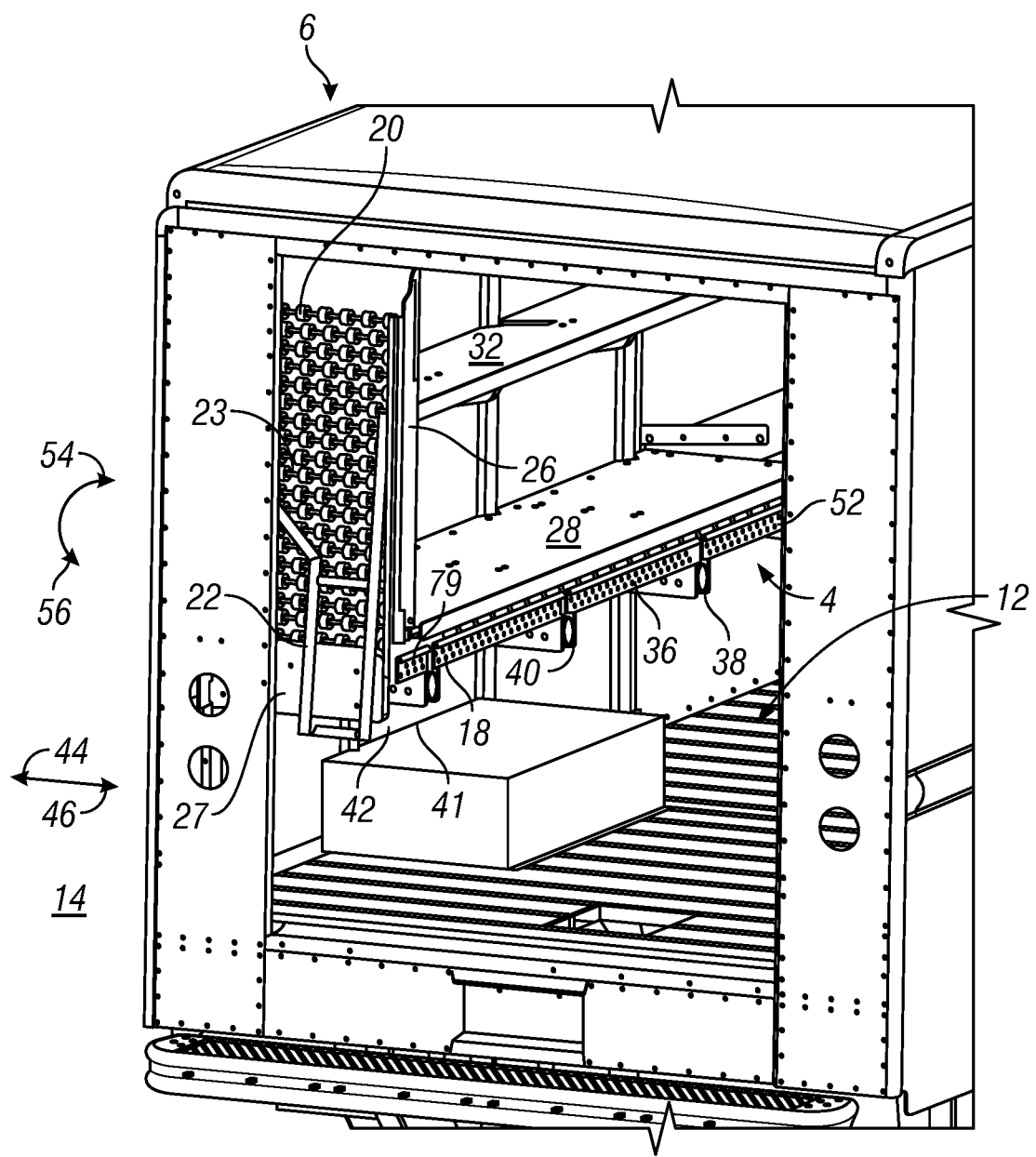
FIG. 5 is another rear partially cut away perspective view of the cargo area portion of the delivery/cargo vehicle.
Figure 6:
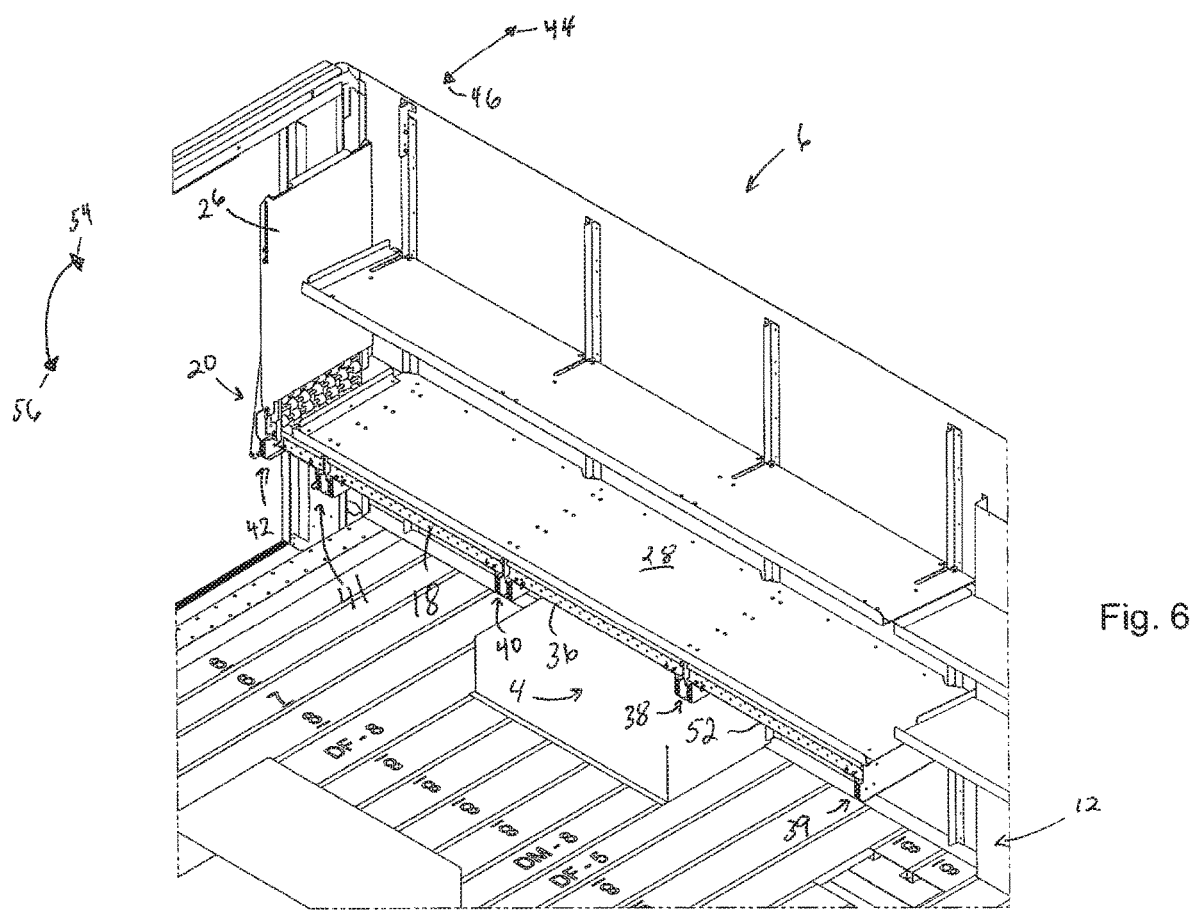
FIG. 6 is a partially cut away side interior perspective view of the cargo area of the delivery/cargo vehicle.

Another similar rear, partially cut away, perspective view of interior 12 of cargo area 6 is shown in FIG. 5. This view is the same as that shown in FIG. 4, except conveyor assembly 4 is shown moved to its stowed position. Illustratively, this stowed position includes moving conveyor sections 18, 36, and 52 in direction 44 underneath shelf panel 28 via slideout assemblies 38, 40, and 41. This view also shows pivoting conveyor section 20 in its folded and retracted stowed position similar to conveyor sections 18, 36, 52. It is appreciated by this view how moving pivoting conveyor section 20 in direction 54 to its stowed position keeps same appreciably out of the way to allow normal operation within interior 12 of cargo area 6. Yet, having the ability to pivot downward in direction 56 and slid in direction 46, pivoting conveyor section 20 may join the other conveyor sections, as well as extend exterior 14 of cargo area 6. As further shown herein, pivoting conveyor section 20 pivots on pivoting slideout assembly 42.

In addition, pivoting conveyor section 20 is shown pivoted adjacent extension section 19 to its stowed position. Support 22 is pivotally mounted on pivoting conveyor section 20 at a pivot point 23. This allows support 22 to be folded and stowed with pivoting conveyor section 20 as shown in FIG. 5. In contrast to FIG. 4, ramp 26 in FIG. 5 is shown retracted onto pivoting conveyor section 20 so, like support 22, ramp 26 may be stowed away.

Partially cut away side interior perspective views of cargo area 6 are shown in FIGS. 6, 7, 8, and 9. These views demonstrate the progression of moving conveyor assembly 4 from its stowed position to its use position. The view in FIG. 6, for example, depicts conveyor assembly 4 in its stowed position. Here, pivoting conveyor section 20 is pivoted upward in direction 54 and slid in direction 44 with the assistance of pivoting slideout assemblies 41 and 42 to be positioned out of the way similar to that shown in FIG. 5. Likewise, conveyor sections 18, 36, and 52 have also been moved in direction 44 to be positioned under shelf panel 28. This also keeps these conveyor sections out of the way in interior 12 of cargo area 6. It is appreciated that the less intrusive conveyor assembly 4 can be, the more vehicle 2 may operate essentially as normal and carry substantially the same quantity of articles while maintaining this on board conveyor assembly. It is further appreciated that conveyor section 18 may be slid in directions 44 and 46 via slideout assemblies 40 and 41. Conveyor section 36 may be moved in directions 44 and 46 via slideout assemblies 40 and 38. Conveyor section 52 may be moved in directions 44 and 46 via slideout assemblies 38 and 39. It is appreciated that these conveyor sections may be moved in directions 44 and 46 by being slid out in similar fashion to that of a cabinet drawer. Each conveyor section may be slid out in direction 46 like a drawer to expose the conveyor section and then pushed back in direction 44 to conceal the conveyor section in its stowed position under shelf panel 28. It is further appreciated that each of conveyor sections 18, 36, and 52 may be slid to stowed and use positions independently of each other. This allows an operator to move only those conveyor sections needed for a particular operation to be used. It also makes moving conveyor assembly 4, between stowed and use positions, easier. Rather than having to move an entire conveyor assembly at one time, only sections of same are moved. This results in what may be perceived as a relatively long conveyor assembly to be lighter and less unwieldy during transition between stowed and use positions. Ramp 26 is shown slid onto pivoting conveyor section 20 in a stowed position.

Figure 7:
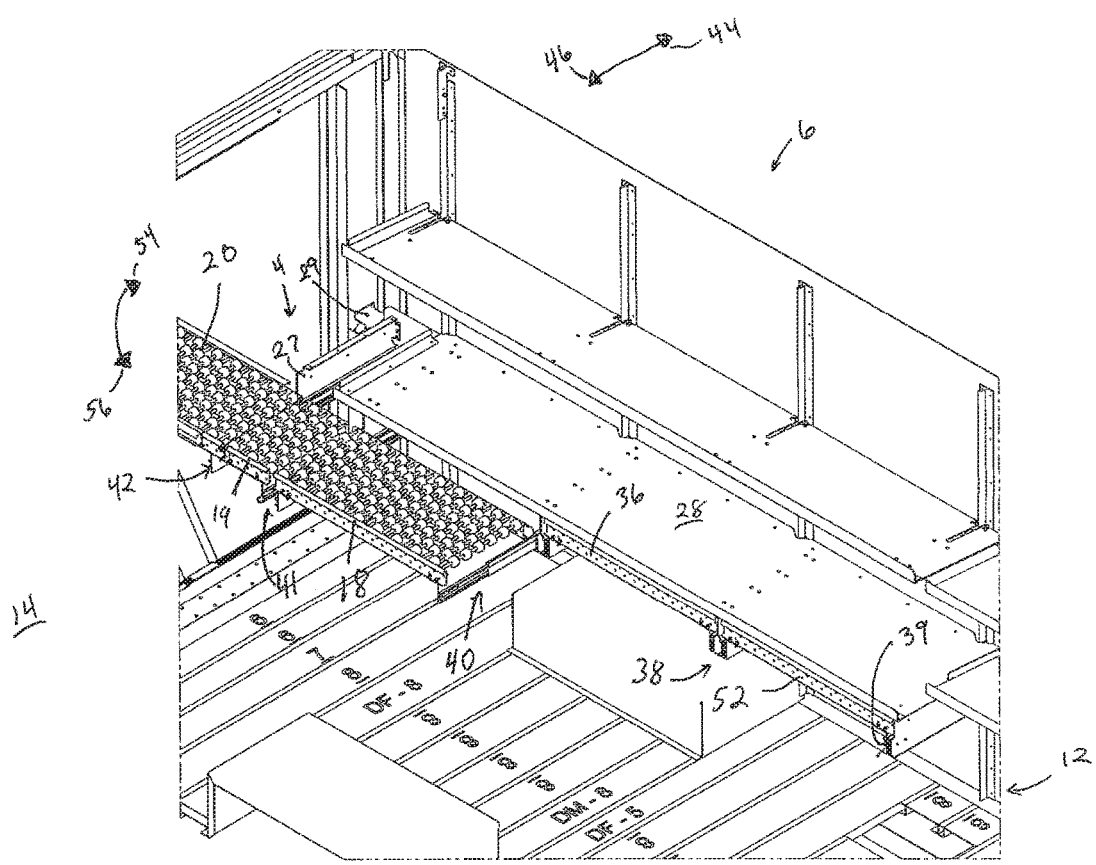
FIG. 7 is another partially cut away side interior perspective view of the cargo area of the delivery/cargo vehicle.

The view in FIG. 7 depicts the progression of moving conveyor assembly 4 to its use position. As shown, pivoting conveyor section 20 has been pivoted downward in direction 56, as well as slid in direction 46 to extend level and bridge between interior 12 of cargo area 6 and exterior 14. Also shown in this view is conveyor section 18 moved in direction 46 to its use position on slideout assemblies 41 and 40. It is appreciated from this view how, in the use position, conveyor section 18 is exposed from under shelf panel 28. It is further appreciated, depending on the use, that it is possible only conveyor section 18 and pivoting conveyor section 20 are needed to be used. This demonstrates the flexibility of conveyor assembly 4 and that all of the conveyor sections need not be moved to their use positions all at one time. In this view, conveyor sections 36 and 52 are maintained in their stowed positions.

Figure 8:
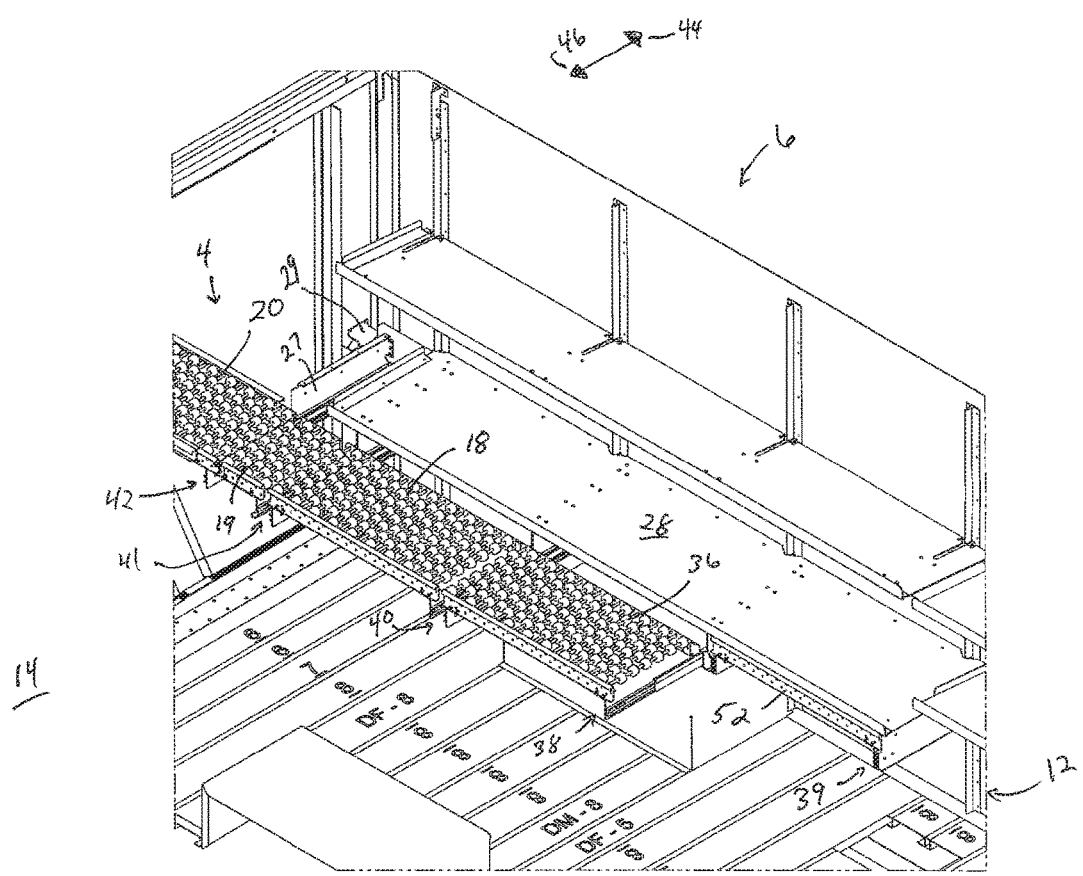
FIG. 8 is another partially cut away side interior perspective view of the cargo area of the delivery/cargo vehicle.

The view of FIG. 8 further demonstrates the progression of moving conveyor assembly 4 to its use position. As shown, conveyor section 18, extension section 19, and pivoting conveyor section 20 are already located in their use position as previously discussed with respect to FIG. 7. Here, in FIG. 8, however, conveyor section 36 is now also slid in direction 46 to its use position via slideout assemblies 40 and 38. The use position here means conveyor section 36 is longitudinally aligned with conveyor section 18 and pivoting conveyor section 20 while exposed from underneath shelf panel 28 as shown. And again, depending on the particular use of interior 12 of cargo area 6, only conveyor sections 18 and 36 may be needed for use with pivoting conveyor section 20. Optionally, circumstances may warrant that conveyor section 52 remains in its stowed position.

Figure 9:
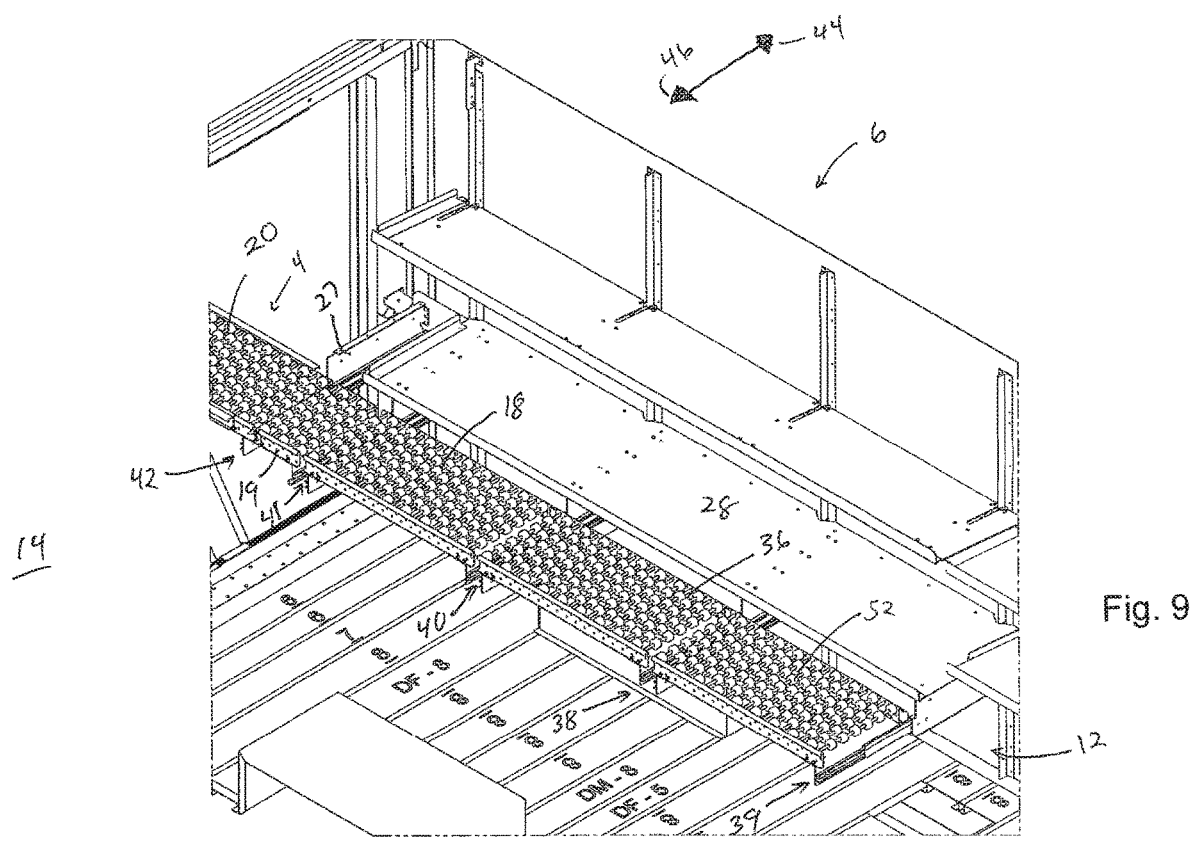
FIG. 9 is another partially cut away side interior perspective view of the cargo area of the delivery/cargo vehicle.

If circumstances warrant that all conveyor sections are moved to their use position, as shown in FIG. 9, conveyor section 52 is likewise moved to its use position via slideout assemblies 38 and 39. As shown herein, while in its use position, conveyor section 52 is longitudinally aligned with conveyor sections 36 and 18, as well as pivoting conveyor section 20. Again, it is appreciated that any number of conveyor sections may be employed based on the size, configuration, and use of interior 12 of cargo area 6. The view shown herein is but one example of the size, shape, and configuration of interior 12 of cargo area 6. Cargo area 6, in other embodiments, may be longer or wider, have more or fewer shelves, and possibly have different conveyor section arrangements, all of which are contemplated to be within the scope of this disclosure.

Figure 10:
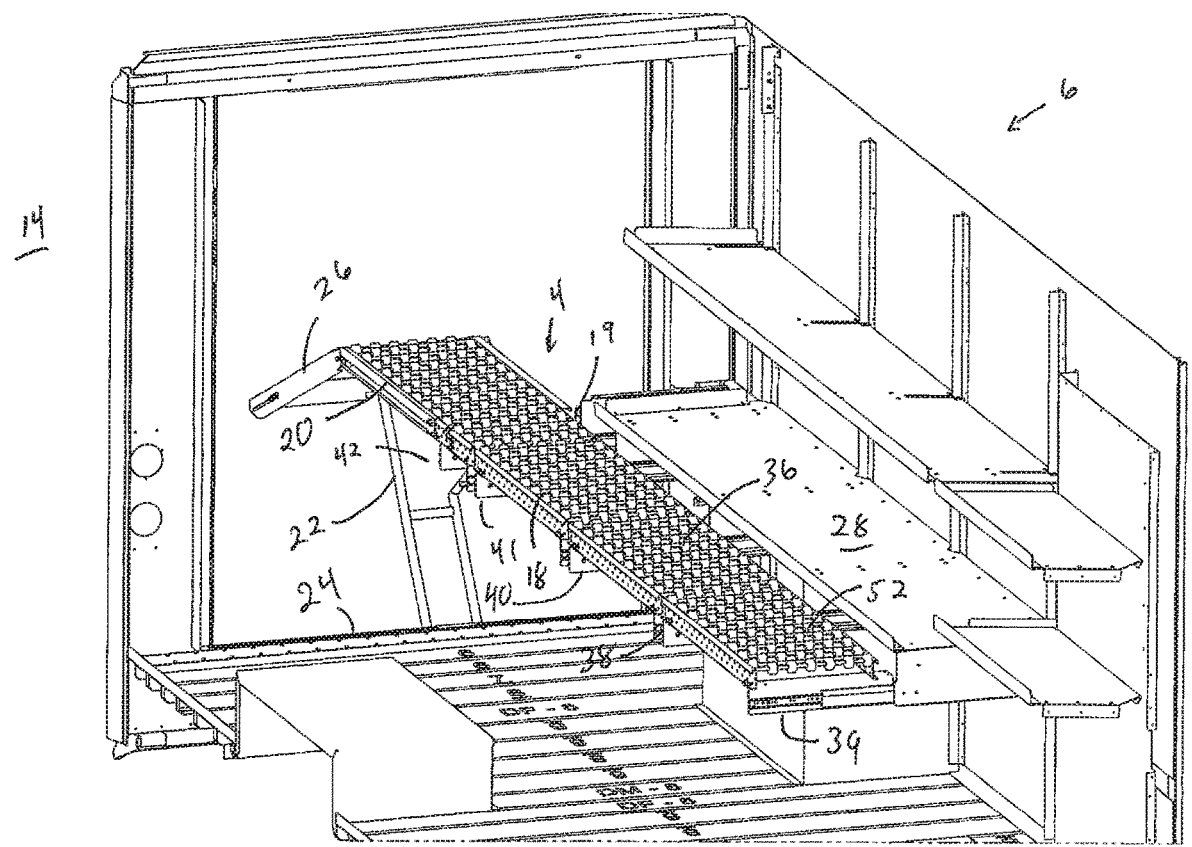
FIG. 10 is a rearward looking partially cut away perspective view of the cargo area.

A rearward looking, partially cut away, perspective view of cargo area 6, is shown in FIG. 10. This view is similar to that shown in FIG. 9 depicting conveyor assembly 4 with all of its sections 18, 36, 52, extension section 19, and pivoting conveyor section 20 located in their use positions. Ramp 26 is also shown extending from the end of pivoting conveyor section 20 exterior 14 of cargo area 6. Illustratively, ramp 26 may be angled relative to conveyor assembly 4, as shown, in order to be located in proximity to another structure exterior 14 of cargo area 6.

Figure 11:
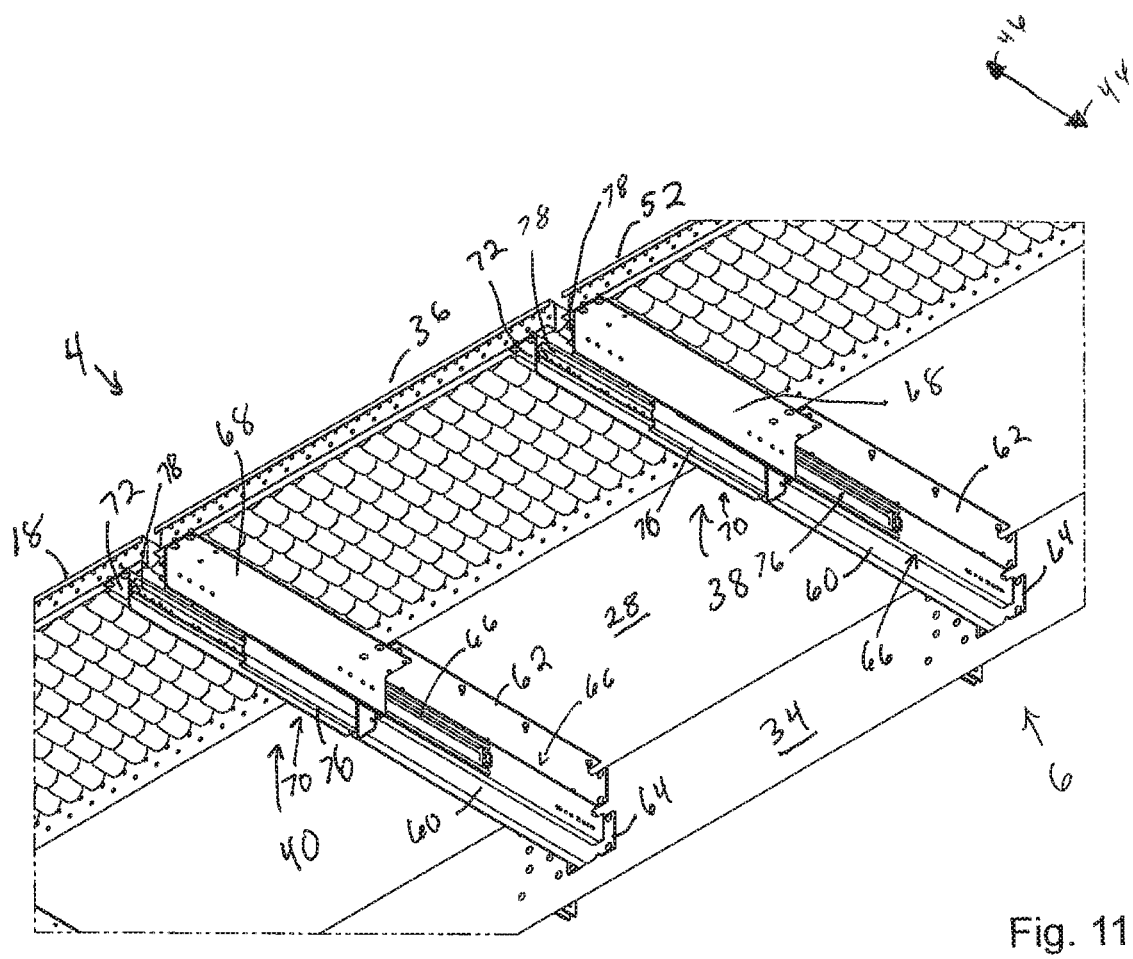
FIG. 11 is an underside perspective view of the portion of the conveyor assembly.

An underside perspective view of a portion of conveyor assembly 4 is shown in FIG. 11. In particular, this view depicts conveyor sections 18, 36, and 52. Conveyor section 36 is shown supported by slideout assemblies 40 and 38. It is appreciated that the additional slideout assemblies 39 and 41 (not shown in this view) are similarly structured and operated as slideout assemblies 38 and 40 shown in this view. Illustratively, slideout assembly 38 comprises a slider support 60 attached to sidewall 34 of cargo area 6. For further support, a shelf support bracket portion 62 of slider support 60 attaches to the underside of shelf panel 28. Illustratively, fasteners or other attachment means, such as soldering or adhesive, may be used to attach shelf support bracket portion 62 and wall support bracket portion 64 to shelf panel 28 and sidewall 34, respectively. As shown herein, providing fastening support for slider support 60 creates a sufficient anchor for the other sliding structures. For example, a slider 66 is attached to one side of slider support 60 as shown. It is appreciated that slider 66, as well as the other sliders, may be a telescoping slider mechanism having inner and outer slider portions that move with respect to each other along a bearing or lubricated surface. In an embodiment, the sliders may be telescoping sliders of the type that employ conventionally known mechanisms and may be used to support and move cabinet drawers such as kitchen cabinet drawers, but sized to accommodate the weight of the intended articles stored in the vehicle. A portion of slider 66 is attached to conveyor section bracket 68. It is further appreciated that conveyor section bracket 68 moves with respect to slider support 60. Conveyor section bracket 68 may also, as shown, attach to a conveyor section such as conveyor section 52 shown in FIG. 11, to move same in directions 44 and 46 with respect to slider support 60.

On the opposite side of slider 66 may be a second slider 70 also attached and movable relative to slider support 60. Second slider 70 is attached to another conveyor section bracket 72, this one attached to conveyor section 36. It is appreciated that slider support 60 may also operate as a spacer so it may hold both slider 66 on one side and second slider 70 on the other side. Slider 66 is secured to conveyor section 52 while second slider 70 located on the opposite side of slider support 60 is secured to conveyor section 36. This means a single slider support can hold multiple sliders and each slider may be attached to separate conveyor sections. Each conveyor section may then be movable with respect to the other. For example, slideout assembly 40 also includes a slider support 60 with a shelf support bracket portion 62 attached to the underside of shelf panel 28 and a wall support bracket portion 64 attached to sidewall 34. Like slideout assembly 38, slideout assembly 40 also includes a slider 66 attached to conveyor section bracket 68. This time, however, conveyor section bracket 68 of slideout assembly 40 is attached to conveyor section 36 so that it may be movable in directions 44 and 46 with respect to slider support 60. And like slideout assembly 38, slideout assembly 40 includes a second slider 70 attached to the opposite side of slider support 60 from slider 66. Second slider 70 is attached to conveyor section 18 via conveyor section bracket 72. This means that slider support 60 of slideout assembly 40 is attachable to both conveyor sections 36 and 18 yet those conveyor sections 36 and 18 are movable independently and with respect to each other. It is further appreciated that the other slideout assemblies 39 and 41 have the same slideout structures as slideout assemblies 38 and 40. That said, it is appreciated that in some embodiments, such as with slideout assembly 39, that its slider support 60 may only include a second slider 70 attached to conveyor section bracket 72 on one side of slider support 60 (see, also, FIG. 10). This is the case (see, also, FIG. 9) where a slider support 60 is to engage only one conveyor section on one side of slider support 60 rather than two conveyor sections, one on each side of slider support 60.

Figure 12:
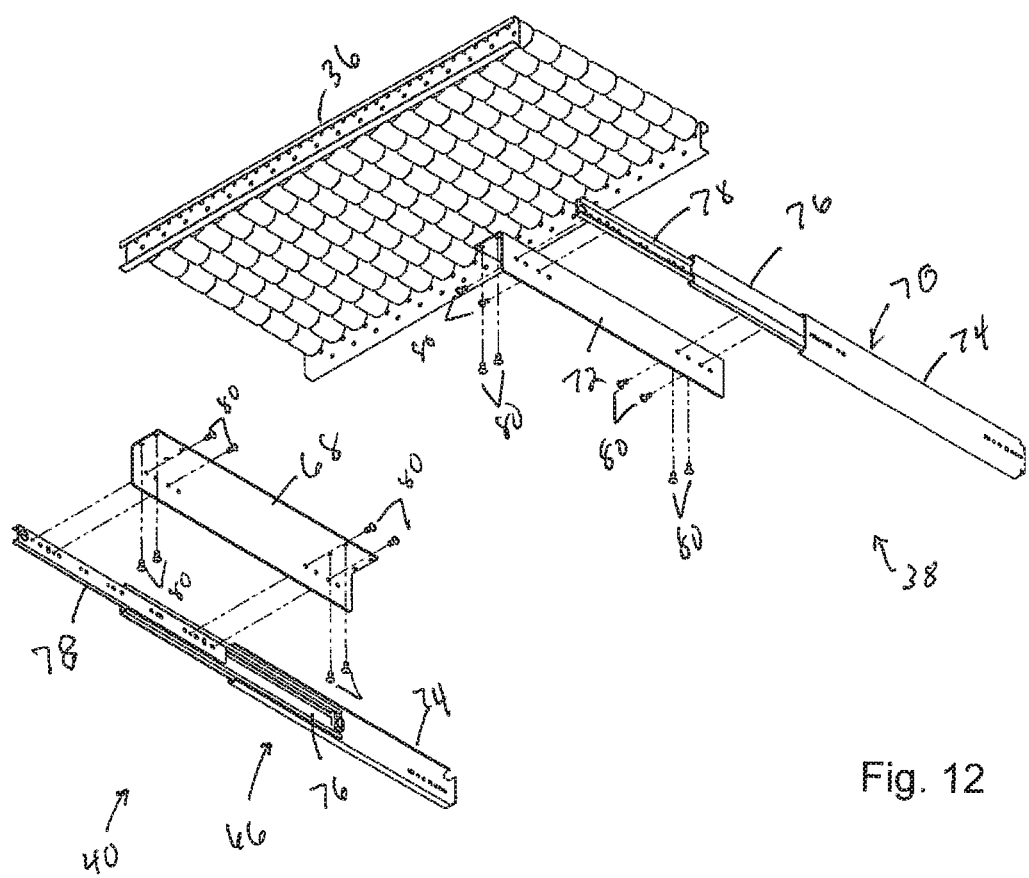
FIG. 12 is an exploded view of portions of the slideout assemblies of the conveyor section.

An exploded view of portions of slideout assemblies 38 and 40, along with conveyor section 36, is shown in FIG. 12. Specifically, second slider 70, along with conveyor section bracket 72 from slideout assembly 38, is shown along with slider 66 and conveyor section bracket 68 of slideout assembly 40. These particular structures are shown because those are the slideout structures that move conveyor section 36. It is appreciated that corresponding structures that attach to the slideout assemblies, as well as the others, are employed to independently move the other conveyor sections as well. As shown herein, second slider 70 includes a slider bracket 74 which is what attaches to slider support 60 (see, also, FIG. 11). A first telescoping member 76 is slideably movable with respect to slider bracket 74. Similarly, second telescoping member 78 is fitted and movable with respect to first telescoping member 76. One skilled in the art will appreciate that this telescoping slider is of similar configuration to conventional cabinet drawer sliders, but possibly larger and more robust to support the conveyor section. Also shown are fasteners 80, which are used to attach conveyor section bracket 72 to both second telescoping member 78 and conveyor section 36. Also shown in this view is slider 66, which may be the same as second slider 70, but attached to the opposite side of slider support 60. As shown herein, slider 66 also includes a slider bracket 74 with a first telescoping member 76, and a second telescoping member 78, and is the same as that described with respect to second slider 70. Conveyor section bracket 68, along with fasteners 80, are employed to attach same to second telescoping member 78 and conveyor section 36.

Figure 13:
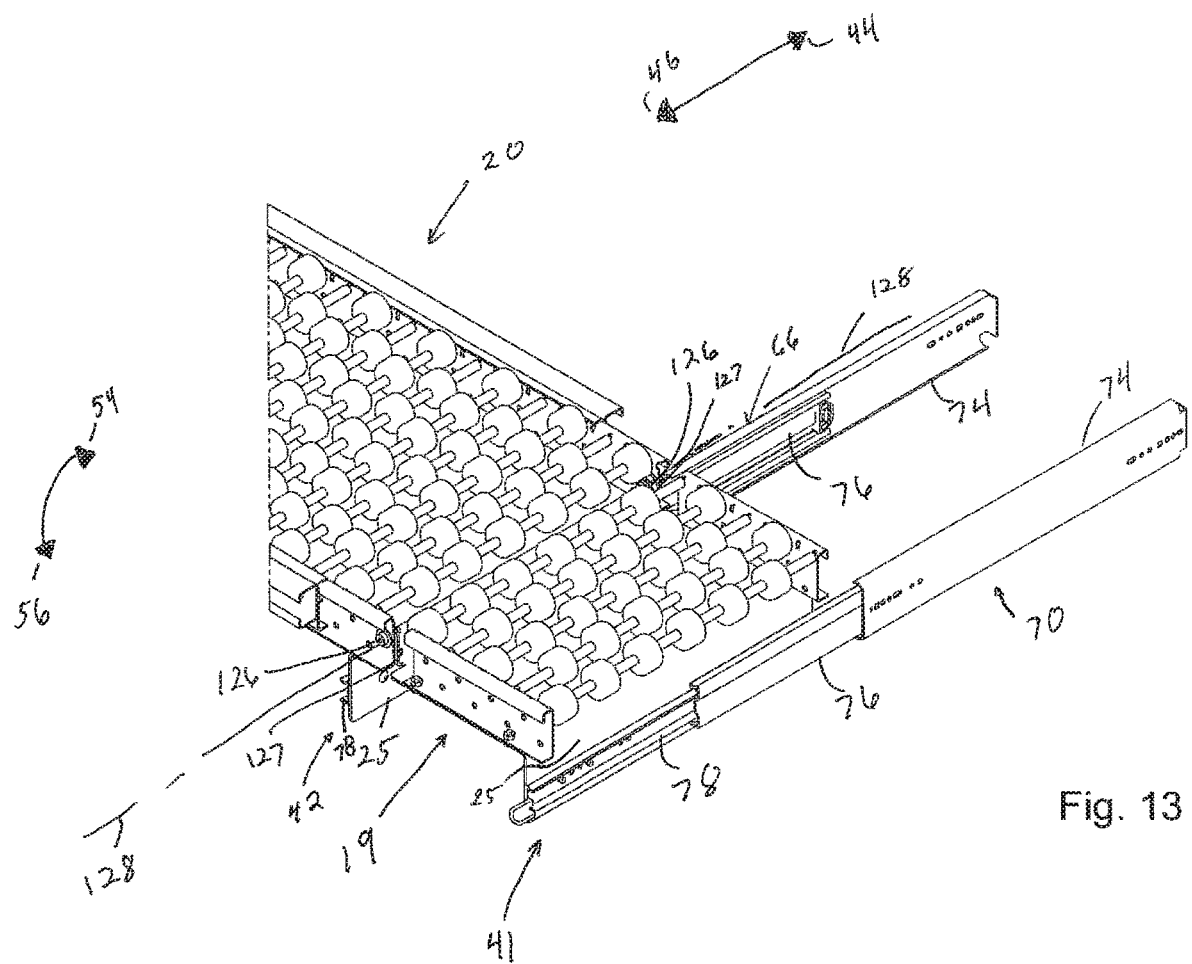
FIG. 13 as an isolated perspective view of an extension section of the pivoting conveyor section.

An isolated perspective view of extension section 19 and pivoting conveyor section 20 is shown in FIG. 13. Extension section 19 and pivoting conveyor section 20 are attached to slideout assembly 41 and pivoting slideout assembly 42, as shown. It is appreciated that pivoting conveyor section 20 is movable linearly in both directions 44 and 46, as well as pivotally in directions 54 and 56. This is so pivoting conveyor section 20 may be both pivoted and slid between its stowed and use positions, as depicted, for example, in FIGS. 6 and 7. With regard to the sliding function, pivoting slideout assembly 42 is shown attached to pivoting conveyor section 20. Pivoting slideout assembly 42 includes slider 66 attachable to pivot support bracket 25 and mount bracket 27 (see FIG. 15). This causes pivoting conveyor section 20 to move in directions 44 and 46. Pivoting conveyor section 20 pivotally attaches to pivot support bracket 25. Extension section 19 is also attached to pivot support bracket 25. With regard to pivoting conveyor section 20, pivot pins 126 are disposed through flanges 127 so pivoting conveyor section 20 may pivot in directions 54 and 56 about axis 128 (see, also, FIGS. 6 and 7). Slider 66 is attached to pivot support bracket 25, the same as that described with respect to sliders 66 attached to conveyor section bracket 68, on slideout assemblies 38 and 40. As shown herein, slider 66 includes a slider bracket 74, which is what attaches to mount bracket 27 (see FIG. 17). First telescoping member 76 is slideably movable with respect to slider bracket 74. Similarly, second telescoping member 78 is fitted and movable with respect to first telescoping member 76.

With respect to slideout assembly 41, it is also illustratively part of pivot support bracket 25. As shown, second slider 70 includes slider bracket 74, which is what attaches to slider support 60 (see, also, FIG. 15). First telescoping member 76 is slideably movable with respect to slider bracket 74. Similarly, second telescoping member 78 is fitted in and movable with respect to first telescoping member 76. As shown herein, second telescoping member 78 is attached to pivot support bracket 25 so that extension section 19 and pivoting conveyor section 20 may be movable in directions 44 and 46.

Figure 14:
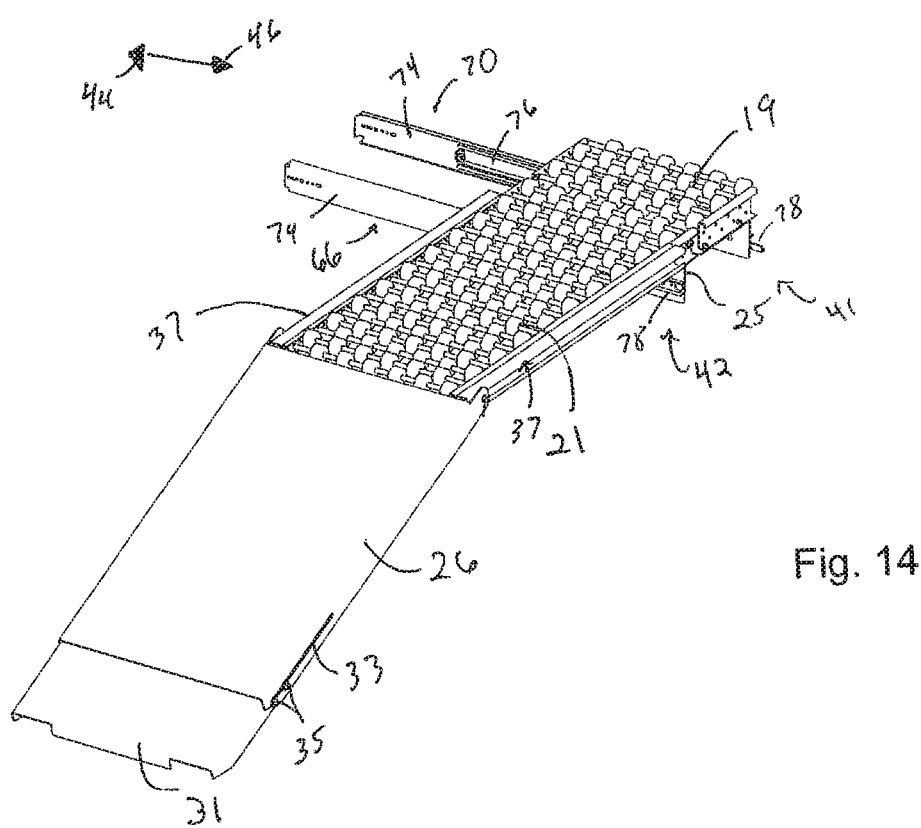
FIG. 14 is another isolated perspective view of the pivoting conveyor section attached to the pivoting slideout assemblies.

Another isolated perspective view of pivoting conveyor section 20, attached to pivoting slideout assembly 42, is shown in FIG. 14. This view is essentially the reverse of the perspective view shown in FIG. 13. FIG. 14, again, shows pivoting slideout assembly 42, including slider 66 attachable to pivot support bracket 25, move pivoting conveyor section 20 in directions 44 and 46. Slider 66 includes a slider bracket 74, which is what attaches to mount bracket 27 (see FIG. 17). First telescoping member 76 (not shown in this view, see FIGS. 11 and 12) is slideably movable with respect to slider bracket 74. Similarly, second telescoping member 78 is fitted in and movable with respect to first telescoping member 76. Likewise, slideout assembly 41, also part of pivot support bracket 25, includes second slider 70 with slider bracket 74, which is what attaches to slider support 60 (see, also, FIG. 11). First telescoping member 76 is slideably movable with respect to slider bracket 74. Similarly, second telescoping member 78 is fitted and movable with respect to first telescoping member 76.

Also shown in this view is ramp extender 31 extending from ramp 26. Illustratively, fasteners 35 may be disposed through a slot 33 in ramp 26 to selectively allow ramp extender 31 to move to and from ramp 26. Ramp extender 31 provides additional length to ramp 26 as needed. Further shown are slotted rails 37 which illustratively line each side of pivoting conveyor section 20. Ramp 26 may include roller bearings 186 (see FIG. 16) located in slotted rails 37 on each side of pivoting conveyor section 20 to allow ramp 26 to move between retracted stowed and extended use positions.

Figure 15:
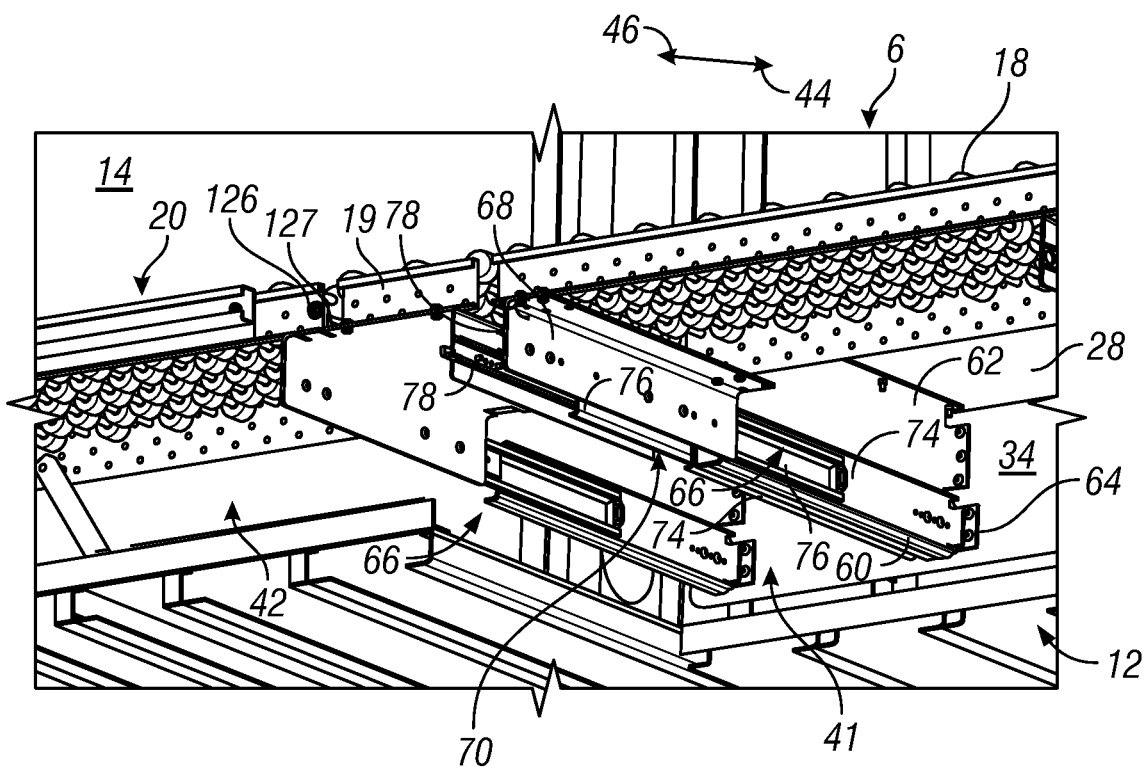
FIG. 15 is a perspective underside view of the interior of the cargo area showing the conveyor section along with the pivoting conveyor section.

A perspective underside view of interior 12 of cargo area 6, showing conveyor section 18, along with pivoting conveyor section 20, both in their use position, is shown in FIG. 15. This view depicts conveyor section 18 attached to conveyor section bracket 68, which is attached to second telescoping member 78 of slideout assembly 41. First telescoping member 76 is slideably movable with respect to slider bracket 74. Second telescoping member 78 is slideably movable with respect to first telescoping member 76. Conveyor section bracket 68 moves conveyor section 18 with respect to slider support 60. In addition, slider support 60 is attached to sidewall 34 via wall support bracket portion 64. This view also shows shelf support bracket portion 62 attached to shelf panel 28 and sidewall 34.

Also part of slideout assembly 41 is second slider 70 composed of slider bracket 74, first telescoping member 76, and second telescoping member 78. First telescoping member 76 is slideably movable with respect to slider bracket 74 and second telescoping member 78 is slideably movable with respect to first telescoping member 76. Second slider 70 is attached to pivot support bracket 25, which is attached to extension section 19. This allows extension section 19 to be movable in directions 44 and 46 independent of conveyor section 18.

Pivot support bracket 25 is also part of pivoting slideout assembly 42 shown pivotally attached to pivoting conveyor section 20. Pivot pin 126 is disposed through flange 127 of pivot support bracket 25. Slider 66 is the same as that described with respect to sliders 66 on slideout assemblies 38 and 40. As shown herein, slider 66 includes a slider bracket 74, which is what attaches to mount bracket 27 (see FIG. 17). First telescoping member 76 (not shown in this view, but see FIGS. 11 and 12) is slideably movable with respect to slider bracket 74. Similarly, second telescoping member 78 is fitted in and movable with respect to first telescoping member 76.

This view shows conveyor section 18 located in its extended use position. Aligned with conveyor section 18 is pivoting conveyor section 20. Pivoting slideout assembly 42 supports pivoting conveyor assembly 20 such that it is aligned with conveyor section 18. This allows movement of articles in interior 12 of cargo area 6 to be moved along conveyor section 18 and pivoting conveyor section 20 to exterior 14 of cargo area 6.

Figure 16:
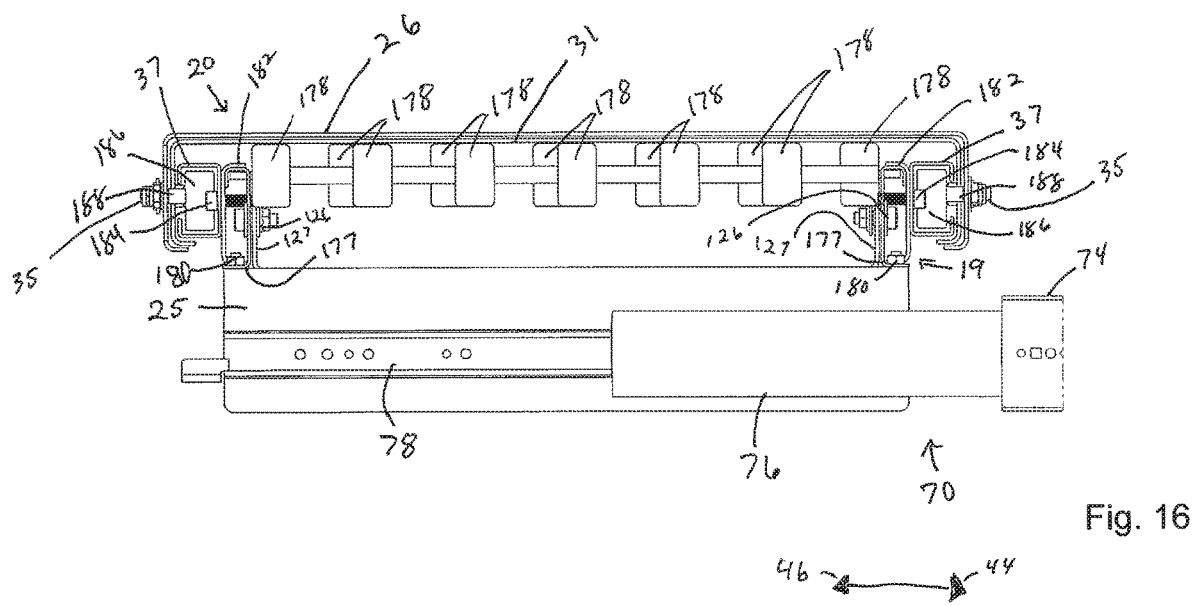
FIG. 16 is an end detailed view of the extension section of the pivoting conveyor section.

An end detail view of extension section 19 and pivoting conveyor section 20 is shown in FIG. 16. This view depicts second slider 70 with slider bracket 74, first telescoping member 76, and second telescoping member 78 attached to pivot support bracket 25. Particularly, second telescoping bracket 78 is attached to pivot support bracket 25 and movable with respect to first telescoping member 76 in directions 44 and 46. As part of extension section 19, C-brackets 177 are spaced apart and located between rollers 178. Fasteners 180 secure C-brackets 177 onto support bracket 25 as shown with rollers 178 suspended thereabove. It is appreciated that pivoting conveyor section 20 is also bounded by C-brackets 177 (see FIG. 17). In an illustrative embodiment, at least a portion of C-bracket 177, on pivoting conveyor section 20 is covered by bracket 182. Slotted rail 37 (see, also, FIG. 14) is attached to cover bracket 182 for providing the longitudinal track for ramp 26. Illustratively, a fastener 184 secures slotted rail 37 to cover bracket 182 and C-bracket 177. It is appreciated that a plurality of fasteners 184 may be employed to secure these structures on each side of pivoting conveyor section 20. In order to assist moving ramp 26 between stowed and use positions (compare FIGS. 21 and 22), a roller bearing 186 is fitted in each slotted rail 37 as illustratively shown. This allows ramp 26 to be not only pivotable in directions 54 and 56 (see e.g., FIG. 6), but also in directions 48 and 50 (see e.g., FIG. 4) to move ramp 26 between stowed and use positions. Pin 188 may be disposed in roller bearing 186 and ramp 26 to both secure ramp 26 to bearing 186 while at the same time providing a pivot point for ramp 26 with respect to pivoting conveyor section 20. Particularly, when ramp 26 is moved in direction 48 (see, also, FIG. 4) to its use position, it may be pivotable in directions 54 and 56 as needed. Pin 188 provides this pivot point when ramp 26 is located in its use position. Flange 127 of pivot support bracket 25 is shown extending upward to receive pivot pin 126. This view also shows fastener 35, which is located in slot 33 (see FIG. 14), to movably secure ramp extender 31 to ramp 26.

Figure 17:
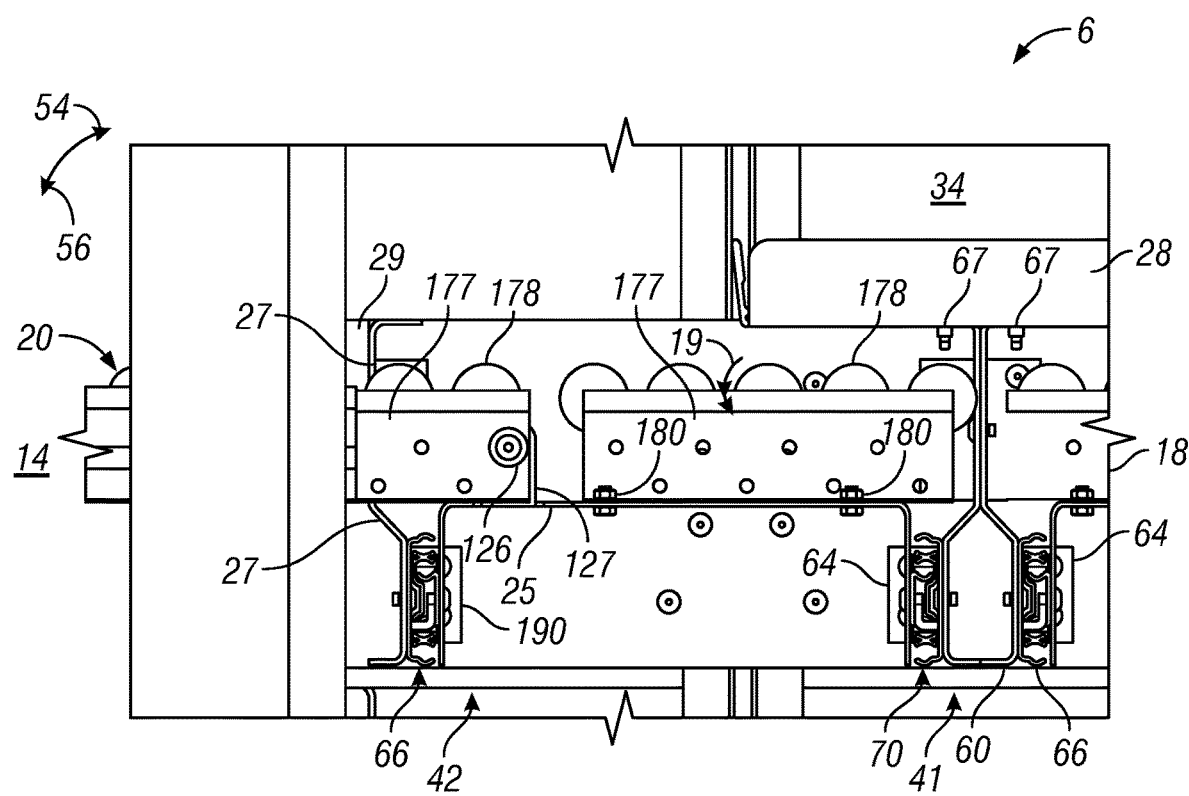
FIG. 17 is a detail view of the extension section and a side view of the pivoting conveyor section.

A detail view of extension section 19 and pivoting conveyor section 20, along with slideout assembly 41 and pivoting slideout assembly 42, is shown in FIG. 17. In this view, pivoting conveyor section 20 is lowered in direction 56 to its use position as shown in FIGS. 13-15. It is appreciated that with rollers 178 in alignment, parcels may be slid therealong to exterior 14 of cargo area 6. This view further assists depicting how slider support 60 and shelf mount brackets 27 are secured to cargo area 6. With respect to slider support 60, it is attached to the underside of shelf pin 28, illustratively, via fasteners 67 while also attached to sidewall 34 via wall support bracket portions 64. Also shown herein are sliders 66 and 70 which, as part of slideout assembly 41, independently move conveyor section 18 and extension section 19 independently of each other. With respect to pivoting slideout assembly 42, its slider 66 is attached to mount bracket 27 as shown. Mount bracket 27 is mounted onto cargo area 6 via wall support bracket 190 and wall bracket 29 (see, also, FIGS. 7, 8, and 9). In addition to supporting pivot support bracket 25 in cargo area 6, mount bracket 27 also may serve as a stop to pivoting conveyor section 20 when in its upright and stowed position (see, also, e.g., FIGS. 5 and 18). This assists in keeping pivoting conveyor section 20 upright while in its stowed position. Also shown in this view are C-brackets 177 that are part of both extension section 19 and pivoting conveyor section 20. Fasteners 180 are shown securing C-bracket 177 of extension section 19 to pivot support bracket 25. Flange 127 of pivot support bracket 25 is also shown extending upward to receive pivot pin 126.

Figure 18:
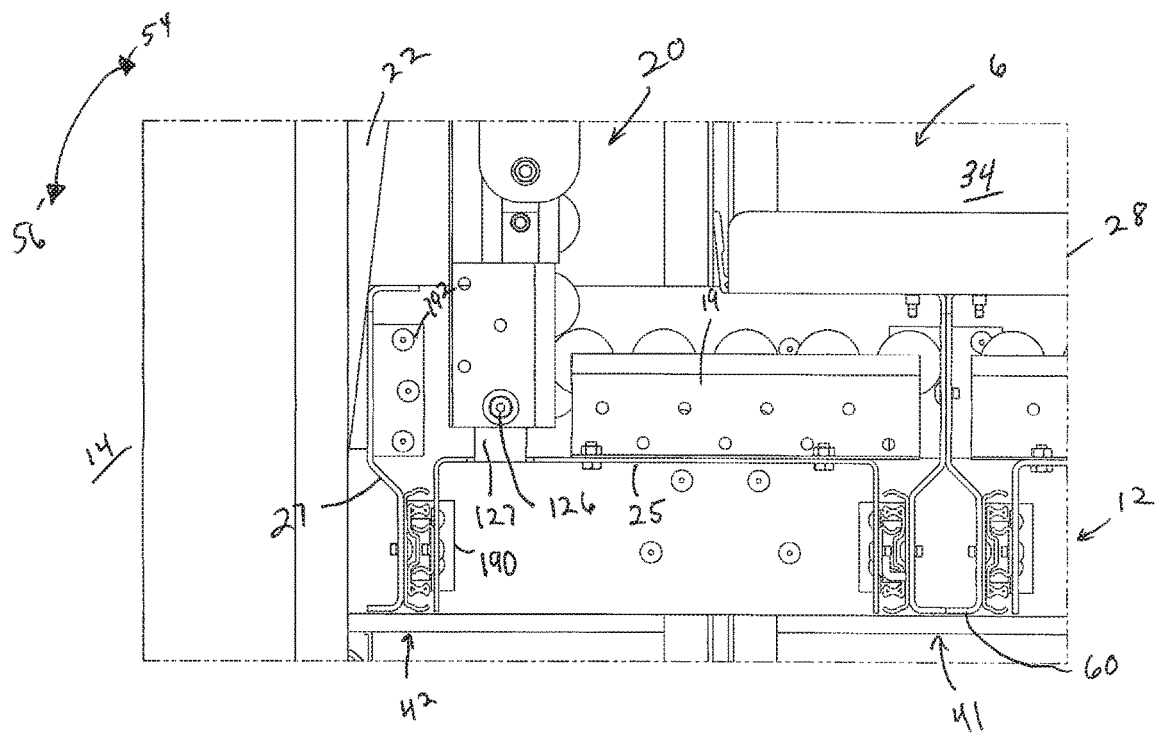
FIG. 18 is another detail view of the extension section and side view of the pivoting conveyor section.

Another detail view of extension section 19 and pivoting conveyor section 20, similar to that shown in FIG. 17, is shown in FIG. 18. This view is different than that shown in FIG. 17 in that pivoting conveyor section 20 has been pivoted upward in direction 54 to its stowed position within interior 12 of cargo area 6. In this view, pivoting conveyor section 20 pivots about pin 126 on flange 127 of pivot support bracket 25 to be positioned relatively perpendicular to extension section 19. This allows pivoting conveyor section 20 to be fitted within interior 12 of cargo area 6. This view shows mount bracket 27 attached to sidewall 34 via wall support bracket 192 similar to wall support bracket 190 previously identified. This view also demonstrates how mount bracket 27 extending vertically and positioned adjacent pivoting conveyor section 20, when located in its stowed position, may serve as a stop to prevent pivoting conveyor section 20 from inadvertently pivoting downward in direction 56. Only when pivoting conveyor section 20 has been moved laterally in direction 46 (see, also, FIGS. 6 and 7), thereby clearing mount bracket 27, can pivoting conveyor section 20 be moved in direction 56 to its use position (as shown in FIG. 7).

Figure 19:
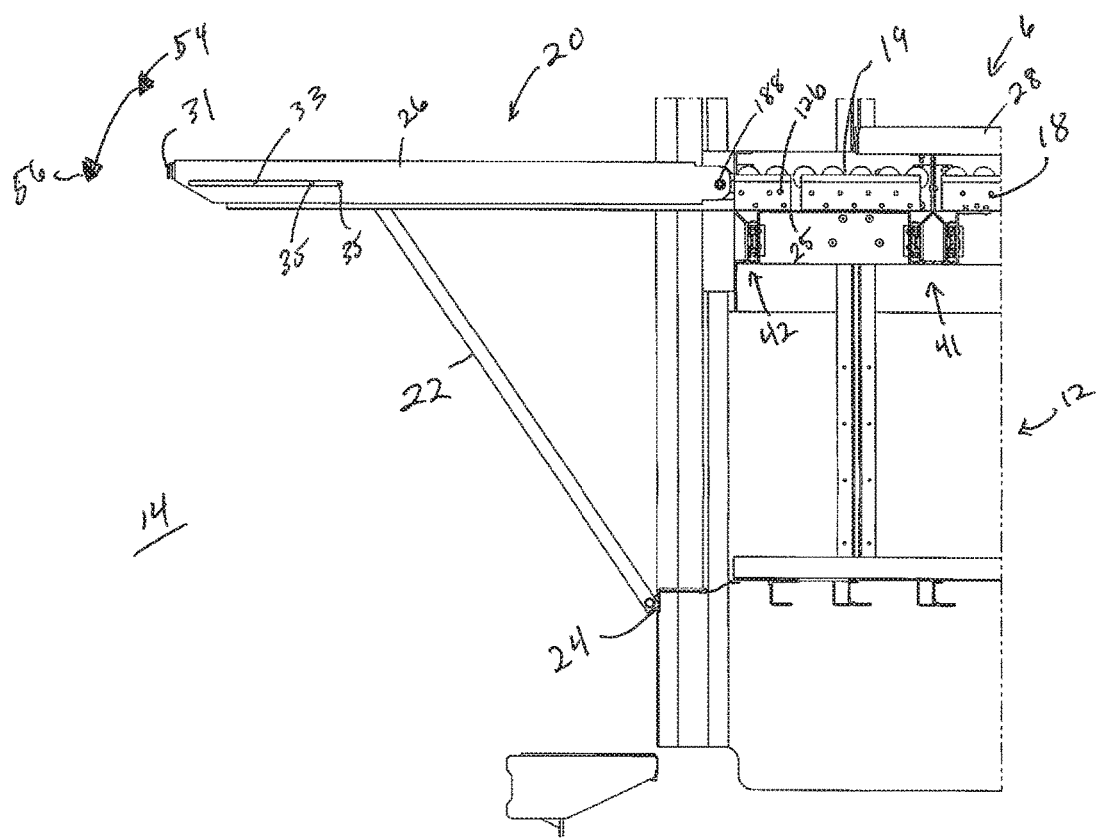
FIG. 19 is a side view of the pivoting conveyor section.

The side detail view of pivoting conveyor section 20, along with extension section 19 and conveyor section 18, are shown in FIG. 19. This view shows pivoting conveyor section 20 moved in direction 56 to its use position. Additionally, this view shows how support 22 may be moved, as well, and propped against rear tail section 24 to provide additional support for pivoting conveyor section 20 while moving articles thereon. Support 22 allows pivoting conveyor section 20 to carry extra weight that will not be borne solely at pivoting slideout assembly 42. It will be appreciated by one skilled in the art upon reading this disclosure that support 22 is illustrative and may be configured alternatively yet still provide support to pivoting conveyor section 20. Additionally, it is appreciated that support 22 is pivotable or otherwise movable, so as to be located in a stowed position within interior 12 of cargo area 6 similar to pivoting conveyor section 20. Alternatively, a support or other type of prop may be used to support pivoting conveyor section 20 that is slid and/or selectively attached to same to achieve similar results. This view also shows ramp 26, along with slot 33, which receives fasteners 35. In this illustrative embodiment, ramp extender 31 is retracted into ramp 26 in contrast to that shown in FIG. 14. Further, ramp 26 is retracted along pivoting conveyor section 20 covering same and thereby locating pin 188 adjacent pivot pin 126 as shown.

Figure 20:
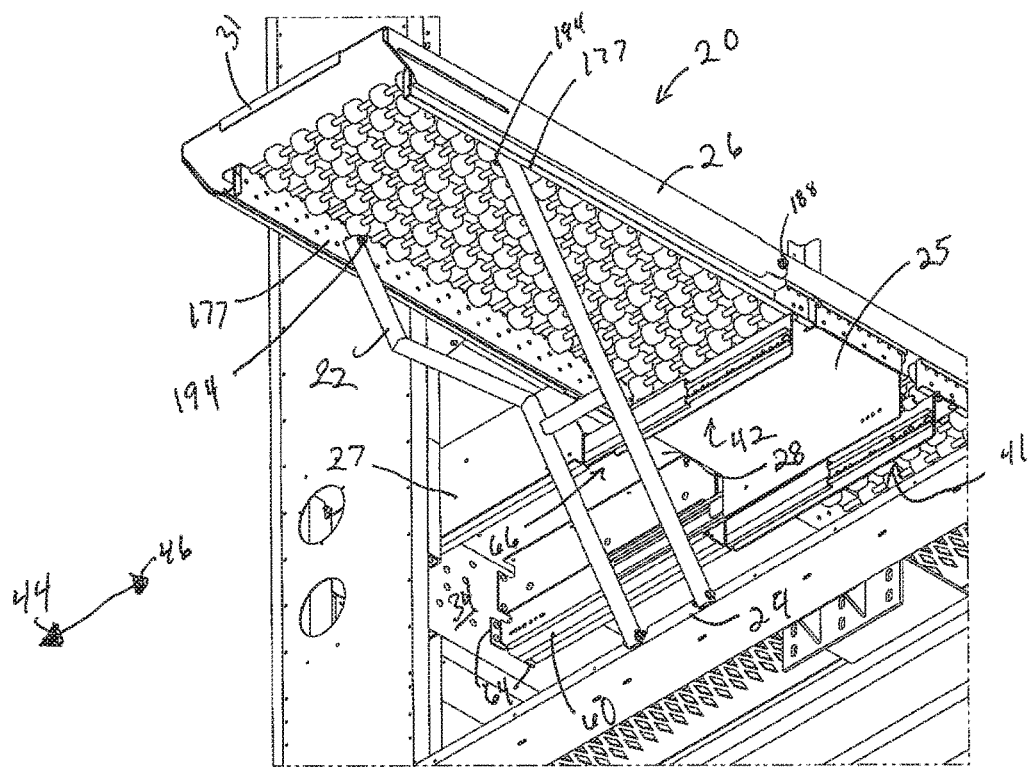
FIG. 20 is an underside detail perspective view of the pivoting conveyor section.

An underside detail perspective view of pivoting conveyor section 20, located in its use position, is shown in FIG. 20. This view depicts support 22 attached to C-brackets 177 via pivot pin 194. Support 22 also engages rear tail section 24, illustratively, as shown. It is appreciated that the disclosed configuration of support 22 is illustrative and the present disclosure is not limited to the specific configuration shown herein. Also shown is pivot support bracket 25 that connects to both slideout assembly 41 and pivoting slideout assembly 42. It is further appreciated from this view how mount bracket 27 holds slider 66 of pivoting slideout assembly 42, as well as how pivoting conveyor section 20, when moved in direction 46 to its use position, clears mount bracket 27 so that it may be pivoted downward in direction 56 (see FIG. 19) to its use position. Further, this view demonstrates how slider support 60 is attached to sidewall 34 of cargo area 6 via wall support bracket portions 64, as well as to shelf panel 28. Lastly, this view shows ramp 26, as well as ramp extender 31 located in their retracted stowed positions.

Figure 21:
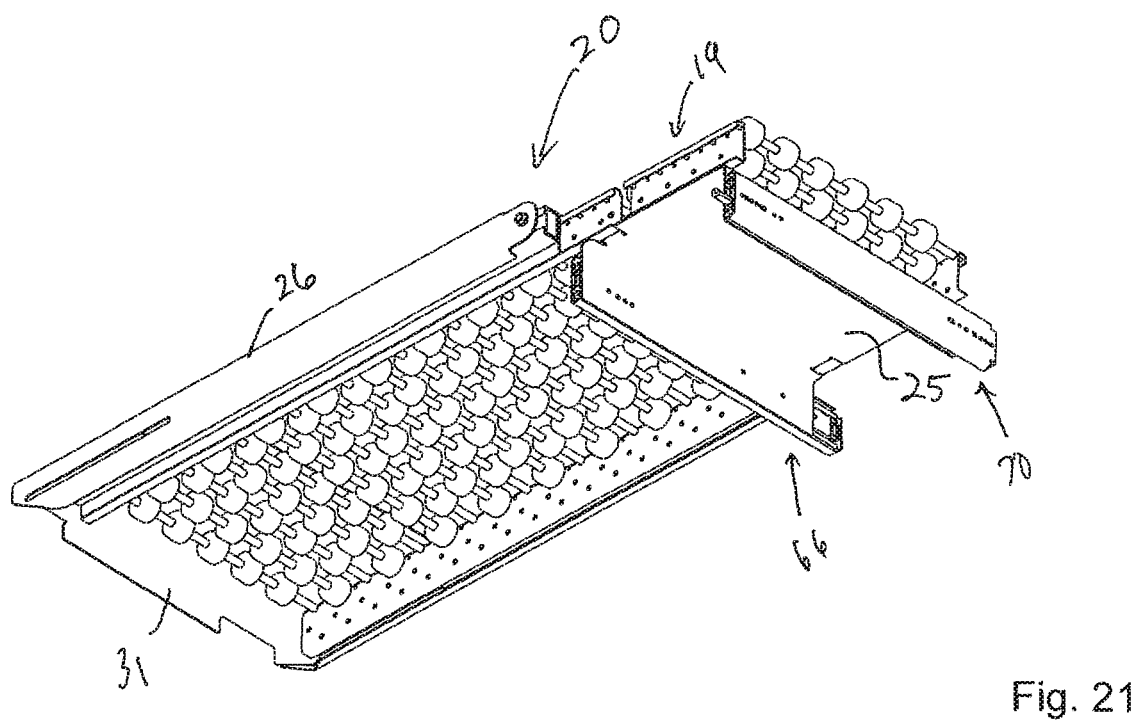
FIG. 21 is a perspective isolated underside detail view of the extension section and pivoting conveyor section.

A perspective underside detail view of extension section 19 and pivoting conveyor section 20, with pivot support bracket 25, is shown in FIG. 21. Although not demonstrably shown within interior 12 of cargo area 6, sliders 66 and 70 are located in their fully retracted position. Also shown in this view is ramp extender 31 retracted within ramp 26. Ramp 26 is also retracted on pivoting conveyor section 20 to its stowed position.

Figure 22:
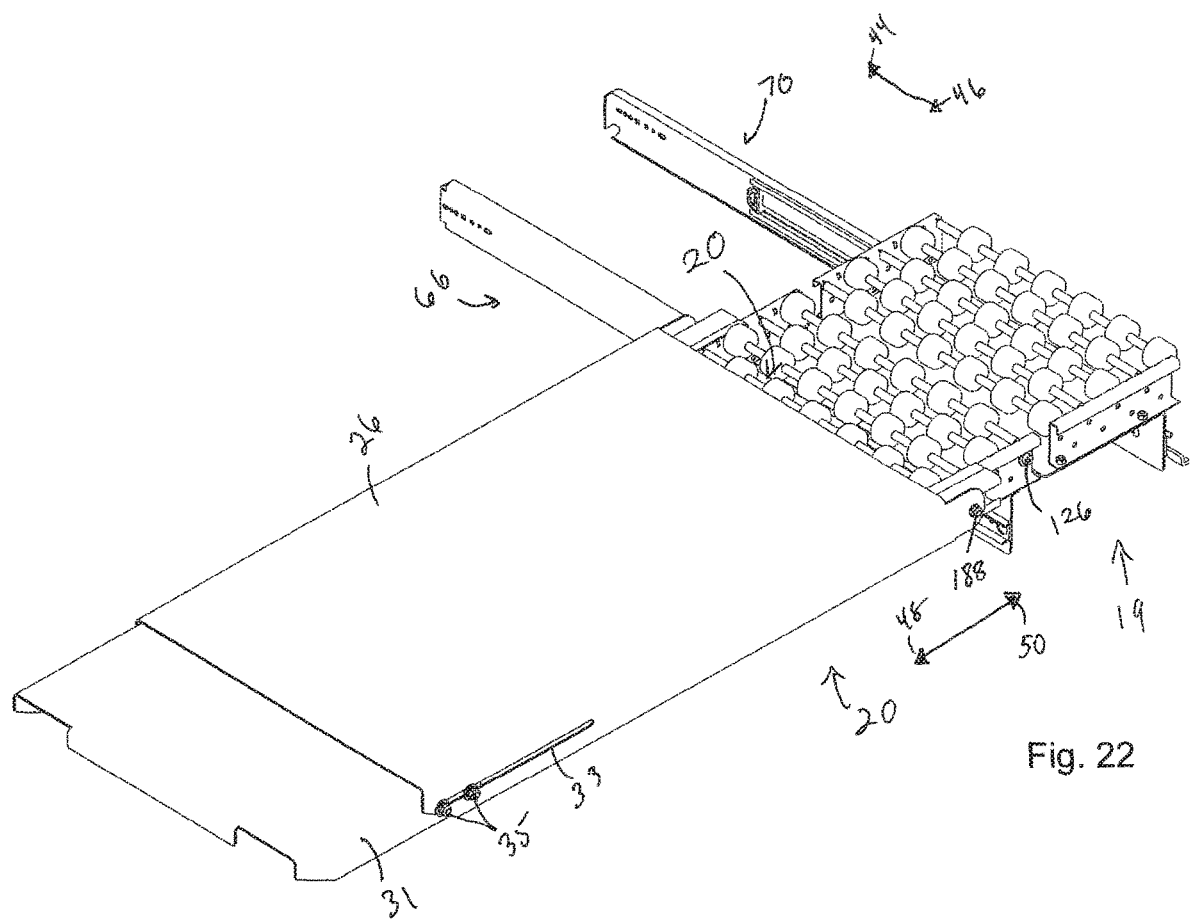
FIG. 22 is a perspective isolated detail view of the extension section and pivoting conveyor section.

A perspective isolated detail view of extension section 19 and pivoting conveyor section 20 is shown in FIG. 22. This view is similar to that shown in FIG. 14 including sliders 66 and 70 extended in direction 46 to a use position (in contrast to that shown in FIG. 21). However, this view differs from that of FIG. 14 in that ramp 26 is partially slid back in direction 50 to its stowed position on pivoting conveyor section 20. In this view, ramp extender 31 is shown moved in direction 48 to its extended use position. Here, with fasteners 35 both attached to ramp extender 31 and located in slot 33, ramp extender 31 is able to move in directions 48 and 50 only to the extent of the length of slot 33. Fasteners 35 may be tightened in order to secure ramp extender 31 at a particular position within ramp 26.

Another illustrative embodiment of pivoting conveyor section 20 may include a latch mechanism configured to positively hold pivoting conveyor section 20 in an upright or essentially vertical stowed position. This pivoting conveyor design omits extension section 19 from the prior embodiment.

Figure 23:
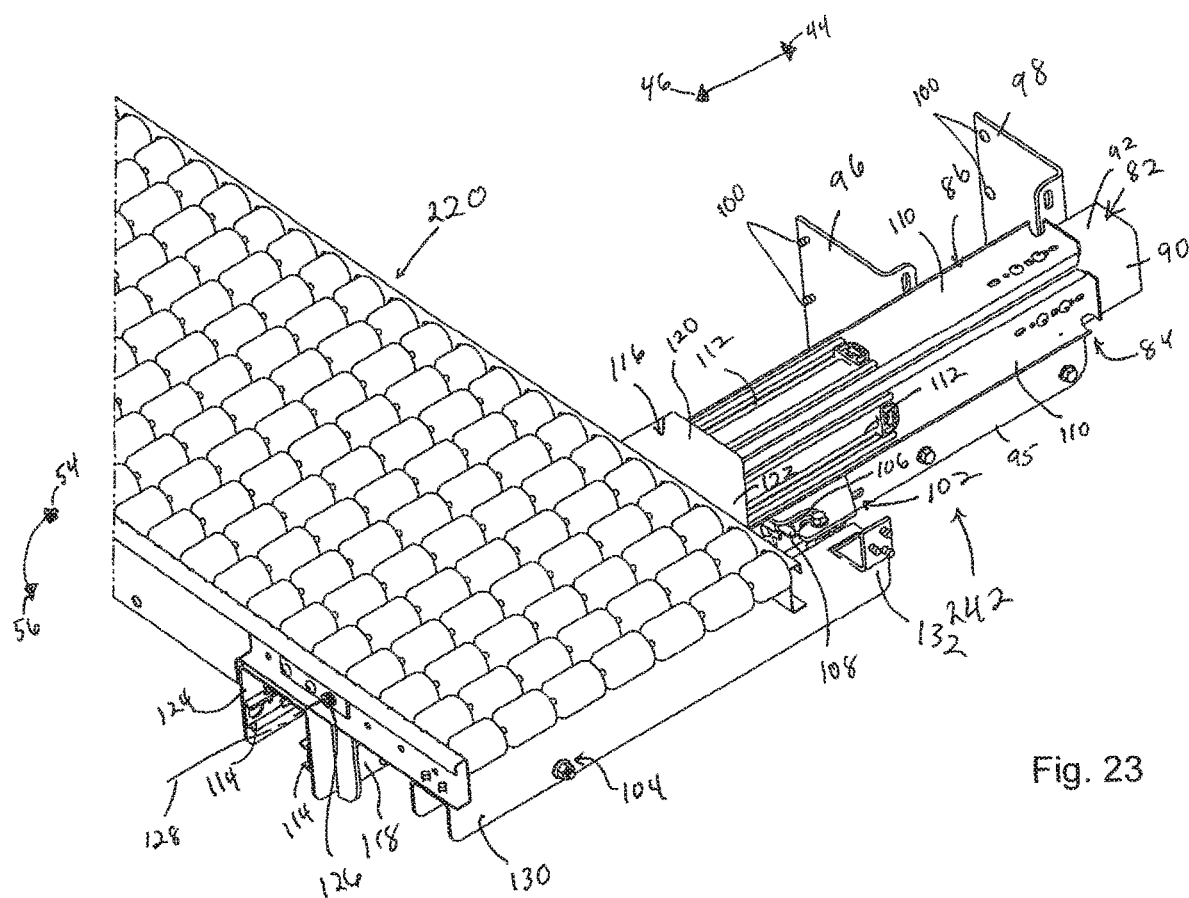
FIG. 23 is an isolated perspective view of another illustrative embodiment of a pivoting conveyor section.

An isolated perspective view of pivoting conveyor section 220, attached to pivoting slideout assembly 242, is shown in FIG. 23. It is appreciated that pivoting conveyor section 220 is movable linearly in both directions 44 and 46, as well as pivotally in directions 54 and 56. This is so pivoting conveyor section 220 may be both pivoted and slid between its stowed and use position. With regard to the sliding function of this embodiment, pivoting slideout assembly 242 is shown attached to pivoting conveyor section 220. Pivoting slideout assembly 242 includes a slider support 82 with a plurality of sliders 84, 86, and 88 (see, also, FIG. 24). In the illustrated embodiment, slider support 82 is illustratively longitudinally extending with a polygonal (e.g., square) cross-action. One of the plurality of sliders 84, 86, and 88 are each placed on one side surface 90, 92, and 94, respectively (see, also, FIG. 24), of slider support 82.

The multiple sliders 84, 86, and 88 are positioned about slider support 82 so pivoting conveyor section 220 may effectively slide along pivoting slideout assembly 242. It is further appreciated that sliders 84, 86, and 88 may be the telescoping sliders of the type previously discussed with respect to slider 66 and second slider 70 that attach to the other conveyor sections. Securement brackets 96 and 98, with fasteners 100 illustratively shown, may attach to studs, sidewalls, end walls, or other structures that line the periphery of interior 12 of cargo area 6. The illustrative securement brackets 96 and 98, as shown, may be configured and dimensioned as needed to secure to cargo area 6, while allowing pivoting conveyor section 220 to slide in directions 44 and 46, as well as pivoting directions 54 and 56. Securement brackets 96 and 98 may have any variety of through holes or bores to assist in aligning slider support 82 to ensure pivoting conveyor section 220 can both pivot to the stowed position and be moved to create linear alignment with the other conveyor section, such as conveyor section 18. Also attached to side surface 90 of slider support 82 is an illustrative pin latch assembly 102. Such pin latch assembly 102 is positioned illustratively as shown in order to capture a pin, such as release pin 104 (see, also, FIG. 27) attached to pivoting conveyor section 220, to hold pivoting conveyor section 220 in an upright stowed position. When use is desired, pin latch assembly 102 may be activated to release pin 104, which allows pivoting conveyor section 220 to be slid in direction 46 to its use position. When returning to its stowed position, pivoting conveyor section 220 may be pivoted upward in direction 54, and then slid linearly in direction 44. Release pin 104 may be positioned to align with opening 106 of pin latch assembly 102 and be secured thereto via latch 108, also part of pin latch assembly 102.

Each of sliders 84, 86, and 88 includes a slider bracket 110, first telescoping member 112, and second telescoping member 114. Illustratively, second telescoping members 114 of sliders 84, 86, and 88 attach to a slide support bracket 116. As further discussed herein, a pivot member bracket 118 is also attached to slide support bracket 116. As shown in the illustrative embodiment, slide support bracket 116 is convexly shaped with a top support panel 120 and depending side panels 122 and 124. This configuration accommodates sliders 84, 86, and 88, as well as the weight of pivoting conveyor section 220. In this embodiment, a pivot pin 126 is disposed through both pivoting conveyor section 220, as well as pivot member bracket 118. Pivot pin 126 forms an axis 128 about which pivoting conveyor section 220 pivots in directions 54 or 56. As a consequence, when in its use position, pivoting conveyor section 220 rests on and is supported by top support panel 120 of slide support bracket 116. Also shown in this view is illustrative channel bracket 130 that receives release pin 104, which is engageable with pin latch assembly 102. Bracket 132 is a stop that is used to prevent the conveyor from sliding inward when extended by dropping into the slot on the channel bracket 130. Bracket 132 is attached to the side of the rearmost slideout assembly 41 (see, also, FIG. 6).

Figure 24:
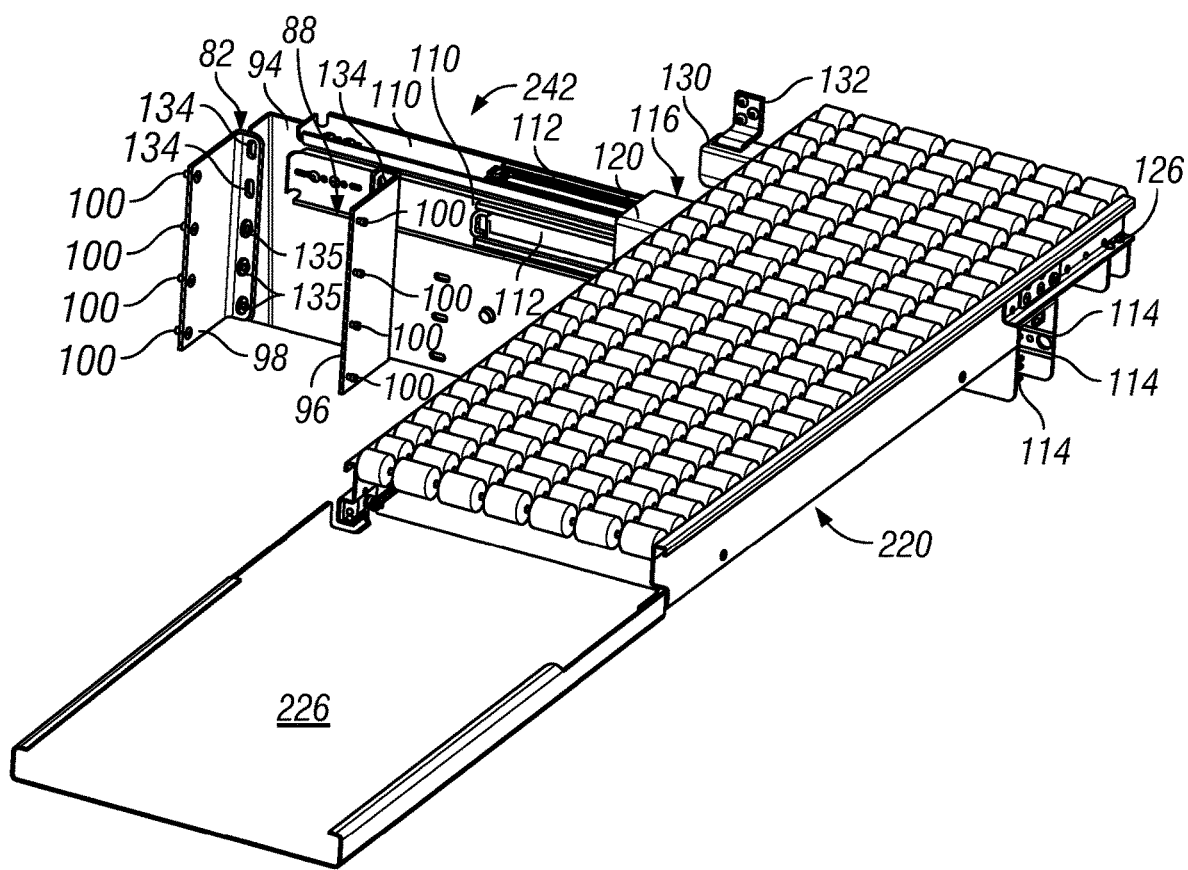
FIG. 24 is an isolated perspective view of the pivoting conveyor section of FIG. 23.

Another isolated perspective view of pivoting conveyor section 220 attached to pivoting slideout assembly 242 is shown in FIG. 24. This view is essentially the reverse of the perspective view shown in FIG. 23. This view in FIG. 24 shows slider 88 attached to side surface 94 of slide support 82. This view also shows securement brackets 96 and 98, along with fasteners 100, used to secure pivoting slideout assembly 242 onto a structure within cargo area 6 of vehicle 2. This view further depicts how securement brackets 96 to 98 may be adjustable onto side surface 94 via various slots 134 and fasteners 135 so proper alignment of pivoting conveyor section 220 can be made with respect to the other conveyor sections. Slide support bracket 116 is shown with pivoting conveyor section 220 being supported by top support panel 120. Slide support bracket 116 is also shown secured to second telescoping member 114 attached to each of sliders 84, 86, and 88. Channel bracket 130 with bracket 132 is further shown in this view, along with pivot pin 126 disposed through pivoting conveyor section 220.

Figure 25:
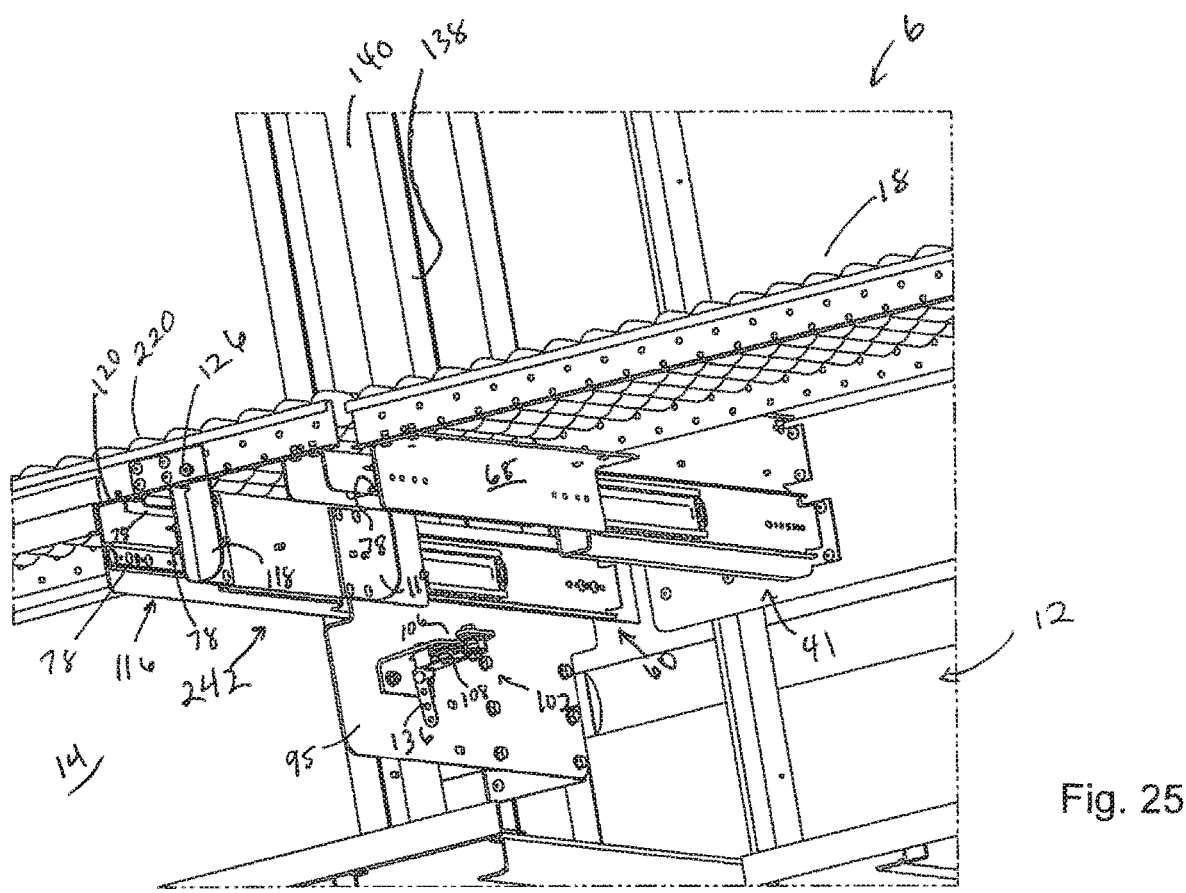
FIG. 25 is a perspective underside view of the interior of the cargo area showing the conveyor section.

A perspective underside view of interior 12 of cargo area 6 showing conveyor section 18, along with pivoting conveyor section 220, both in their use position, is shown in FIG. 25. This view depicts conveyor section 18 attached to conveyor section bracket 68, which is attached to second telescoping member 78 of slideout assembly 41. This view also shows conveyor section 18 located in its extended use position. Aligned with conveyor section 18 is pivoting conveyor section 220. Pivoting slideout assembly 242 supports pivoting conveyor section 220 such that it is an alignment with conveyor section 18, which allows movement of articles in interior 12 of cargo area 6 to be moved along conveyor section 18 and pivoting conveyor section 20 to exterior 14 of cargo area 6. This view further shows side surface 95 depending from pivoting slideout assembly 242. Pin latch assembly 102 is shown attached to side surface 95. Illustratively, it is fastened thereto. In addition to opening 106 and latch 108 of pin latch assembly 102 shown herein, is a latch lever 136 configured to engage latch 108 to move same for disengaging latch 108 with release pin 104 (see FIG. 27). This view also shows how pivoting slideout assembly 242 may be attached to a stud member 138 located on rear wall 140 within interior 12 of cargo area 6. It is appreciated that the structures on slide support 60 may be dimensioned and configured with slots and fasteners to secure same to a variety of structures within interior 12 of cargo area 6 so that pivoting conveyor section 220 may slide in directions 44 and 46, as well as pivot in directions 54 and 56 in order to effectively move pivoting conveyor section 220 between stowed and use positions. Slide support bracket 116, with second telescoping members 78 attached thereto, is shown in its extended position and supporting pivoting conveyor section 220 on top support panel 120. Also shown in this view is pivot member brackets 118 and 119, each of which receive a pivot pin 126 and another pivot pin (not shown) on the other side of pivoting conveyor section 220. This allows pivoting conveyor section 220 to pivot with respect to slide support bracket 116.

Figure 26:
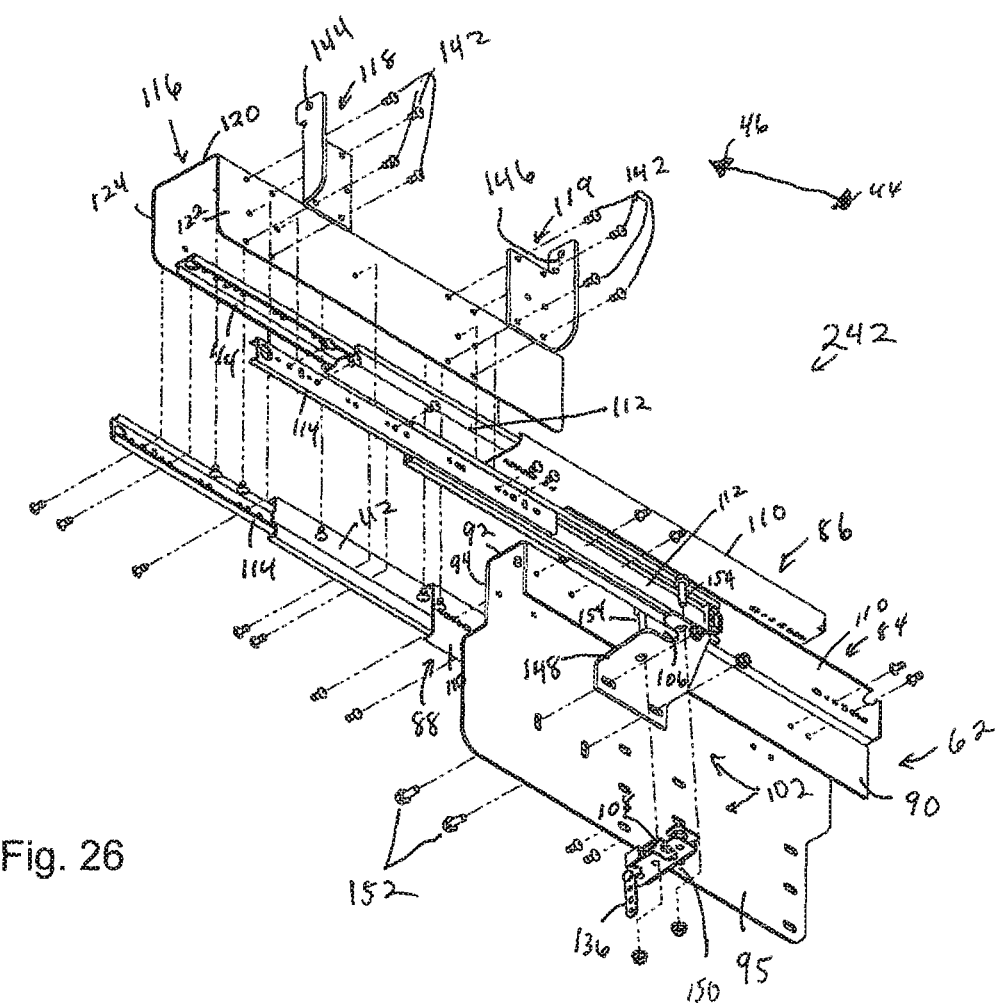
FIG. 26 is a perspective exploded view of the pivoting slideout assembly.

A perspective exploded view of pivoting slideout assembly 242 is shown in FIG. 26. This view depicts the various structures that compose slideout assembly 242. Slider support 60 is shown composed of side surfaces 90, 92, 94, and 95. It can be appreciated from this view, how various slots and fasteners may be disposed through the structures to attach all of the components of pivoting slideout assembly 242 together. Also shown are sliders 84, 86, and 88. Illustratively, they are similar to sliders 66 and 70 as discussed with respect to the slideout assemblies 38, 39, 40, and 41. Sliders 84, 86, and 88 are oriented around sides 90, 92, and 94 of slider support 82 to provide a movable bearing mechanism for pivoting conveyor section 220. This view also depicts, with respect to sliders 84, 86, and 88, how they are composed of slider bracket 110, first telescoping member 112, and second telescoping member 114. Attached to each of the second telescoping members 114 is slide support bracket 116. This convex-shaped bracket illustratively includes separate panels 122, 120, and 124 each configured to fasten onto one of the second telescoping members 114 via fasteners or other fastening-type structures. This means with slider bracket 110 of each of sliders 84, 86, and 88 attached to slider support 60, and slide support bracket 116 attached to second telescoping members 114, slider support bracket 116 is movable in directions 44 and 46 with respect to slider support 60. Also shown in this view are pivot member brackets 118 and 119. They are illustratively attached to depending side panel 122 via fasteners 142. Pivot member bracket 118 includes bore 144 and pivot member bracket 119 includes bore 146. Each of bores 144 and 146 are sized to receive a pivot pin such as pivot pin 126 (see, also, FIG. 13) that is also attached to pivoting conveyor section 220 to pivot in directions 54 and 56 with respect to slide support bracket 116. This movement, in combination with the linear sliding movement in directions 44 and 46, allows pivoting conveyor section 220 to move between stowed and use positions.

The view in FIG. 26 also shows pin latch assembly 102 composed of a pin latch bracket 148 and a pin latch mechanism 150. Pin latch bracket 148 attaches to side surface 95 via fasteners 152. Pin latch mechanism 150 is attached to pin latch bracket 148 via fasteners 154. Pin latch mechanism 150 includes latch 108 that aligns with opening 106 and pin latch bracket 148. Latch lever 136 is attached to pin latch mechanism 150 and acts on latch 108 to move same for purposes of releasing release pin 104.

Figure 27:
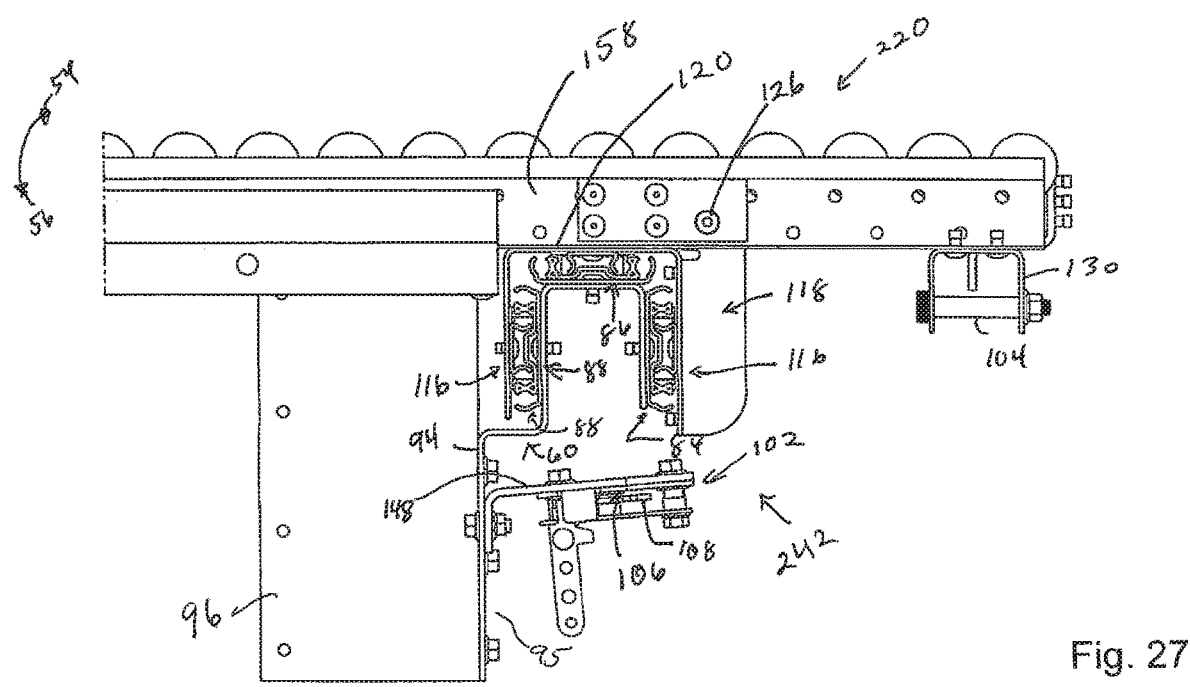
FIG. 27 is a side view of the pivoting slideout assembly attached to the pivoting conveyor section.

A side view of pivoting slideout assembly 242 attached to pivoting conveyor section 220 is shown in FIG. 27. In this view, rail bracket 158 of pivoting conveyor section 220 is shown resting on top support panel 120 of slider support bracket 116. This view further illustrates how sliders 84, 86, and 88 are attached to both slide support 60, as well as slide support bracket 116. Also shown in this view is release pin 104 that is attached to channel bracket 130, which is attached to rail bracket 158 (as well as rail bracket 156). Release pin 104 is positioned so that it will enter opening 106 of pin latch bracket 148 and engage latch 108 of pin latch assembly 102. This occurs when pivoting conveyor section 220 is located in its upright and stowed position. Also shown is pivot member bracket 118 with pivot pin 126 disposed through both rail bracket 158 and disposed through bore 144 of pivot number bracket 118 (see, also, FIG. 26). It is pivot pin 126, that pivoting conveyor section will pivot on in directions 54 and 56 to move pivoting conveyor section 220 between stowed and use positions. Further shown is securement bracket 96, which is attached to side surface 94 of slider support 60 to secure to a structure in interior 12 of cargo area 6.

Figure 28:
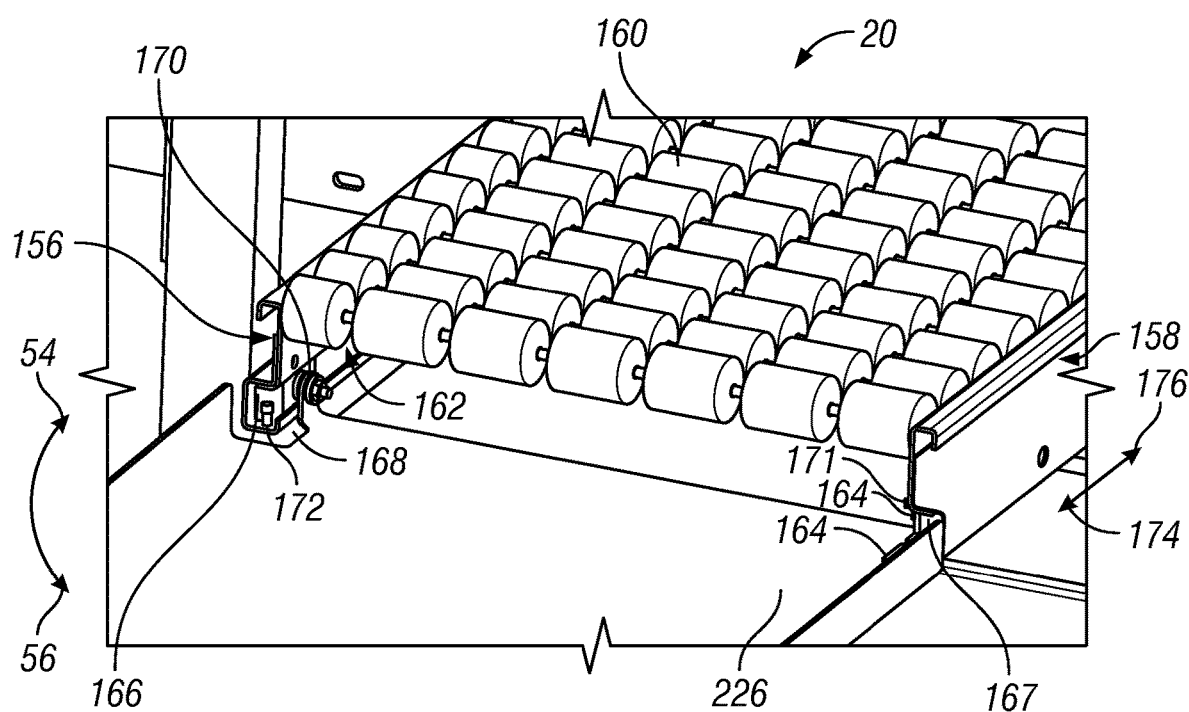
FIG. 28 is an isolated perspective detail view of the pivoting conveyor section.

An isolated detail perspective view of pivoting conveyor section 220, with ramp 226 extending therefrom, is shown in FIG. 28. This view further shows rail brackets 156 and 158 supporting illustrative rollers 160, which make up the bearing conveyor surface for pivoting conveyor section 220. Illustratively, the rollers are independently rotatable with respect to each other to allow articles such as parcels to be slid along same to move those parcels in and out of cargo area 6. Additionally, each of rail brackets 156 and 158 includes an interior track 162 and 164. As shown with respect to interior track 162, a block 166 may fit therein. A tab 168 extends laterally from ramp 226 and pivotally fastens to block 166 via pivot fastener 170. A stop 172 fits adjacent to the end of interior track 162, as shown, to limit the extent of travel of block 166 along interior track 162. It is appreciated that a block 167, tab 169, and pivot fastener 171 may be comparable components on the other side of ramp 226 opposite rail bracket 156 as shown. In this configuration, ramp 226 has the ability to also pivot in directions 54 and 56 to allow ramp 226 to provide a bridge between pivoting conveyor section 220 and a surface exterior of cargo area 6. Ramp 226 has the flexibility to be pivoted at any variety of angles with respect to pivoting conveyor section 220 to accomplish this positioning. It is also appreciated that ramp 226 is movable in directions 48 and 50 along interior track 162 and 164 to establish its own use and stowed positions with respect to pivoting conveyor section 220.

Figure 29:
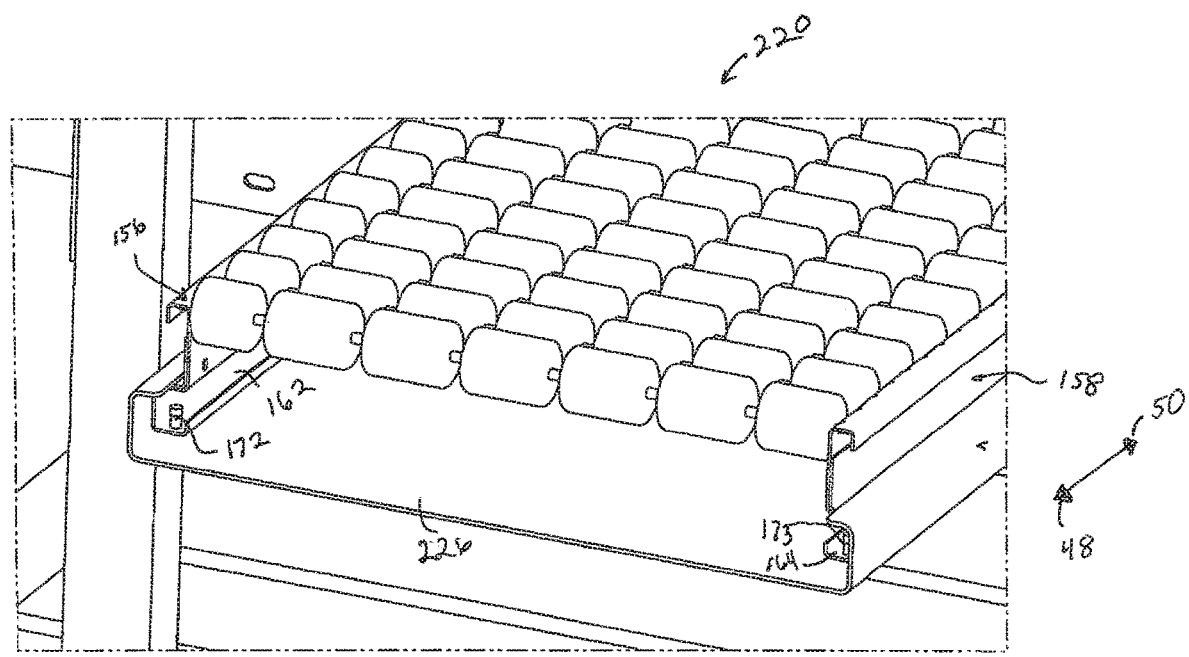
FIG. 29 is another perspective detail view of the pivoting conveyor section.

A perspective detail view of pivoting conveyor section 220 is shown in FIG. 29. This view depicts ramp 226 retracted in direction 50 so it does not extend from pivoting conveyor section 220. In this position, ramp 226 is moved out of the way in its stowed position to allow pivoting conveyor section 220 to pivot in direction 54 towards its stowed position. Gravity can maintain ramp 226 in its retracted stowed position and moved in direction 50. Also shown in this view are stops 172 and 173, and interior tracks 162 and 164, respectively. It is also appreciated that the sides of ramp 226 may be so shaped to enable it to slide underneath pivoting conveyor section 220 as illustratively shown.

Figure 30:
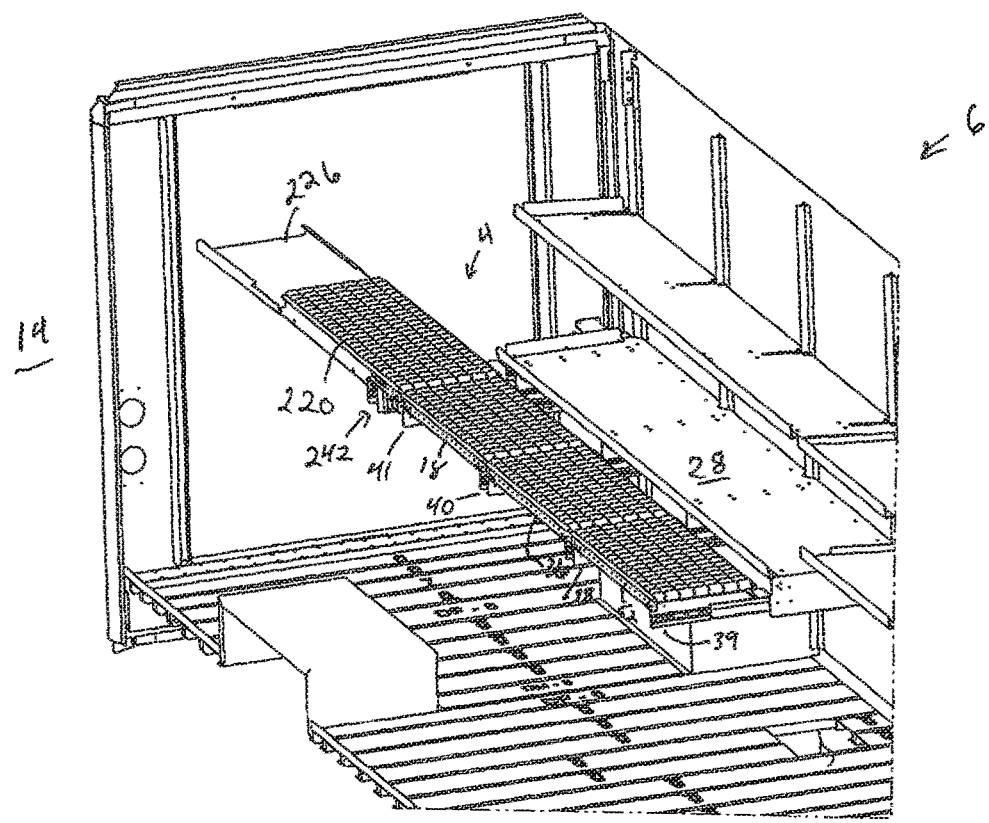
FIG. 30 is a rearward looking partially cut away perspective view of the cargo area showing the pivoting conveyor section located in its use position.

A rearward looking partially cut away perspective view of cargo area 6 is shown in FIG. 30. This view depicts conveyor assembly 4 with all of its sections 18, 36, 52, and pivoting conveyor section 220 located in their use positions. Ramp 226 is also shown extending from the end of pivoting conveyor section 220 exterior 14 of cargo area. 6.

Figure 31:
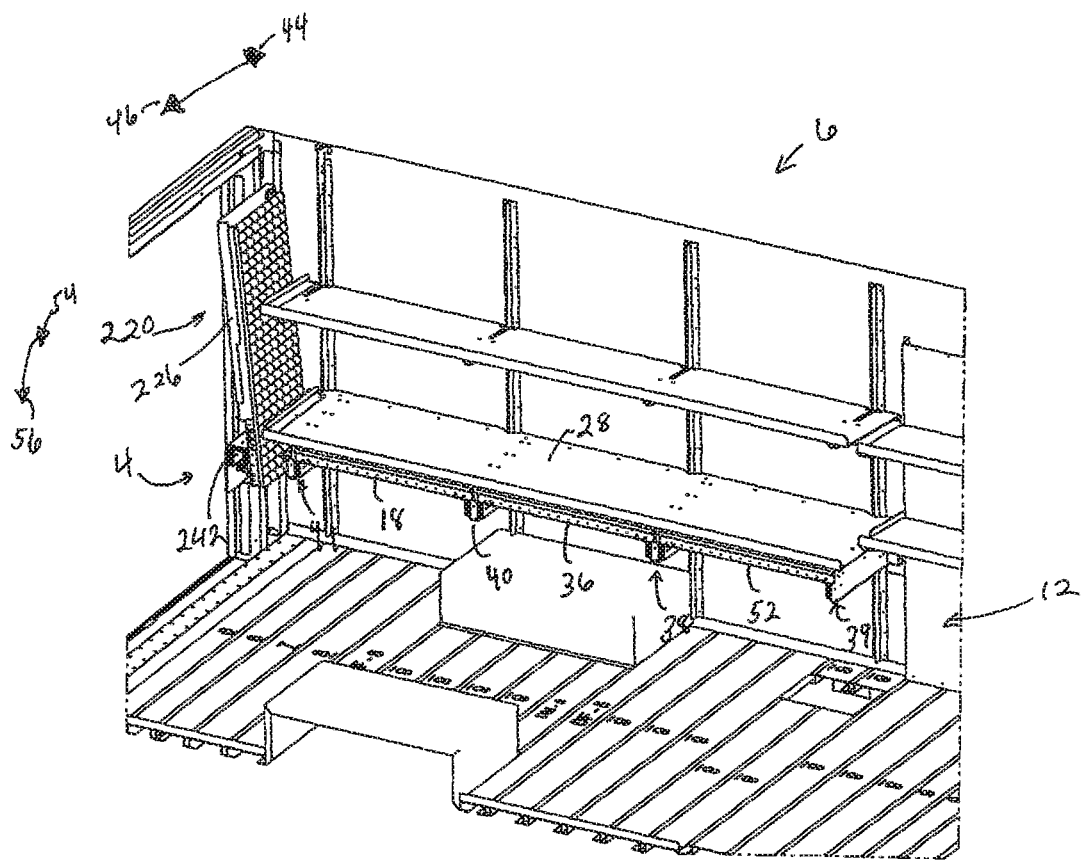
FIG. 31 is a side looking partially cut away perspective view of the cargo area showing the conveyor section located in its use position.

The perspective view in FIG. 31 depicts conveyor assembly 4 in its stowed position. Here, pivoting conveyor section 220 is pivoted upward in direction 54 and slid in direction 44 with the assistance of pivoting slideout assembly 242 to be positioned out of the way. Likewise, conveyor sections 18, 36, and 52 have also been moved in direction 44 to be positioned under shelf panel 28. This also keeps these conveyor sections out of the way in interior 12 of cargo area 6. It is appreciated that the less intrusive conveyor assembly 4 can be the more vehicle 2 may operate essentially as normal and carry substantially the same number of articles while maintaining this on board conveyor assembly.

Figure 32:
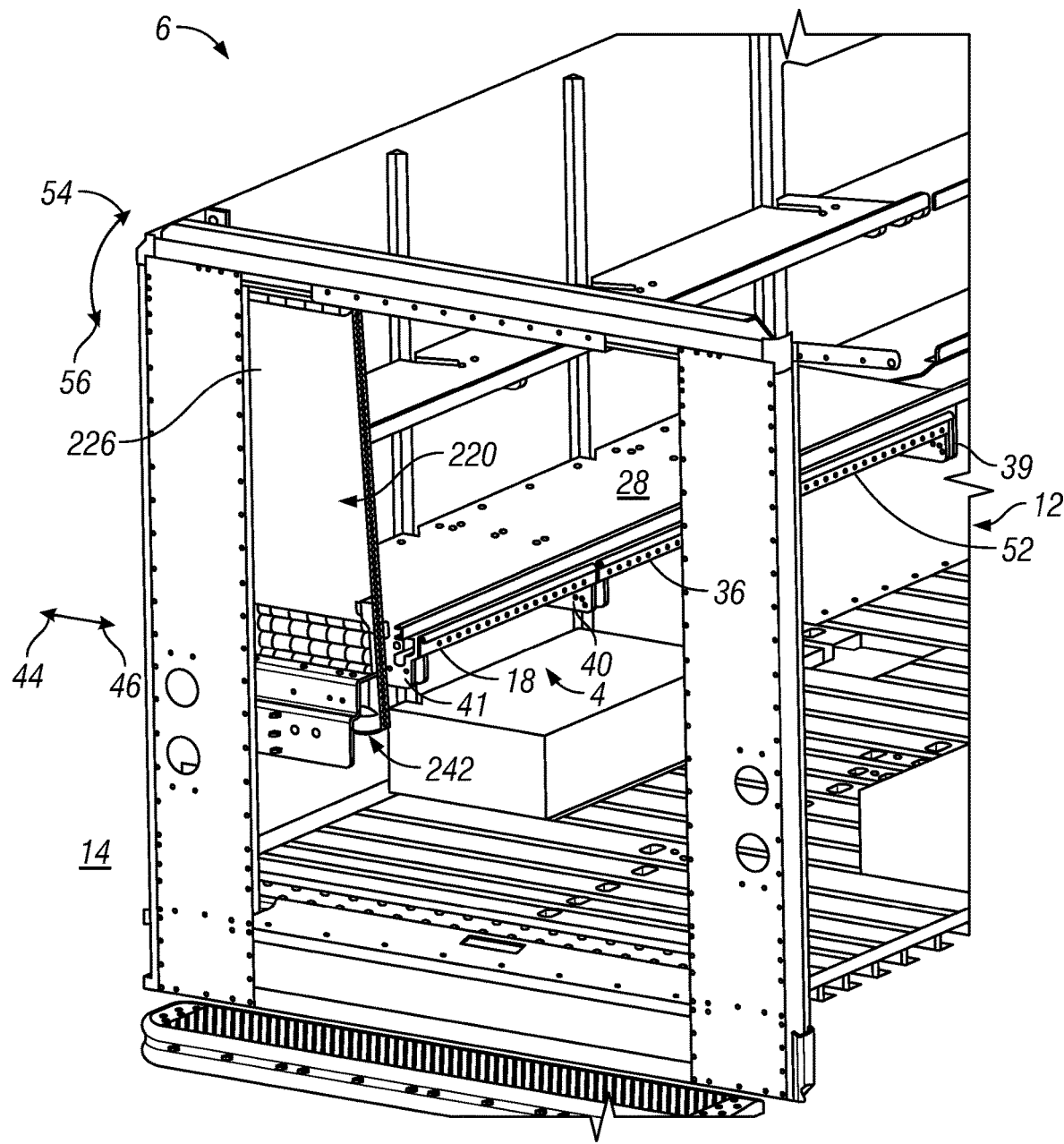
FIG. 32 is a rear partially cut away perspective view of the interior of the cargo area.

A similar rear partially cut away perspective view of interior 12 of cargo area 6 is shown in FIG. 32. In this view, pivoting conveyor section 220 is shown moved to its stowed position. Illustratively, this stowed position includes moving conveyor sections 18, 36, and 52 in direction 44 underneath shelf panel 28 via slideout assemblies 38, 39, 40, and 41. It is appreciated by this view how moving pivoting conveyor section 220 in direction 54 to its stowed position keeps same appreciably out of the way to allow normal operation within interior 12 of cargo area 6. Yet, having the ability to pivot downward in direction 56 and slid in direction 46, pivoting conveyor section 220 may join the other conveyor sections, as well as extend exterior 14 of cargo area 6. As further shown herein, pivoting conveyor section 220 pivots on pivoting slideout assembly 242.

Another illustrative embodiment of the present disclosure provides a conveyor assembly that includes a reinforced pivoting conveyor section. Aspects of this illustrative embodiment include having a reinforced slideout bracket assembly, pull down feature, roller panels, and other features as described herein. All of these features may be employed collectively with or independently of the other conveyor assembly embodiments disclosed herein.

Figure 33:
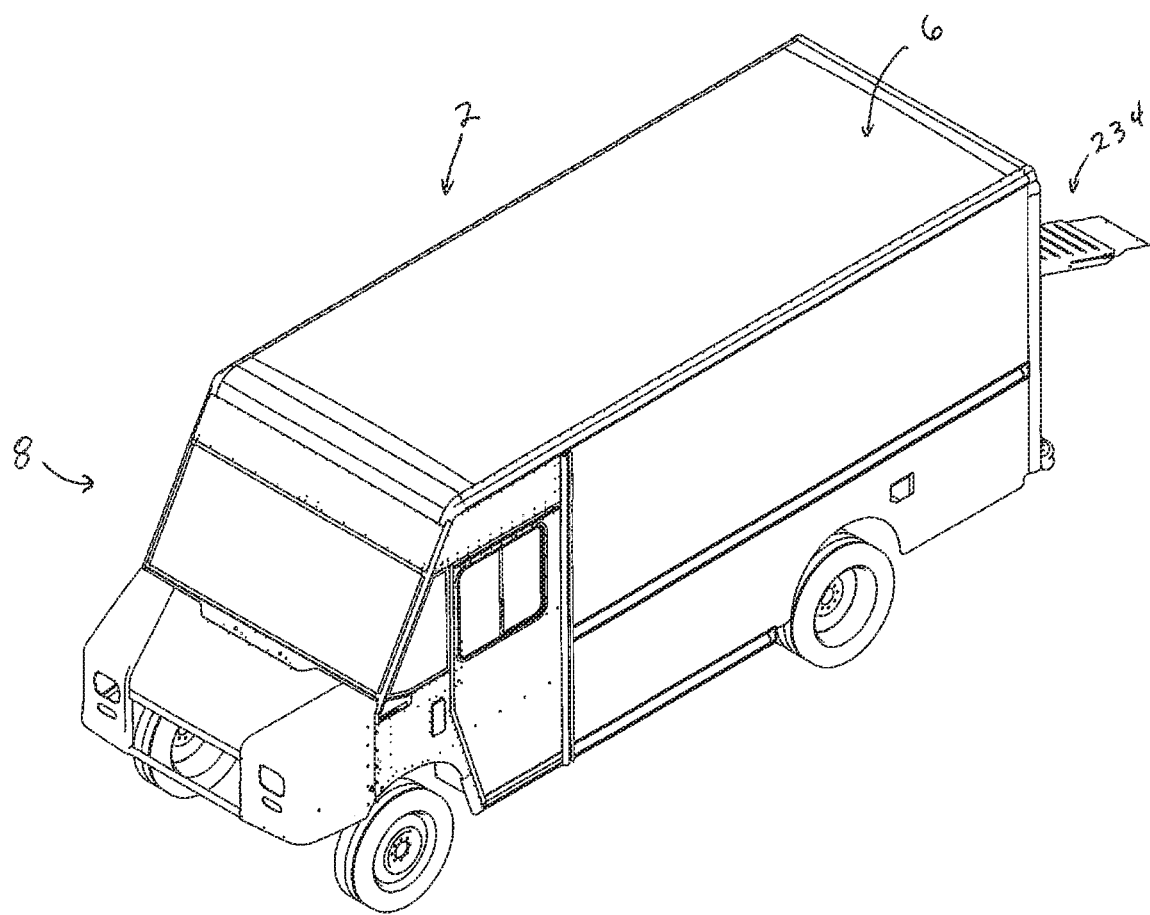
FIG. 33 is a front perspective view of a delivery/cargo vehicle.

A front perspective view of vehicle 2, with this illustrative embodiment of reinforced conveyor assembly 234 extending from the rear of cargo area 6, adjacent cab section 8 of vehicle 2, is shown in FIG. 33. Like conveyor assembly 4, a portion of reinforced conveyor assembly 234 may extend outside of vehicle 2 in order to assist moving articles either out of or into cargo area 6. It is appreciated with such an assembly being part of vehicle 2, transfer between the vehicle and exterior thereof may be made more efficiently.

Figure 34:
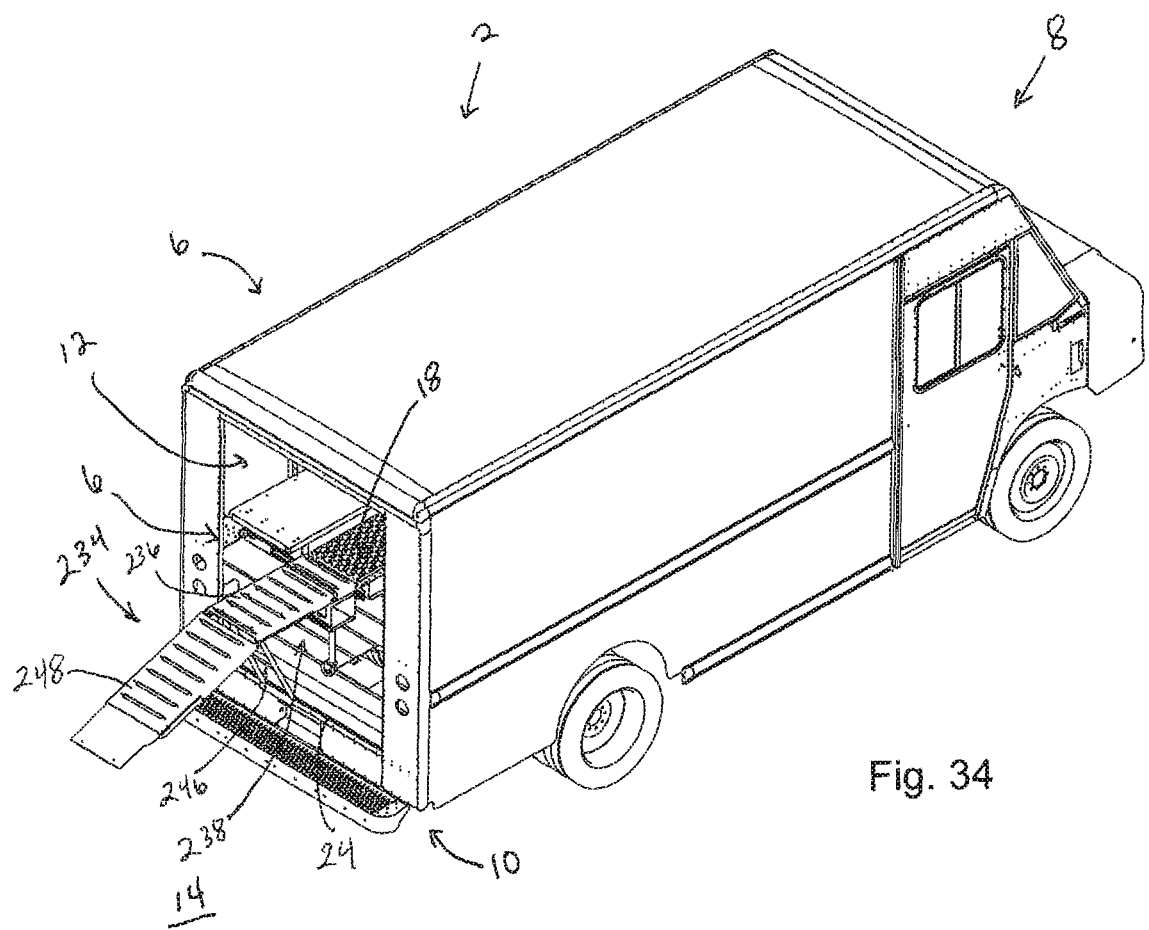
FIG. 34 is a rear perspective view of the delivery/cargo vehicle showing another illustrative embodiment of a conveyor assembly that is extending from the rear of the cargo area.

A rear perspective view of vehicle 2, showing reinforced conveyor assembly 234 extending from rear 10 of cargo area 6, is shown in FIG. 34. Like conveyor assembly 4, this view depicts reinforced conveyor assembly 234 extending from interior 12 of cargo area 6 to exterior 14. This allows articles to be moved into and out of cargo area 6. Reinforced conveyor assembly 234 extends through opening 16 at rear 10 of cargo area 6. As shown, conveyor section 18 is located within interior 12 of cargo area 6. It is located adjacent to and aligned with pivoting panel conveyor section 236 of reinforced pivoting conveyor section 238 that extends from interior 12 to exterior 14 of cargo area 6. As shown, an illustrative support 246 engages both pivoting panel conveyor section 236 and rear tail section 24 in order to provide support to reinforced pivoting conveyor section 238. Also shown in this view is panel ramp 248 extending from pivoting conveyor section 20 at exterior 14 from cargo area 6. Illustratively, ramp 26 may be pivotable with respect to reinforced pivoting conveyor section 238. Additionally, panel ramp 248 may be slid or otherwise moved on to pivoting panel conveyor section 236 (see, also, FIGS. 49, 50, 51, and 52) so reinforced conveyor assembly 234 may be more easily stowed in limited space.

Figure 35:
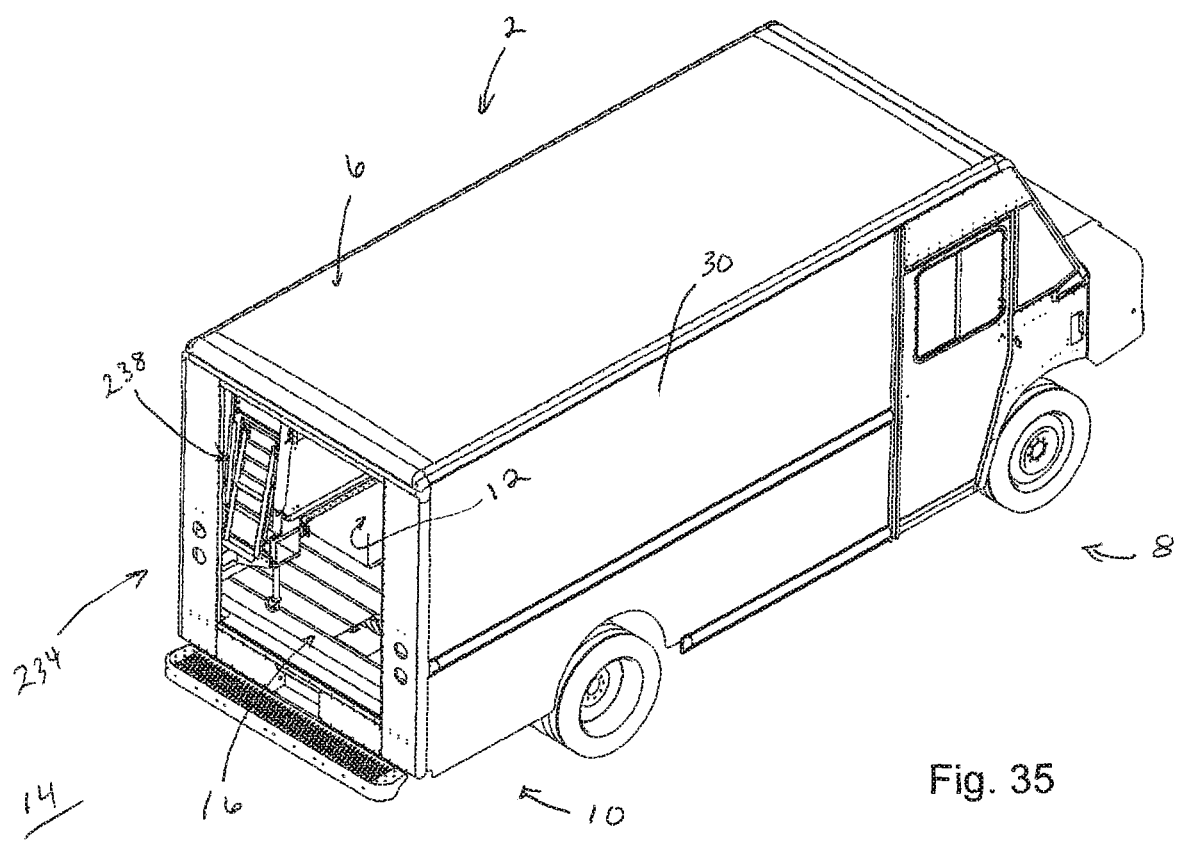
FIG. 35 is another rear perspective view of the vehicle showing the conveyor section pivoted to its folded stowed position.

To that end, another rear perspective view of vehicle 2 is shown in FIG. 35. This view depicts reinforced pivoting conveyor section 238 in the folded stowed position within interior 12 of cargo area 6. As shown, reinforced pivoting conveyor section 238 is illustratively folded upward from its original use position. Also, panel ramp 248 may be moved onto pivoting panel conveyor section 236, as shown herein. It is appreciated from this view how reinforced pivoting conveyor section 238 may be moved and stowed on board vehicle 2 in cargo area 6 in such a way as not to interfere with the operation or use of cargo area 6. Again, it is appreciated that by moving reinforced conveyor assembly 234 to a stowed position, it is out of the way so as to allow normal operation and use of cargo area 6. It is still further appreciated that, when in its stowed position, reinforced conveyor assembly 234 is located within interior 12 of cargo area 6. As this embodiment shows, reinforced pivoting conveyor section 238, while in its stowed position, does not extend to exterior 14 rear of vehicle 2. An embodiment of reinforced pivoting conveyor section 238 may alternatively extend perpendicular to the length of cargo area 6 and extend out from sidewall 30 of cargo area 6. It is for explanatory purposes that reinforced conveyor assembly 234 is shown oriented to exit opening 16 at rear 10 of cargo area 6.

Figure 36:
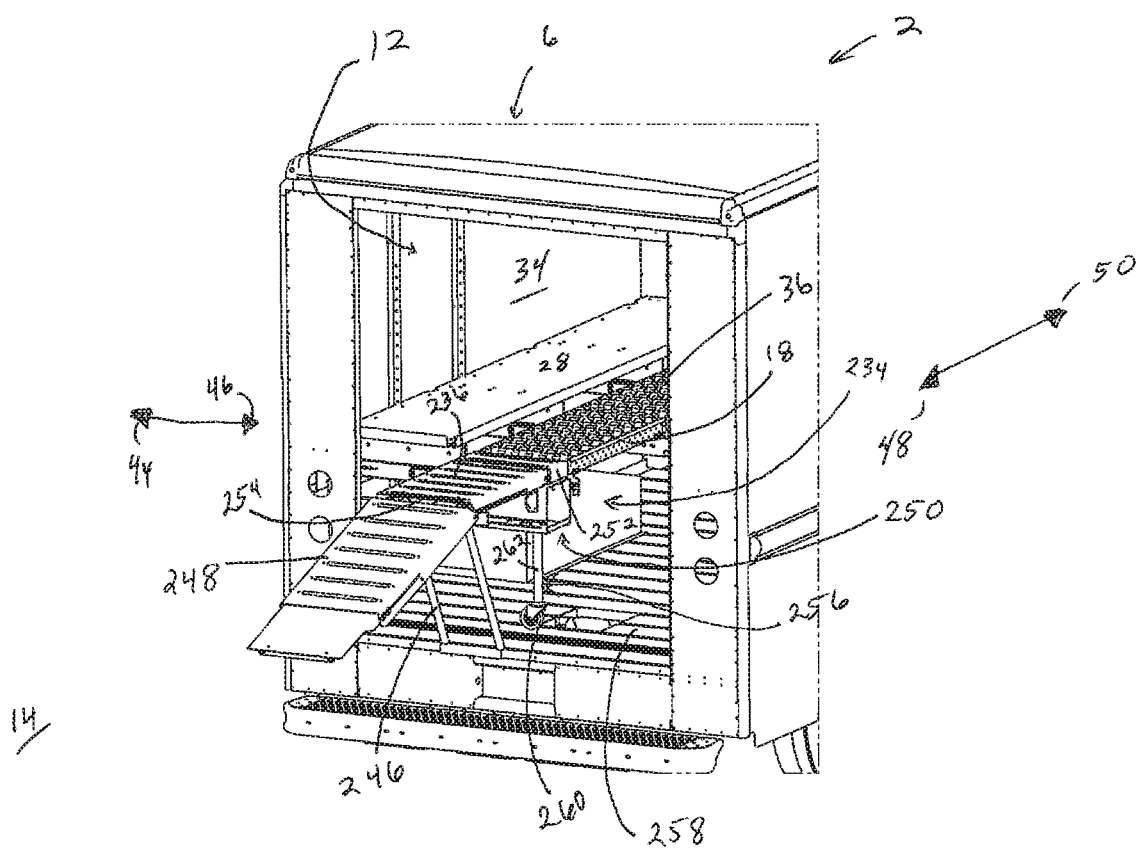
FIG. 36 is a rear partially cut away perspective view of the cargo area portion of the delivery/cargo vehicle.

A rear partially cut away perspective view of the cargo area 6 portion of vehicle 2 is shown in FIG. 36. This view further illustrates how reinforced conveyor assembly 234 is fitted into interior 12 of cargo area 6. As shown, shelf panel 28 is spaced apart on sidewall 34 of cargo area 6. Reinforced conveyor assembly 234 is illustratively positioned just under shelf panel 28, for example, so that articles may be moved along illustrative reinforced pivoting conveyor section 238, conveyor section 18, and conveyor section 36, as shown. Having reinforced conveyor assembly 234 positioned within interior 12 allows articles to be easily slid along conveyor assembly 4 either to place onto or off of shelf panel 28 and slid out of cargo area 6.

In addition to the advantages of having reinforced pivoting conveyor section 238 located in proximity of shelf panel 28, reinforced pivoting conveyor section 238 also includes slideout assembly 250. This slideout assembly 250 is configured to laterally move reinforced conveyor assembly 234 in directions 44 and 46 between stowed and use positions, respectively. Sliding reinforced pivoting conveyor section 238 in direction 44 moves same underneath shelf panel 28 to a stowed position out of the way in interior 12 of cargo area 6. This stowed position means reinforced pivoting conveyor section 238 does not occupy significant space within cargo area 6, which allows the area of that space to be used as normal. Conversely, reinforced pivoting conveyor section 238 may be pulled out in direction 46 to its use position as shown in FIG. 36, which allows articles to be moved along same in directions 48 and 50, so the articles may be either loaded onto or removed from cargo area 6.

Reinforced pivoting conveyor section 238 further includes extension section 252, which is an illustrative non-pivoting conveyor section (similar to section 19) that is also in line with conveyor section 18. Extension section 252 is a short section of illustratively non-pivoting conveyors that may fill in the distance between conveyor section 18 and pivoting panel conveyor section 236. As shown, reinforced pivoting conveyor section 238 is pivotable with respect to extension section 252. Extension section 252, with pivoting panel conveyor section 236, is movable in directions 44 and 46 via slideout assembly 250. Support 246 is pivotally mounted on pivoting panel conveyor section 236 and selectively engages rear tail section 24 in order to provide support to reinforced pivoting conveyor section 238. Like the prior embodiment, support 246 holds end 254 of pivoting panel conveyor section 236 upright to exterior 14 of cargo area 6. Panel ramp 248 extends from pivoting panel conveyor section 236 also exterior 14 from cargo area 6.

Illustratively part of reinforced pivoting conveyor section 238 of reinforced conveyor assembly 234 is support leg assembly 256. In order to support reinforced pivoting conveyor section 238, support leg assembly 256, as illustratively shown, supports slideout assembly 250 and engages flooring 258. Illustratively a wheel or caster 260, or other bearing member or surface, may be coupled to a rod 262 of support leg assembly 256. In this configuration, the slideout assembly for the supporting reinforced pivoting conveyor section 238 may move laterally in directions 44 and 46 with support leg assembly 256 supporting the structure during this movement. By supporting reinforced pivoting conveyor section 238 in this way, there is also a decreased likelihood of sagging or wear on these structures when supporting parcels outside of delivery vehicle 2.

Support leg assembly 256 is shown herein moved in direction 44 from the use position, shown in FIG. 36, to support reinforced pivoting conveyor section 238 while in its stowed position, as shown. It will be appreciated by the skilled artisan upon reading the present disclosure that, as reinforced pivoting conveyor section 238 is moved in either direction 44 or 46, caster 260 attached to rod 262 maintains support and stability.

Figure 37:
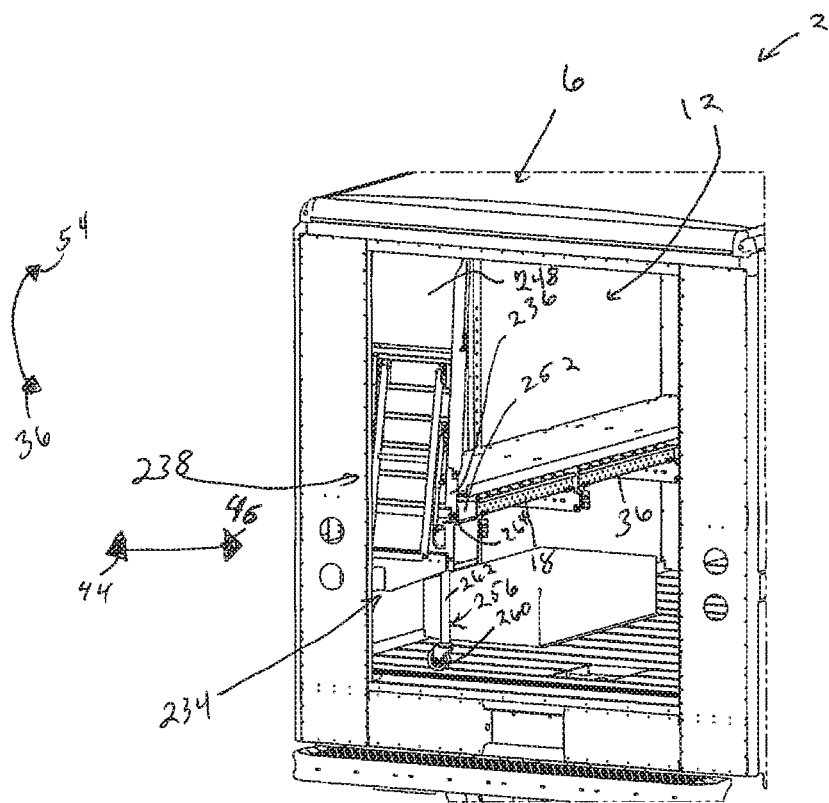
FIG. 37 is another rear partially cut away perspective view of the cargo area portion of the delivery/cargo vehicle.
Figure 38:
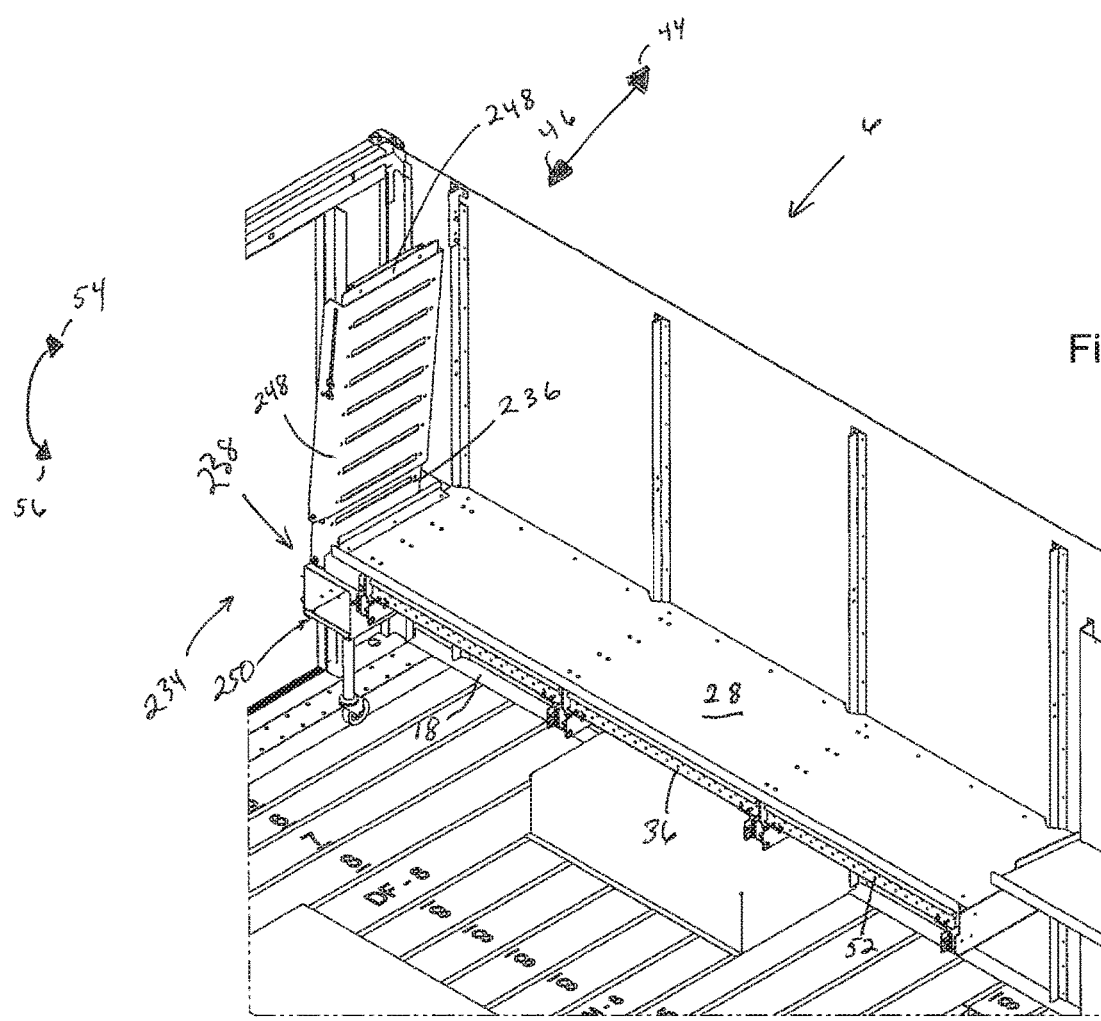
FIG. 38 is a partially cut away side interior perspective view of the cargo area of the delivery/cargo vehicle.

Another similar rear partially cut away perspective view of interior 12 of cargo area 6 is shown in FIG. 37. This view is the same as that shown in FIG. 36, except reinforced pivoting conveyor section 238 of reinforced conveyor assembly 234 is shown moved to its stowed position. This view shows reinforced pivoting conveyor section 238 in its folded and retracted stowed position similar to conveyor sections 18 and 36. It is appreciated by this view how moving reinforced pivoting conveyor section 238 in direction 54 to its stowed position keeps same appreciably out of the way to allow normal operation within interior 12 of cargo area 6. Yet, having the ability to pivot downward in direction 56 and slid in direction 46, reinforced pivoting conveyor section 238 may join the other conveyor sections, as well as extend exterior 14 of cargo area 6.

In addition, reinforced pivoting conveyor section 238 is shown pivoted adjacent extension section 252 to its stowed position. Pivoting panel conveyor section 236 is pivotally mounted at a pivot point 264. This allows pivoting panel conveyor section 236 to be folded and stowed. In contrast to FIG. 36, Panel ramp 248 in FIG. 37 is shown retracted onto pivoting panel conveyor section 236 to stow panel ramp 248 away.

Partially cut away side interior perspective views of cargo area 6 are shown in FIGS. 38, 39, 40, and 41. These views demonstrate the progression of moving reinforced pivoting conveyor section 238 from its stowed position to its use position. The view in FIG. 38, for example, depicts reinforced pivoting conveyor section 238 in its stowed position. Here, pivoting panel conveyor section 236 is pivoted upward in direction 54 and slid in direction 44 with the assistance of slideout assembly 250 to be positioned out of the way similar to that shown in FIG. 37. Likewise, conveyor sections 18, 36, and 52 have also been moved in direction 44 to be positioned under shelf panel 28. Like conveyor assembly 4, it is appreciated that reinforced conveyor assembly 234 is less intrusive, which means vehicle 2 may operate essentially as normal and carry substantially the same quantity of articles while maintaining this on board conveyor assembly. It is further appreciated that these conveyor sections may be moved in directions 44 and 46 by being slid out in similar fashion to that of the other embodiments. This allows an operator to move only those conveyor sections needed for a particular operation to be used. It also makes moving reinforced pivoting conveyor section 238 between stowed and use positions easier. Ramp 248 is shown slid onto pivoting panel conveyor section 236 to a stowed position.

Figure 39:
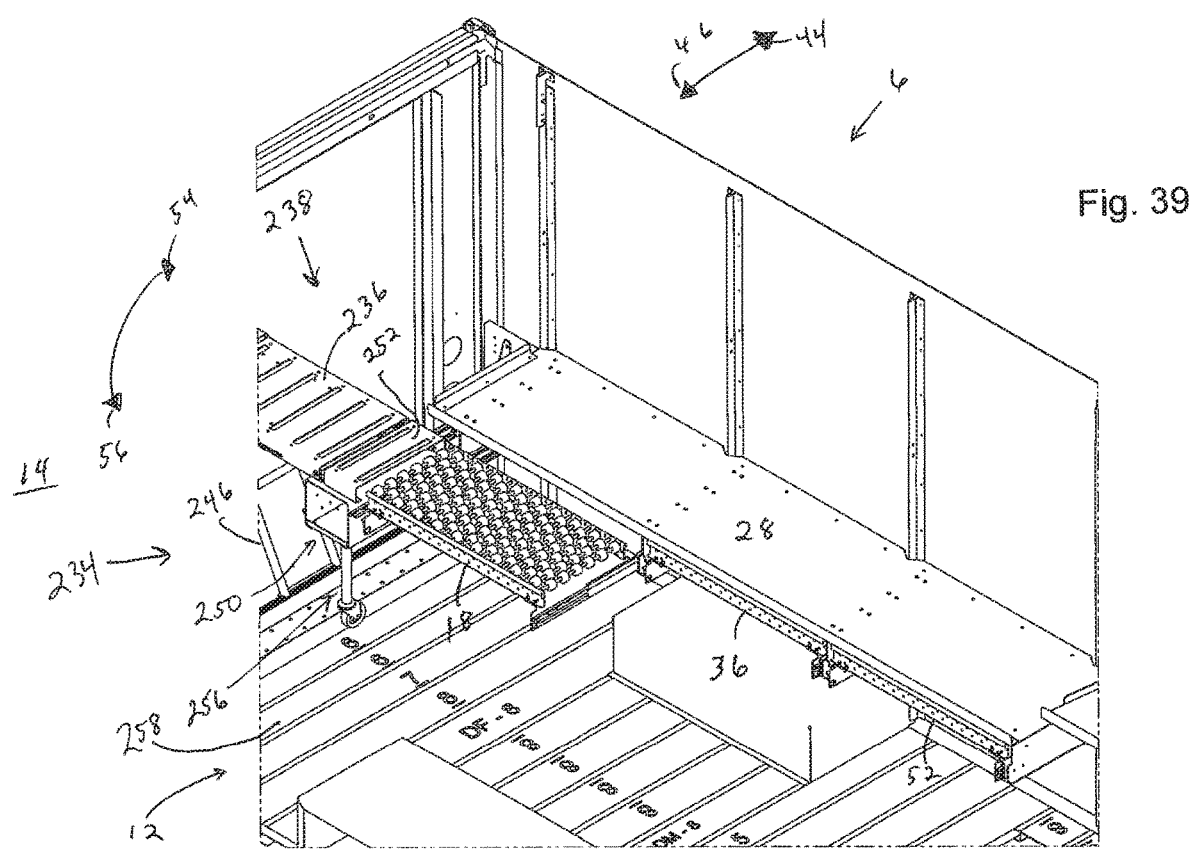
FIG. 39 is another partially cut away side interior perspective view of the cargo area of the delivery/cargo vehicle.

The view in FIG. 39 depicts the progression of moving reinforced conveyor assembly 234 to its use position. As shown, reinforced pivoting conveyor section 238 has been pivoted downward in direction 56, as well as slid in direction 46 to extend level and bridge between interior 12 of cargo area 6 and exterior 14. Also shown in this view is reinforced pivoting conveyor section 238 moved in direction 46 to its use position on slideout assembly 250. It is further appreciated from this view how support leg assembly 256 rolls along flooring 258 supporting slideout assembly 250 and, thus, reinforced pivoting conveyor section 238. The view in FIG. 39 also depicts conveyor sections 36 and 52 maintained in their stowed positions.

Figure 40:
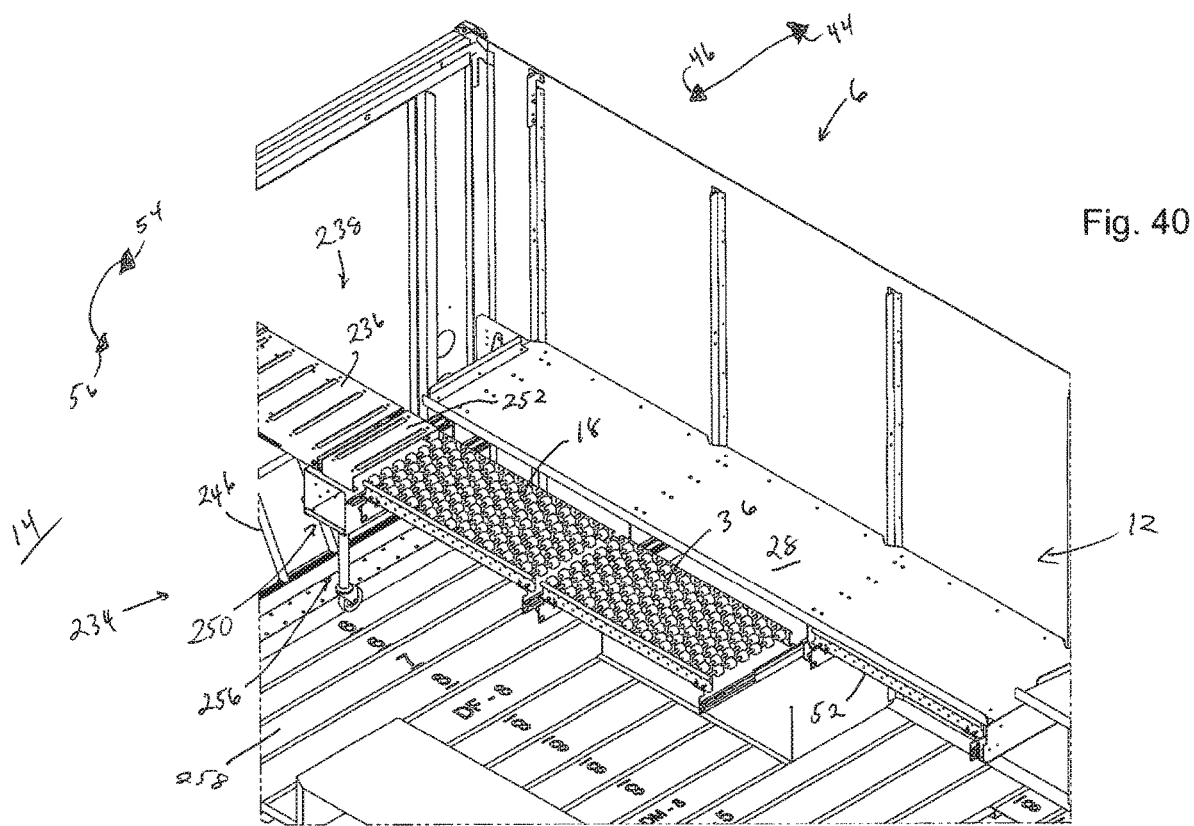
FIG. 40 is another partially cut away side interior perspective view of the cargo area of the delivery/cargo vehicle.

The view in FIG. 40 further demonstrates the progression of moving conveyor assembly 4 to its use position. As shown, conveyor section 18, extension section 252, and pivoting panel conveyor section 236 are already located in their use position as previously discussed with respect to FIG. 39. Here, in FIG. 40, however, conveyor section 36 is now also slid in direction 46 to its use position (similar to that shown in FIG. 8). The use position here means conveyor section 36 is longitudinally aligned with conveyor section 18 and pivoting panel conveyor section 236, while exposed from underneath shelf panel 28 as shown.

Figure 41:
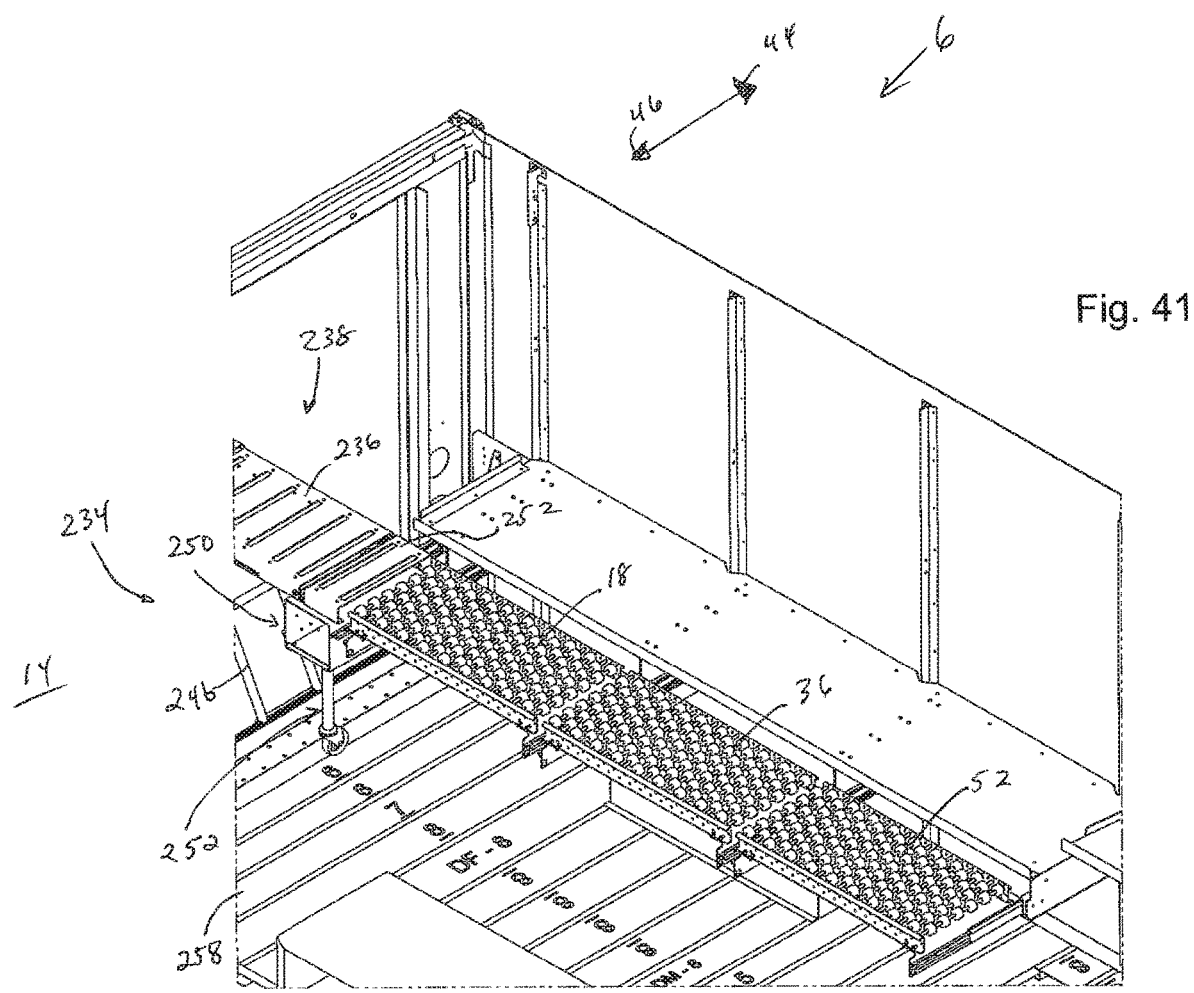
FIG. 41 is another partially cut away side interior perspective view of the cargo area of the delivery/cargo vehicle.

Illustratively, all conveyor sections may be moved to their use position, as shown in FIG. 41. Here, conveyor section 52 is moved to its use position longitudinally aligned with conveyor sections 36 and 18, as well as pivoting panel conveyor section 236. Again, it is appreciated that any number of conveyor sections may be employed based on the size, configuration, and use of interior 12 of cargo area 6.

Figure 42:
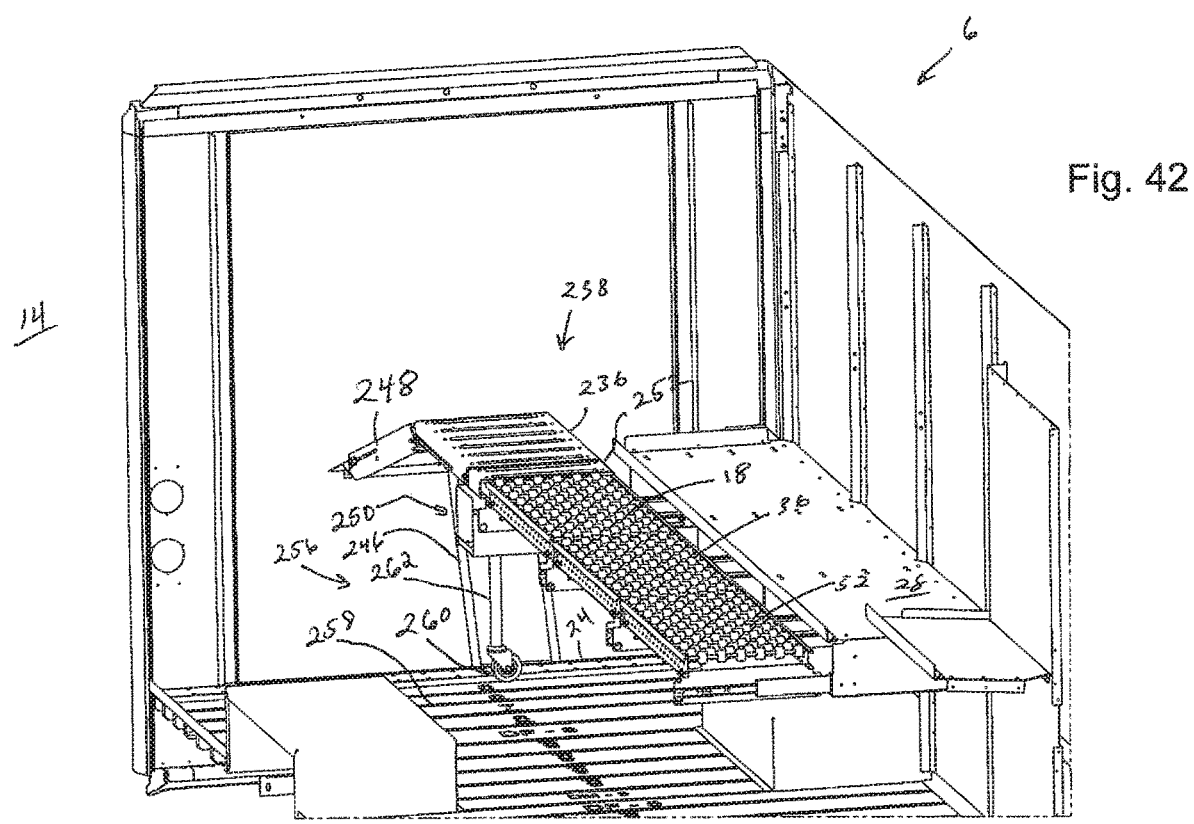
FIG. 42 is a rearward looking partially cut away perspective view of the cargo area.

A rearward looking, partially cut away, perspective view of cargo area 6, is shown in FIG. 42. This view is similar to that shown in FIG. 41 depicting reinforced pivoting conveyor section 238 with all of its sections 18, 36, 52, extension section 252, and pivoting panel conveyor section 236 located in their use positions. Ramp 248 is also shown extending from the end of pivoting panel conveyor section 236 exterior 14 of cargo area 6. Illustratively, ramp 248 may be angled relative to pivoting panel conveyor section 236 as shown, in order to be located in proximity to another structure exterior 14 of cargo area 6.

This view also shows caster 260 engaging flooring 258 of cargo area 6 and supporting rod 262 of support leg assembly 256 for supporting slideout assembly 250 which supports pivoting panel conveyor section 236 and extension section 252. Also shown is support 246 engaging the underside of reinforced pivoting conveyor section 238 and rear tail section 24 of cargo area 6.

Figure 43:
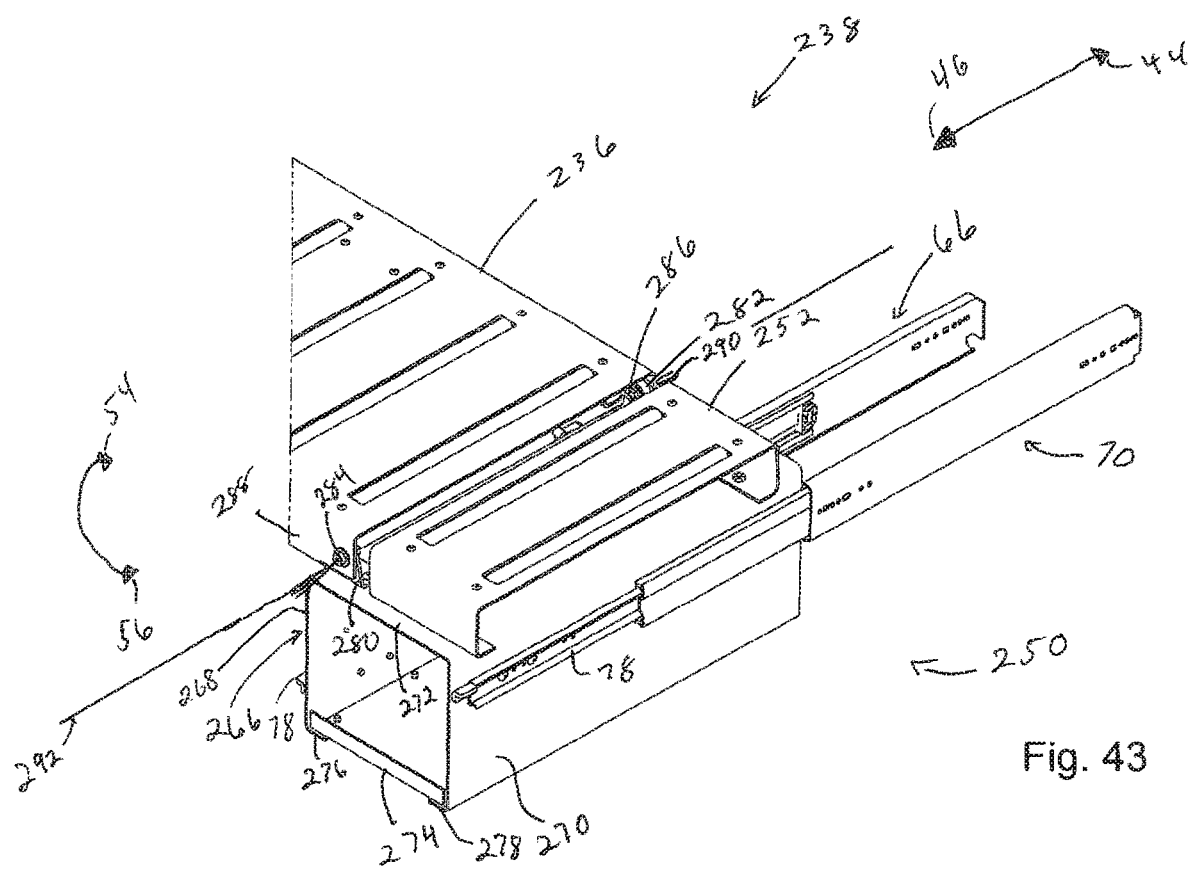
FIG. 43 as an isolated perspective view of the extension section of the pivoting conveyor section.

An isolated perspective view of extension section 252 and pivoting panel conveyor section 236 of reinforced pivoting conveyor section 238 is shown in FIG. 43. Illustratively, extension section 252 and pivoting conveyor section 236 are attached to slideout assembly 250. It is appreciated that slideout assembly 250 moves pivoting panel conveyor section 236 linearly in both directions 44 and 46. Pivoting panel conveyor section 236 is also pivotable in directions 54 and 56. This is so pivoting panel conveyor section 236 may be both pivoted and slid between its stowed and use positions, as depicted, for example, in FIGS. 38 and 39. With regard to the sliding function, slideout assembly 250 includes sliders 66 and 70, like the prior embodiments, attachable to support bracket 266. This causes pivoting conveyor section 20 to move in directions 44 and 46.

Support bracket 266 is illustratively a longitudinally extending box structure having opposing sidewalls 268 and 270 connected together by top panel 272 and base panel 274. Extension section 252 may be attached to top panel 272 of support bracket 266. Likewise, second telescoping member 78, of each of sliders 66 and 70, may be fastened to sidewalls 268 and 270, respectively, in similar fashion to that described with respect to sliders 66 and 70 attached to prior embodiments. Support bracket 266 may be made from a material such as metal that can support the weight of the conveyor structures, as well as any parcels or materials to be intended to be placed on top. Support bracket 266 may be made of a single formed bracket or may be made from multiple components. As illustratively shown herein, base panel 274 is a separate structure fastened onto flanges 276 and 278 both longitudinally extending along the length of support bracket 266, as well as extending from sidewalls 268 and 270, respectively. Additionally, support bracket 266 may be made of more or fewer panel faces or structures than shown in this illustrative embodiment based on the needs for the particular cargo area. For example, an embodiment may only employ top and side panels. One or more side panels may be employed as well, or in the alternative.

With regard to the pivoting function of pivoting panel conveyor section 236, pivot brackets 280 and 282 may be fastened to top panel 272 of support bracket 266. Pivot brackets 280 and 282 are also sized to receive corresponding pivot pins 284 and 286, respectively, that are also disposed through sidewalls 288 and 290 of pivoting panel conveyor section 236 to allow same to pivot in directions 54 and 56 about axis 292. As such, support bracket 266 supports both the lateral movement and directions for 44 and 46, as well as the pivoting movement in directions 54 and 56 of reinforced pivoting conveyor section 238.

Figure 44:
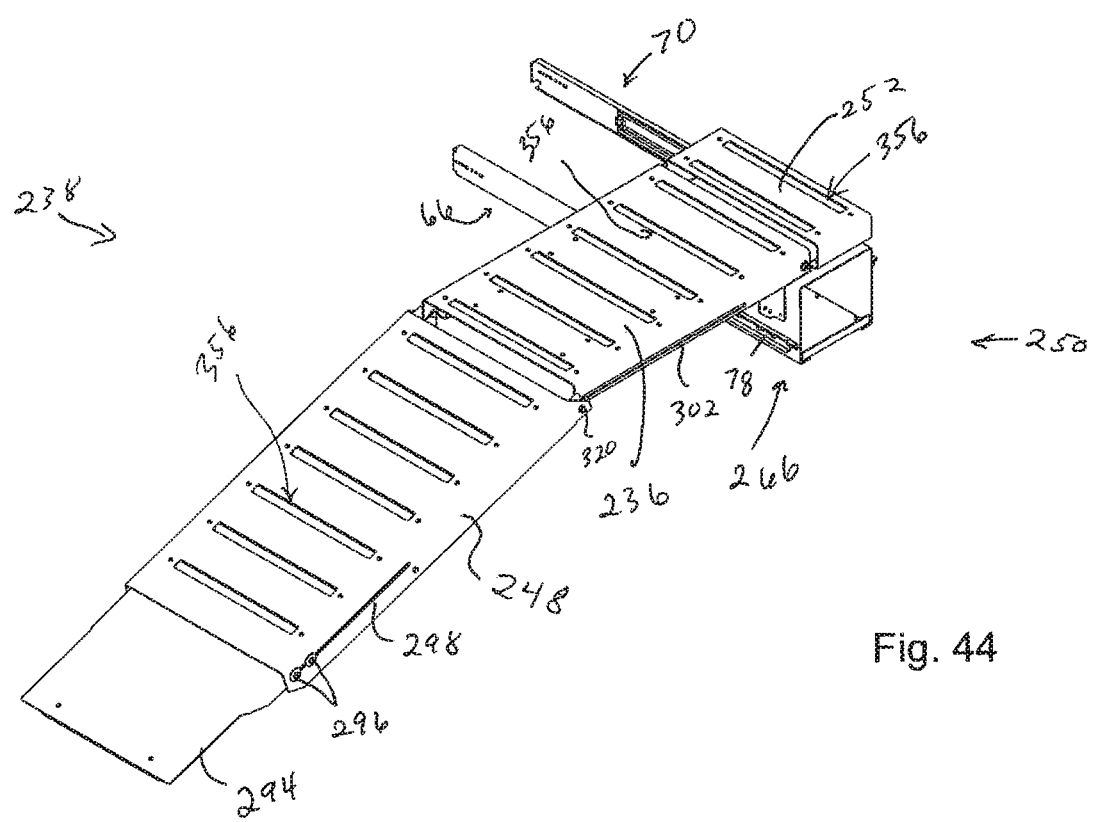
FIG. 44 is an isolated perspective view of the pivoting conveyor section attached to the pivoting slideout assemblies.

Another isolated perspective view of reinforced pivoting conveyor section 238 attached to slideout assembly 250, is shown in FIG. 44. This view shows slideout assembly 250, including sliders 66 and 70 attachable to pivot support bracket 266, to move pivoting panel conveyor section 236 in directions 44 and 46. Also shown in this view is ramp extender 294 extending from ramp 248. Illustratively, pins 296 may be disposed through a slot 298 in ramp 248 to selectively allow ramp extender 294 to move to and from ramp 428. Ramp extender 294 provides additional length to ramp 248 as needed. Further shown are slotted rail 302 disposed in sidewall 288 of pivoting panel conveyor section 236. Ramp 248 may include rollers 304 (see FIG. 46) located in a slotted rail 302 on each side of pivoting panel conveyor section 236 to allow ramp 248 to move between retracted, stowed, and extended use positions.

Figure 45:
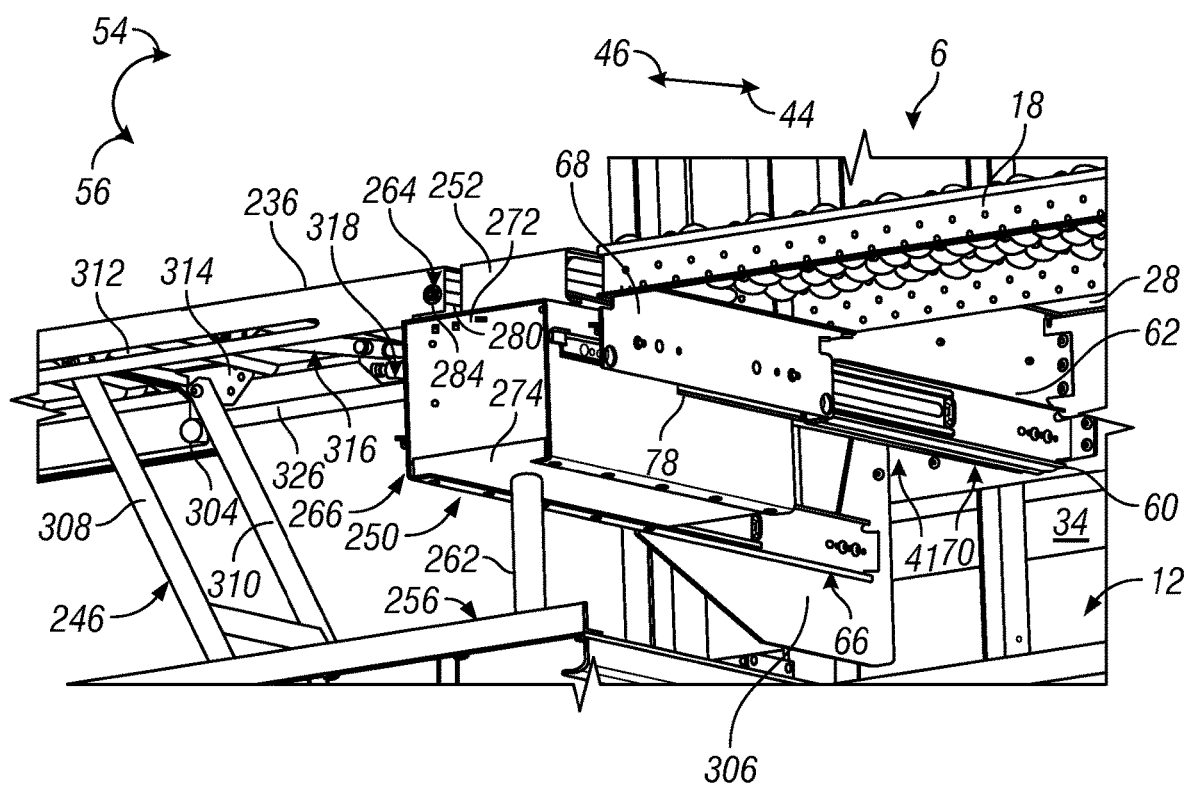
FIG. 45 is a perspective underside view of the interior of the cargo area showing the conveyor section along with the pivoting conveyor section.

A perspective underside view of interior 12 of cargo area 6 showing conveyor section 18, along with reinforced pivoting conveyor section 238, both located in their use position, is shown in FIG. 45. This view depicts conveyor section 18 attached to conveyor section bracket 68, which is attached to second telescoping member 78 of slideout assembly 41. Conveyor section bracket 68 moves conveyor section 18 with respect to slider support 60. In addition, slider support 60 is attached to sidewall 34 via wall support bracket portion 64. This view also shows shelf support bracket portion 62 attached to shelf panel 28 and sidewall 34.

This view further shows slider 66 attached to support bracket 306 which is attached to wall 34 and slider 70 attached to slider support 60. By this attachment, slideout assembly 250 may be moved in directions 44 and 46 with respect to cargo area 6 between stowed and use positions. Also shown is rod 262 of support leg assembly 256 attached to the underside of base panel 274 of support bracket 266. Extension section 252 is shown attached to top panel 272 of support bracket 266, as well. A support 246 is illustratively shown composed of legs 308 and 310 that each fasten to one of a bracket 312 and 314 located on the underside of pivoting panel conveyor section 236. Illustratively, legs 308 and 310 are pivotally attached to brackets 312 and 314, respectively, so support 246 may pivot in directions 54 and 56 between use and stowed positions as pivoting panel conveyor section 236 moves between its use and stowed positions. Also shown are piston assemblies 316 and 318 each attached to the underside of pivoting panel conveyor section 236. Piston assemblies 316 and 318 are illustratively securing and control drop mechanisms that may assist in keeping pivoting panel conveyor section 236 placed in an upright stowed position and/or resist the force of gravity on pivoting panel conveyor section 236 as it is lowering to its use position. This helps slow and control the drop on support bracket 266 as opposed to a fast impact drop. Lastly, shown in this view is pivot pin 284 attached to pivot bracket 280 providing the pivot point 264 about which pivoting panel conveyor section 236 rotates in directions 54 or 56. As such, conveyor section 18 located in its extended use position is aligned with extension section 252 and pivoting panel conveyor section 236 to provide a level support upon which parcels or other materials are placed and moved to and from cargo area 6.

Figure 46:
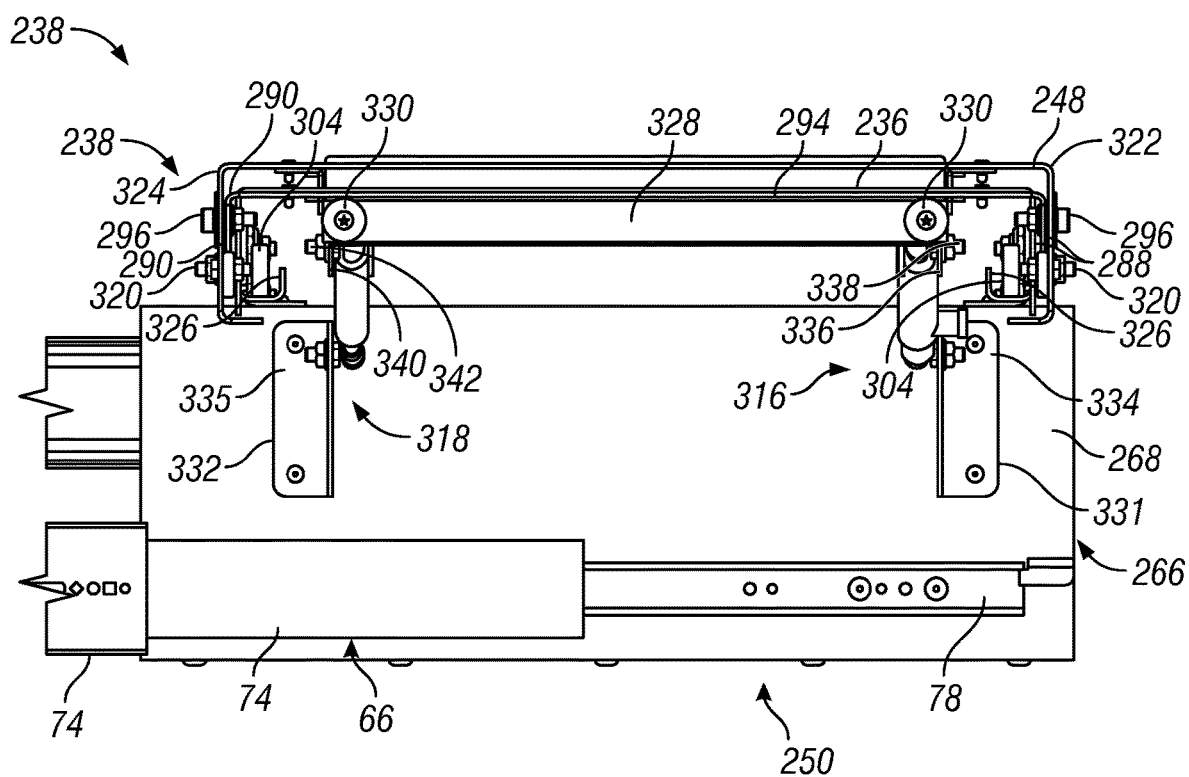
FIG. 46 is an end detail view of the extension section of the pivoting conveyor section.

An end detail view of reinforced pivoting conveyor section 238 and side view of slideout assembly 250 is shown in FIG. 46. This view depicts first slider 66 with slider bracket 74, first telescoping member 76, and second telescoping member 78 attached to sidewall 268 of support bracket 266. Also shown are panel ramp 248, pivoting panel conveyor section 236, and ramp extender 294. As depicted in this view, panel ramp 248 includes rollers 304 attached to pin 320. It is appreciated that a roller 304 may be positioned on each side 322 and 324 of panel ramp 248 as illustratively shown herein. Each of rollers 304 may be engageable with a track 326 formed on each of sidewalls 288 and 290 of pivoting panel conveyor section 236. Illustratively, tracks 326 may each be an inwardly turned J-channel that has a longitudinal extent on pivoting panel conveyor section 236. Rollers 304 may travel along tracks 326 to move panel ramp 248 with respect to pivoting panel conveyor section 236 between use and stowed positions (see, FIGS. 38 and 44). Pin 320 may be positioned within slot rail 302 of pivoting panel conveyor section 236 as shown in FIG. 44. This assists guiding panel ramp 248 when moving between extended and retracted positions. With respect to ramp extender 294, pins 296 (see, also, FIG. 44) extend through slot 298 and panel ramp 248 to recess or extend ramp extender 294. On the end thereof is a bracket 328 sized to receive one or more magnets 330. In an illustrative embodiment, having one or more magnets on ramp extender 294 allows magnetic securement between it and a surface that is exterior 14 of delivery vehicle 2. Such surface (not shown), may be a ramp from another delivery vehicle 2, which allows transfer of parcels or other materials between delivery vehicle 2, or may be a conveyor surface at a delivery location. Having this temporary and selective securement between reinforced conveyor assembly 234 and an exterior structure makes parcel transfer between truck to truck or truck to exterior conveyor more convenient for the operator.

Also shown in FIG. 46 are piston assemblies 316 and 318. Brackets 331 and 332 are fastened to sidewall 268 of support bracket 266. Piston assembly 316 is illustratively pivotably attached to bracket 331 via fastener 334, whereas piston assembly 318 is attached to bracket 332 via fastener 335, as illustratively shown. Piston assembly 316 is also attached to the underside of pivoting panel conveyor section 236, illustratively, via bracket 336 and fastener 338. Likewise, piston assembly 318 is attached to the underside of pivoting panel conveyor section 236 via bracket 340 and fastener 342. Piston assemblies 316 and 318 provide a resistance force against the force of gravity when reinforced pivoting conveyor section 238 is lowered in direction 56 to its use position (see FIG. 45). An illustrative objective is to prevent pivoting panel conveyor section 236 from slamming onto support bracket 266 at pivot point 264 (see, also, FIG. 45) when lowering to the use position. The effect is to reduce the potential for personnel injury and/or damage to reinforced conveyor assembly 234. Piston assemblies 316 and 318 counteract the weight of reinforced pivoting conveyor section 238 lowering same slowly in direction 56. It is appreciated that other mechanisms, including a mechanized system using gears and/or motors, for example, or other biased structures that can counteract the force of gravity by the weight of reinforced pivoting conveyor section 238 to lower same in a controlled manner.

Figure 47:
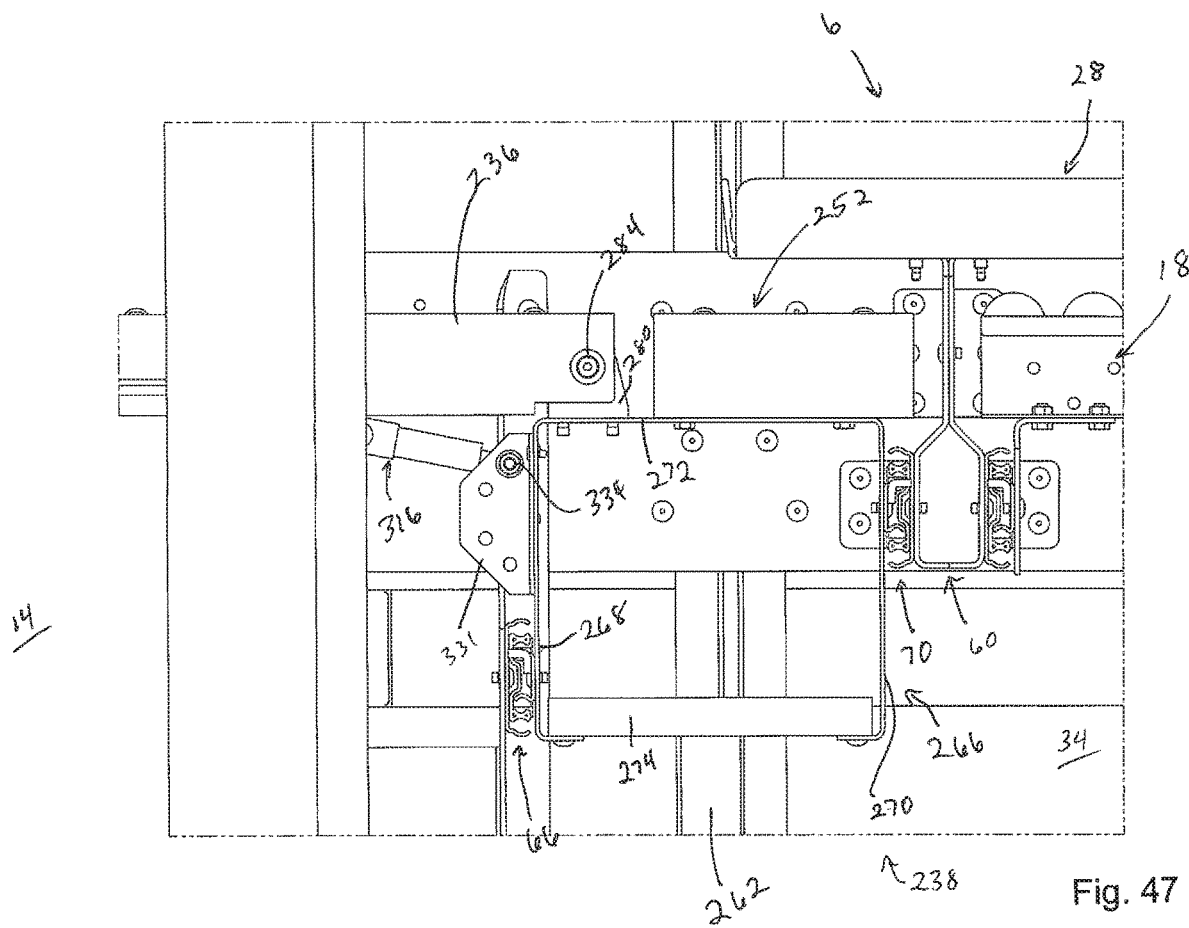
FIG. 47 is a side detail view of the extension section and a side view of the pivoting conveyor section.

A detail side view of support bracket 266 and extension section 252 is shown in FIG. 47. This view further shows slider 66 attached to sidewall 268 of support bracket 266. Also shown is bracket 331 with piston assembly 316 attached thereto via fastener 334. Pivot bracket 280 is shown fastened to top panel 272 and pivot pin 284 disposed through pivot bracket 280, securing pivoting panel conveyor section 236 thereto. Second slider 70 is shown secured to both sidewall 270 of support bracket 266, as well as slider support 60. Base panel 274 is also shown secured to support bracket 266 and attached to rod 262 of support leg assembly 256.

Figure 48:
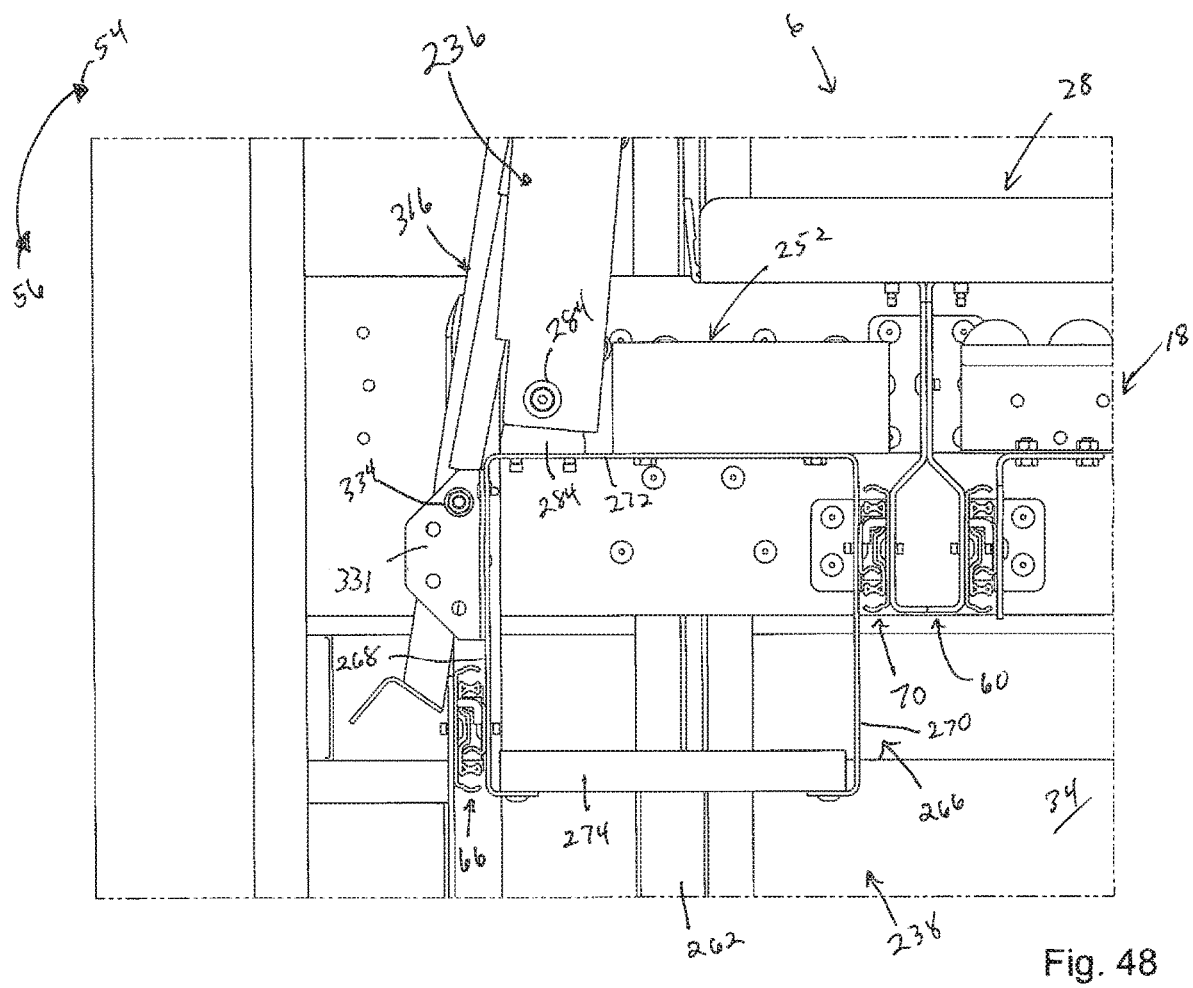
FIG. 48 is another end detail view of the extension section and side view of the pivoting conveyor section.

Another side view of reinforced pivoting conveyor section 238, similar to that shown in FIG. 47, is shown in FIG. 48. A distinction between these views, however, is that pivoting panel conveyor section 236 has been pivoted upward in direction 54 to its stowed position on pivot pin 284. To that end, piston assembly 316 (as well as piston assembly 318) pivots on fastener 334. The piston assemblies in some embodiments may assist in holding pivoting panel conveyor section 236 in its upright stowed position as shown in this view to prevent same from unintentionally dropping in direction 56.

Figure 49:
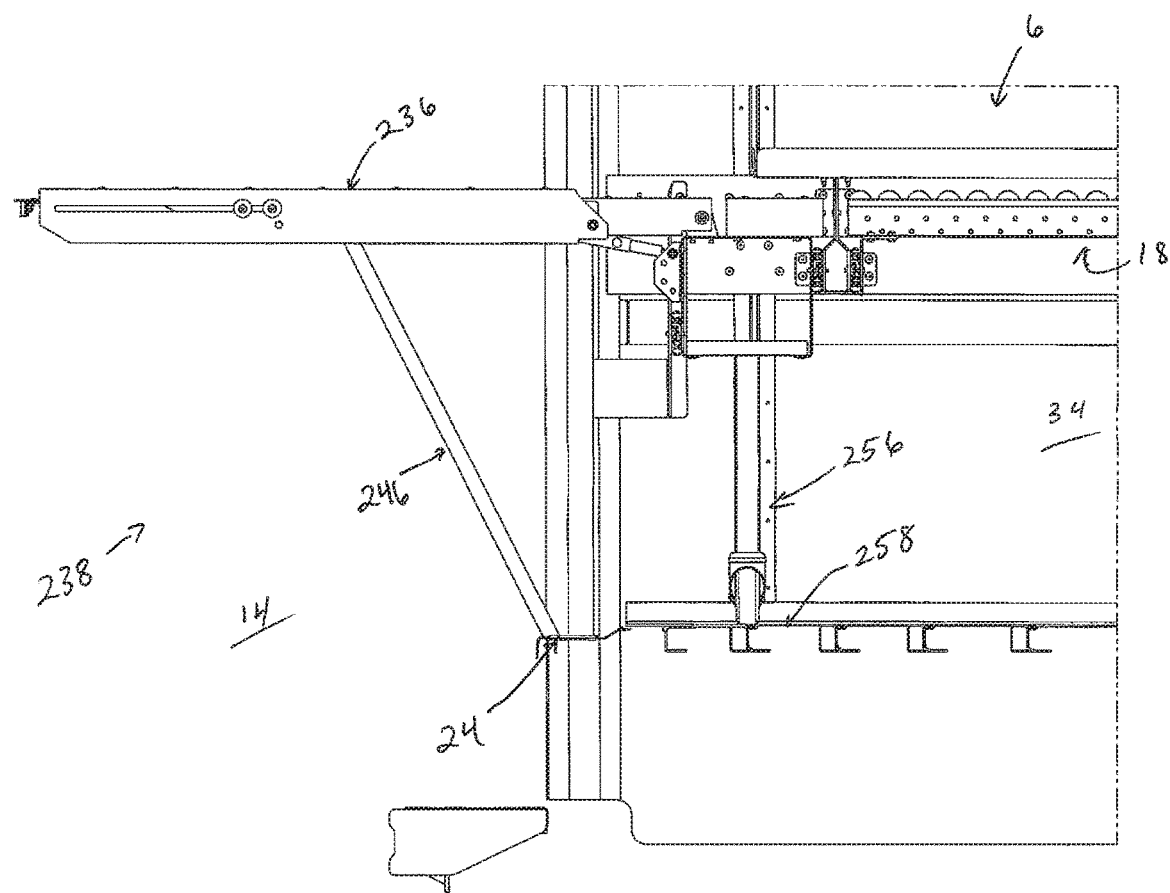
FIG. 49 is a side view of the pivoting conveyor section.

Another side detail view of reinforced pivoting conveyor section 238 is shown in FIG. 49. This view is similar to that shown in FIG. 47, except that more of reinforced pivoting conveyor section 238 is visible. Particularly, this view shows support 246 engaged with rear tail section 24 to support pivoting panel conveyor section 236. Also shown is support leg assembly 256 engaged with flooring 258 inside cargo area 6. It is appreciated from this view that the engagement between support 246, rear tail section 24, support leg assembly 256, and flooring 258 provide additional support to carry the weight of both the structure of reinforced pivoting conveyor section 238 and any parcels located there on.

Figure 50:
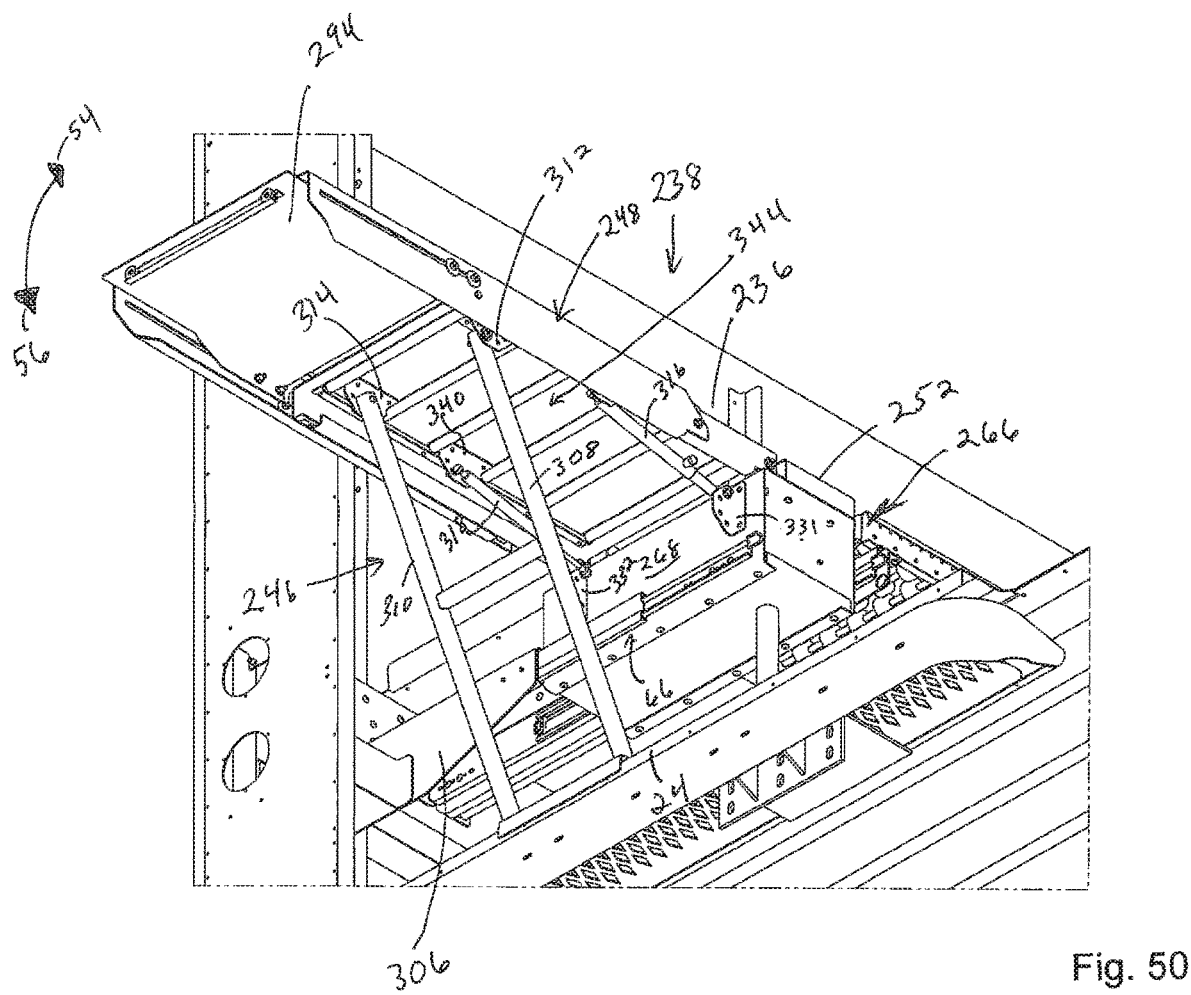
FIG. 50 is an underside detail perspective view of the pivoting conveyor section.

An underside detail perspective view of reinforced pivoting conveyor section 238 located in its use position, is shown in FIG. 50. This view depicts extension section 252 attached to support bracket 266 as previously discussed. Pivoting panel conveyor section 236 is shown with panel ramp 248 slid back thereon. Ramp extender 294 is shown retracted under panel ramp 248 to its stowed position, as well. Legs 308 and 310 of support 246 are shown attached to brackets 312 and 314. It is appreciated that legs 308 and 310 are pivotally connected so that when pivoting panel conveyor section 236 is pivoted upward in direction 54 to its stowed position, support 246 will pivot and fall to position itself within cavity 344 formed in the underside of pivoting panel conveyor section 236 to a stowed position. This may be done by employing gravity. Further, support 246 engages rear tail section 24 to provide support to reinforced pivoting conveyor section 238 while in its use position as shown. This view also provides another perspective of slider 66 attached to sidewall 268 of support bracket 266 in its extended use position, as well as being attached to support bracket 306. Also attached to sidewall 268 are brackets 331 and 332, which attach to piston assemblies 316 and 318, respectively. This view also further shows, in particular, piston assembly 318 pivotally attached to bracket 340 fastened to the underside of pivoting panel conveyor section 236.

Figure 51:
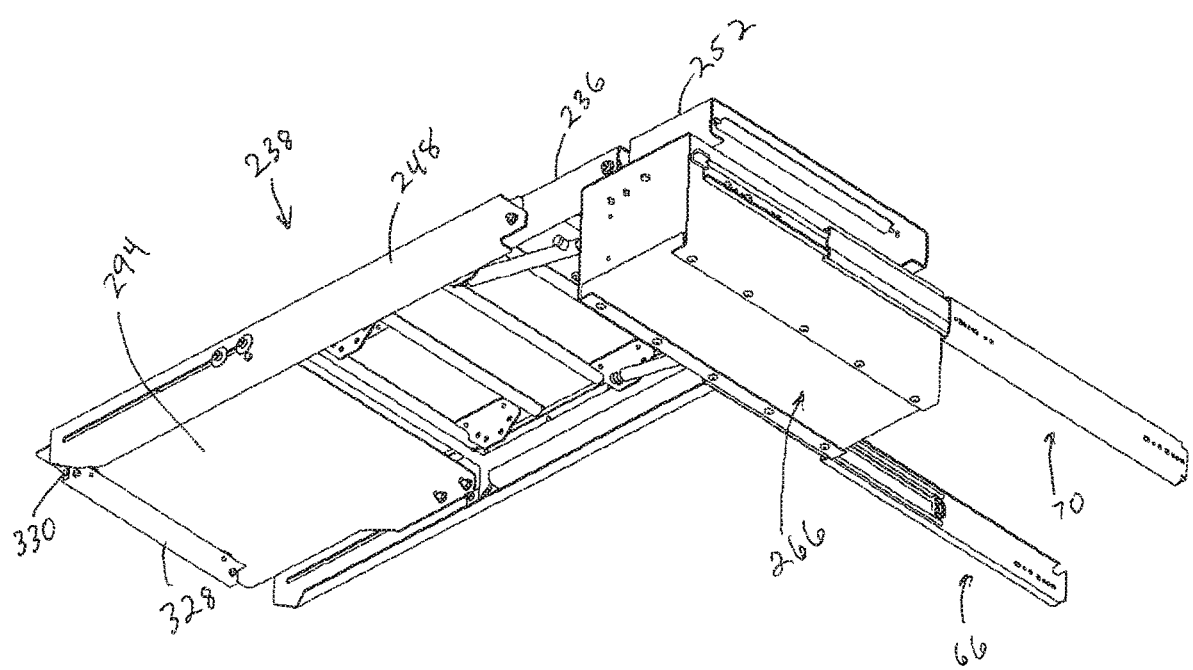
FIG. 51 is a perspective isolated underside detail view of the extension section and pivoting conveyor section.

Various isolated perspective views of reinforced pivoting conveyor section 238 is shown in FIGS. 51, 52, 53, and 54. The perspective underside view of reinforced pivoting conveyor section 238 shown in FIG. 51 is similar to that shown in FIG. 50. This view shows reinforced pivoting conveyor section 238 located in its use position, but with panel ramp 248 and ramp extender 294 in their retracted position on pivoting panel conveyor section 236. Also shown are sliders 66 and 70 attached to support bracket 266, as previously discussed. In this view, support 246 has been removed for demonstrative purposes. Also shown in this view is bracket 328 that receives illustrative magnets 330.

Figure 52:
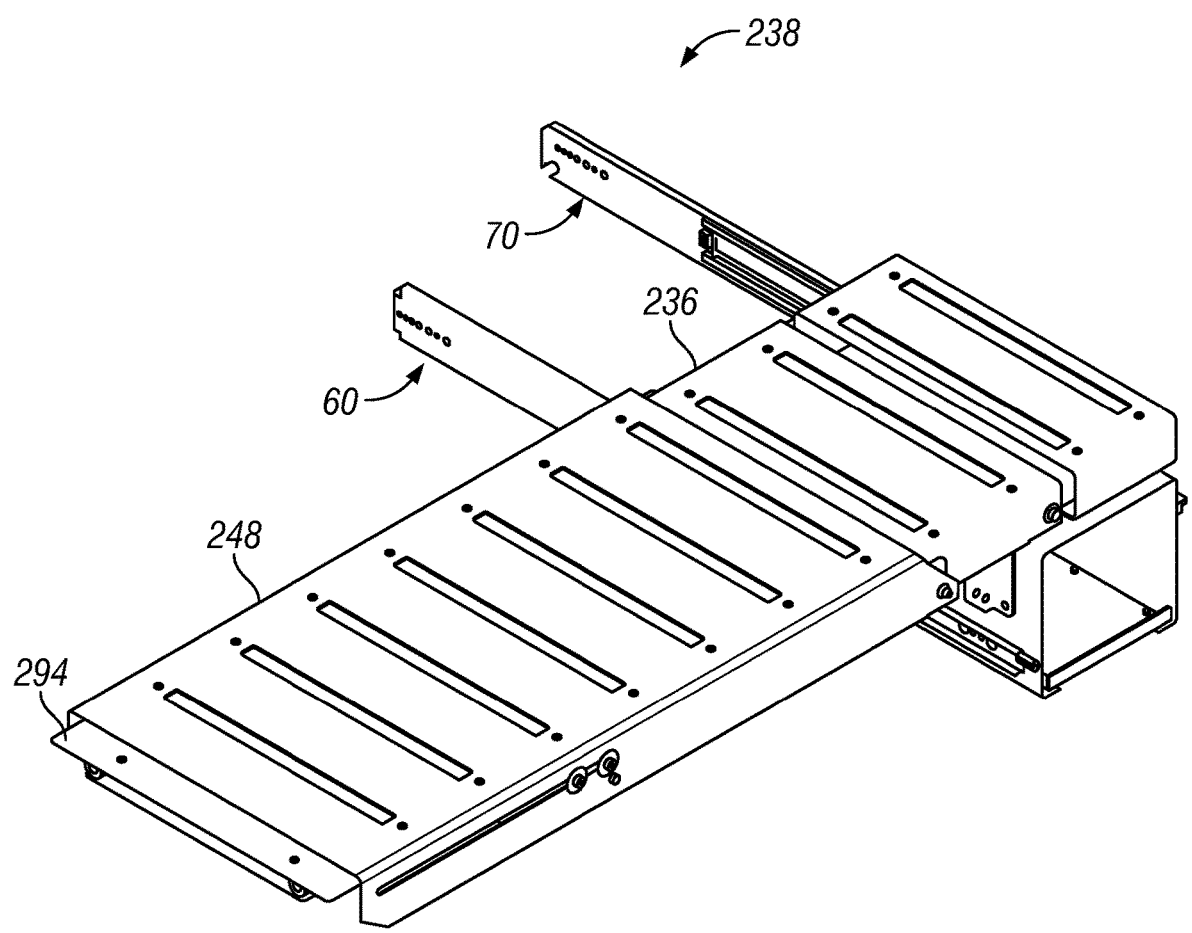
FIG. 52 is a perspective isolated detail view of the extension section and pivoting conveyor section.
Figure 53:
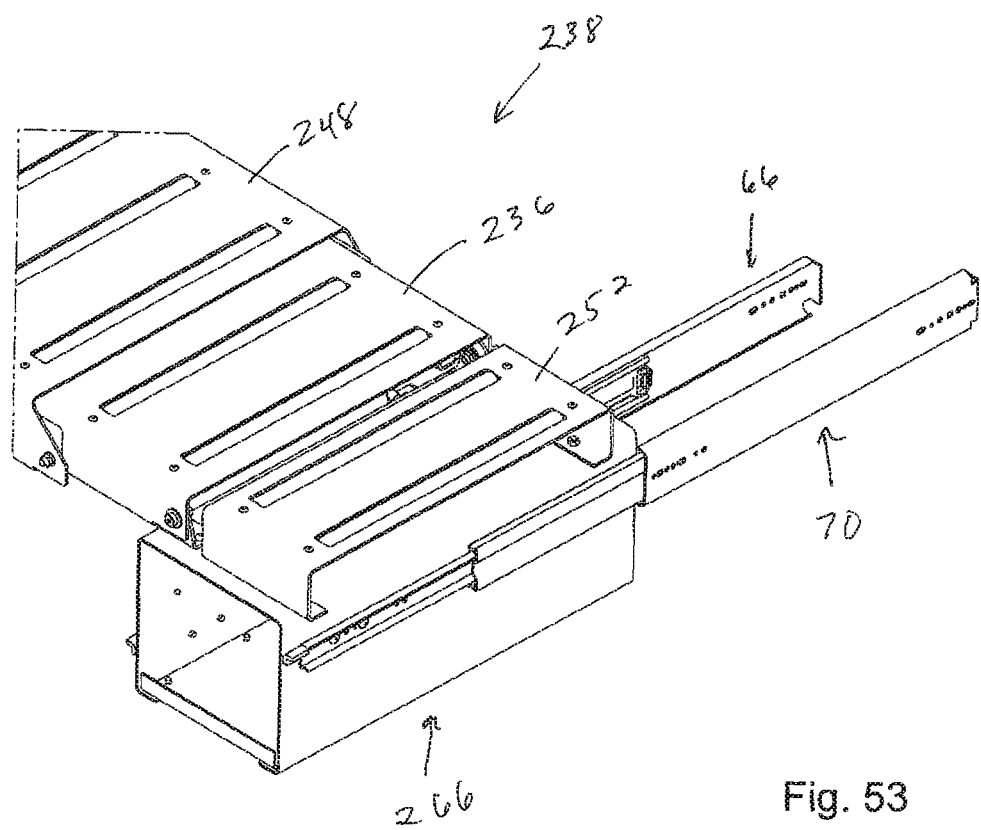
FIG. 53 is an isolated perspective view of another illustrative embodiment of a pivoting conveyor section.
Figure 54:
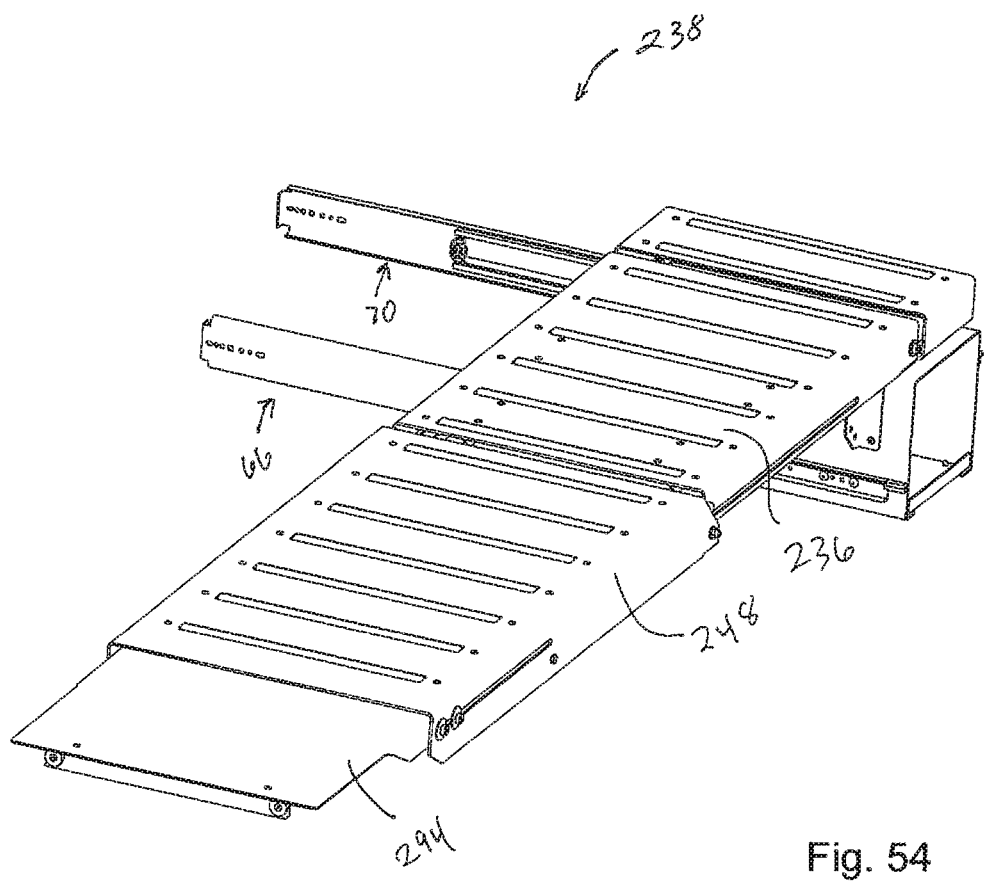
FIG. 54 is an isolated perspective view of the pivoting conveyor section.

The top isolated perspective views of reinforced pivoting conveyor section 238 is shown in FIGS. 52, 53, and 54. These views differ in that reinforced pivoting conveyor section 238, shown in FIG. 52, has panel ramp 248 and panel ramp extender 294 retracted onto pivoting panel conveyor section 236. It is appreciated that in this use position, reinforced pivoting conveyor section 238 can be used to transfer packages exterior of cargo area 6 in instances where a ramp and/or a ramp extender are not necessarily needed. In addition, retracting panel ramp 248 and ramp extender 294 as shown, makes reinforced pivoting conveyor section 238 more compact when it is to be pivoted upward to its stowed position as previously discussed. This means reinforced pivoting conveyor section 238 will occupy less room while located in cargo area 6 of vehicle 2. In FIG. 53 panel ramp 248 is retracted onto pivoting panel conveyor section 236 similar to that shown in FIG. 52.

The perspective view in FIG. 54 shows panel ramp 248 and ramp extender 294 fully extended from pivoting panel conveyor section 236. In this position, panel ramp 248 and ramp extender 294 add further length to reinforced conveyor assembly 234, as well as being able to pivot further downward to engage surfaces on a plane that is different than that of pivoting panel conveyor section 236 when lowered to its use position. These views also show sliders 66 and 70 extended to position reinforced pivoting conveyor section 238 to its use position.

Figure 55:
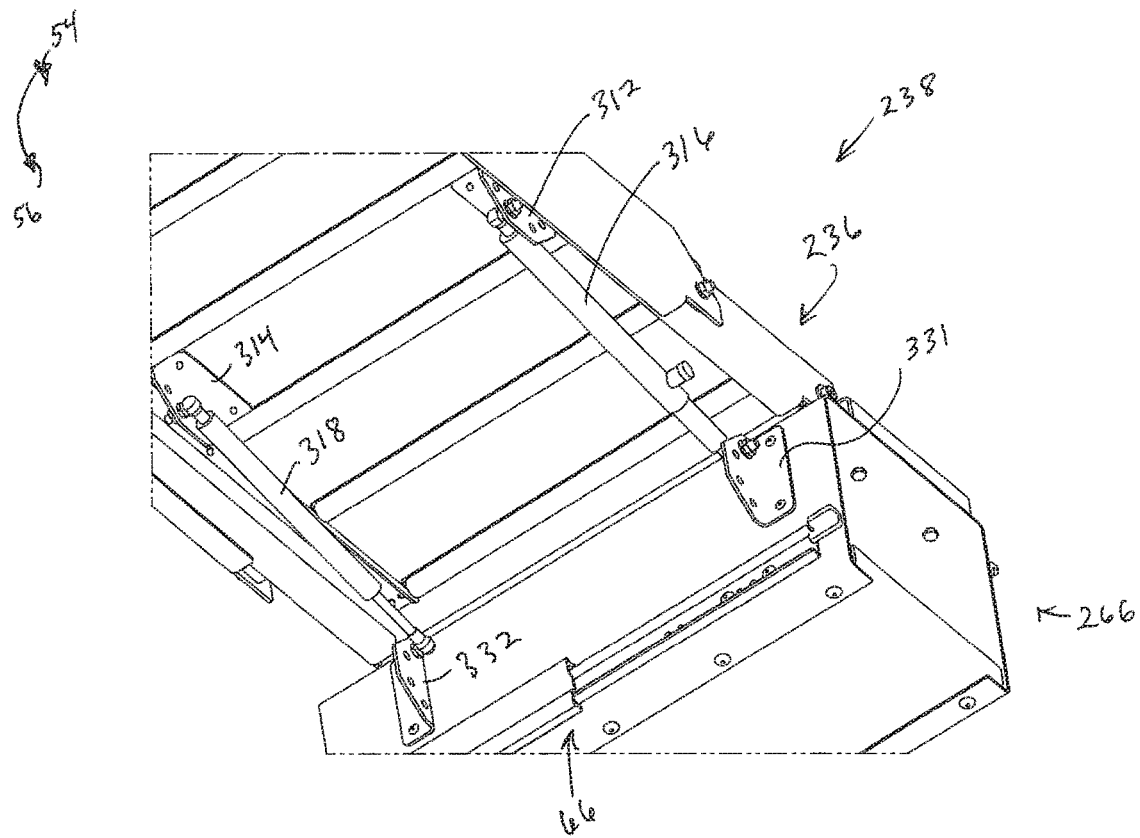
FIG. 55 is a perspective underside view of the interior of the cargo area showing the conveyor section.
Figure 56:
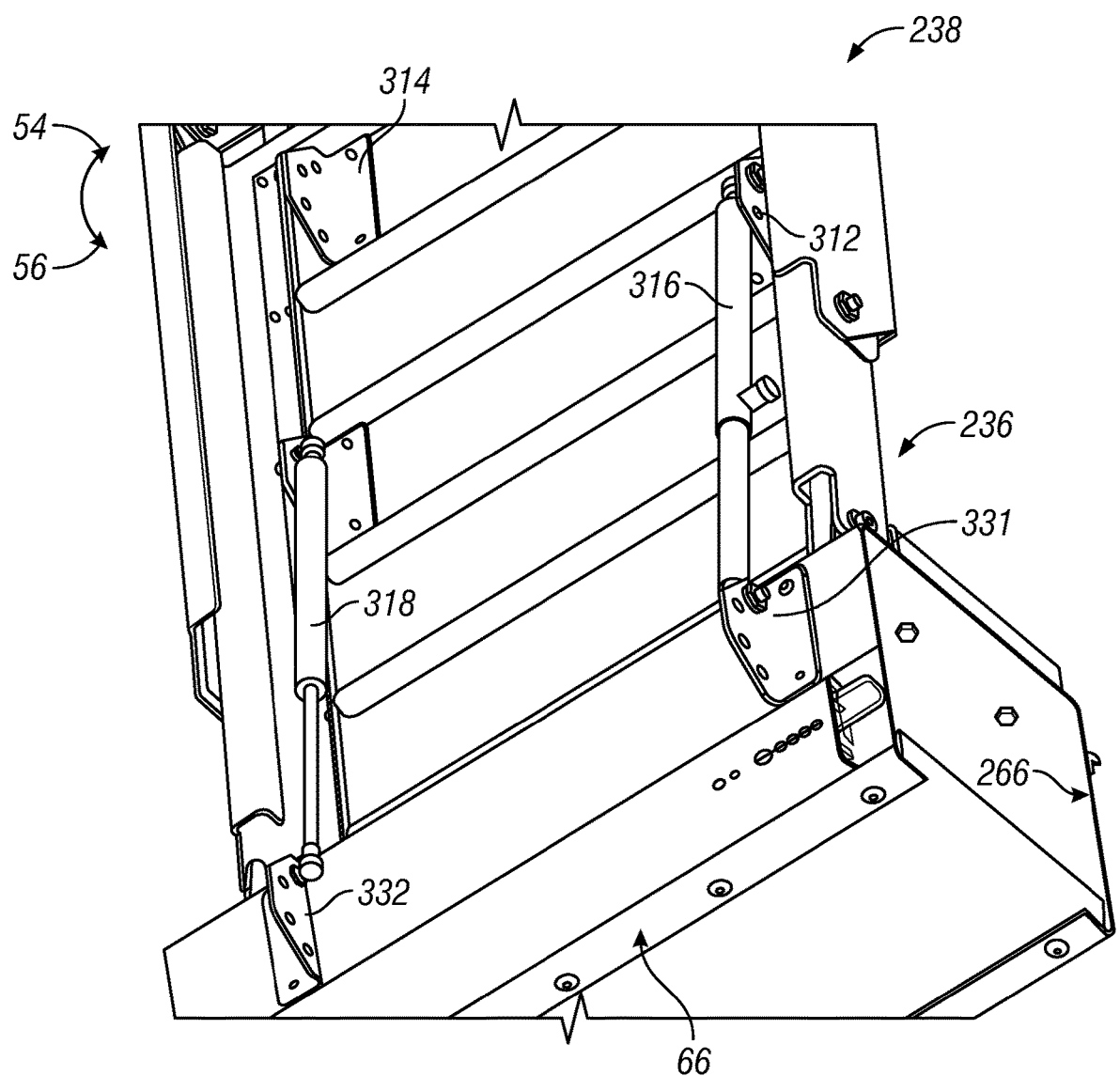
FIG. 56 is an underside perspective detail view of a portion of the reinforced pivoting conveyor section.

Underside perspective detail views of a portion of reinforced pivoting conveyor section 238 are shown in FIGS. 55 and 56. The distinction between the two views is that pivoting panel conveyor section 236 is located in its lowered use position in FIG. 55, whereas it is pivoted upward in direction 54 to its upright stowed position as shown in FIG. 56. When moving pivoting panel conveyor section 236 in direction 54 upward to its stowed position, piston assemblies 316 and 318 extend as well. Both piston assemblies 316 and 318 assist the pivoting panel conveyor section 236 upward and slow the dissent of same when lowered. In an illustrative embodiment, piston assembly 316 may include a locking feature. Piston assembly 316 locks when located in the upright stowed position in order to secure the pivoting panel conveyor section 326 in its stowed position. In order to unlock piston assembly 316, the operator pulls outward on the lock or plunger which releases piston assembly 316 and frees pivoting panel conveyor section 326 to lower. Support bracket 266 is shown extended in its use position in FIG. 55 and then retracted to its stowed position in FIG. 56. This is further evident by slider 66 shown extended in FIG. 55, but then retracted in FIG. 56.

An illustrative embodiment of the present disclosure provides that panel ramp 248 may extend from, thereby increasing the length of, pivoting panel conveyor section 236, pivot in direction 56 with respect to pivoting panel conveyor section 236 to lower the reach of reinforced conveyor assembly 234, and retract over pivoting panel conveyor section 236 to reduce the footprint of reinforced pivoting conveyor section 238 so it can be moved to a stowed position. These functions are accomplished by panel ramp 248 being slidable and pivotable with respect to pivoting panel conveyor section 236.

Figure 57:
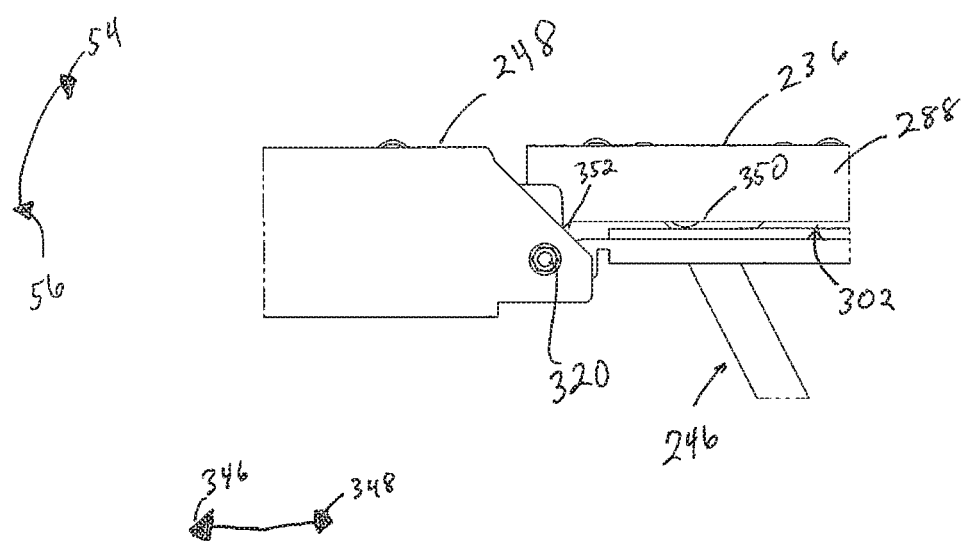
FIG. 57 is an isolated detail view of the pivoting panel conveyor section and the panel ramp.
Figure 58:
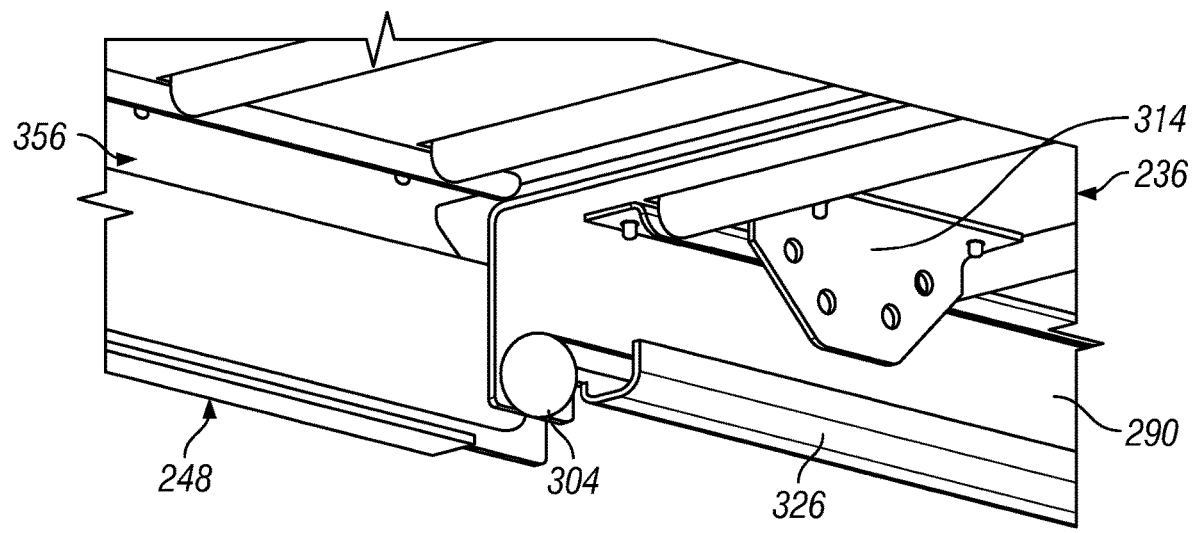
FIG. 58 is a detail isolated perspective view of portions of the pivoting panel conveyor section and panel ramp.
Figure 59:
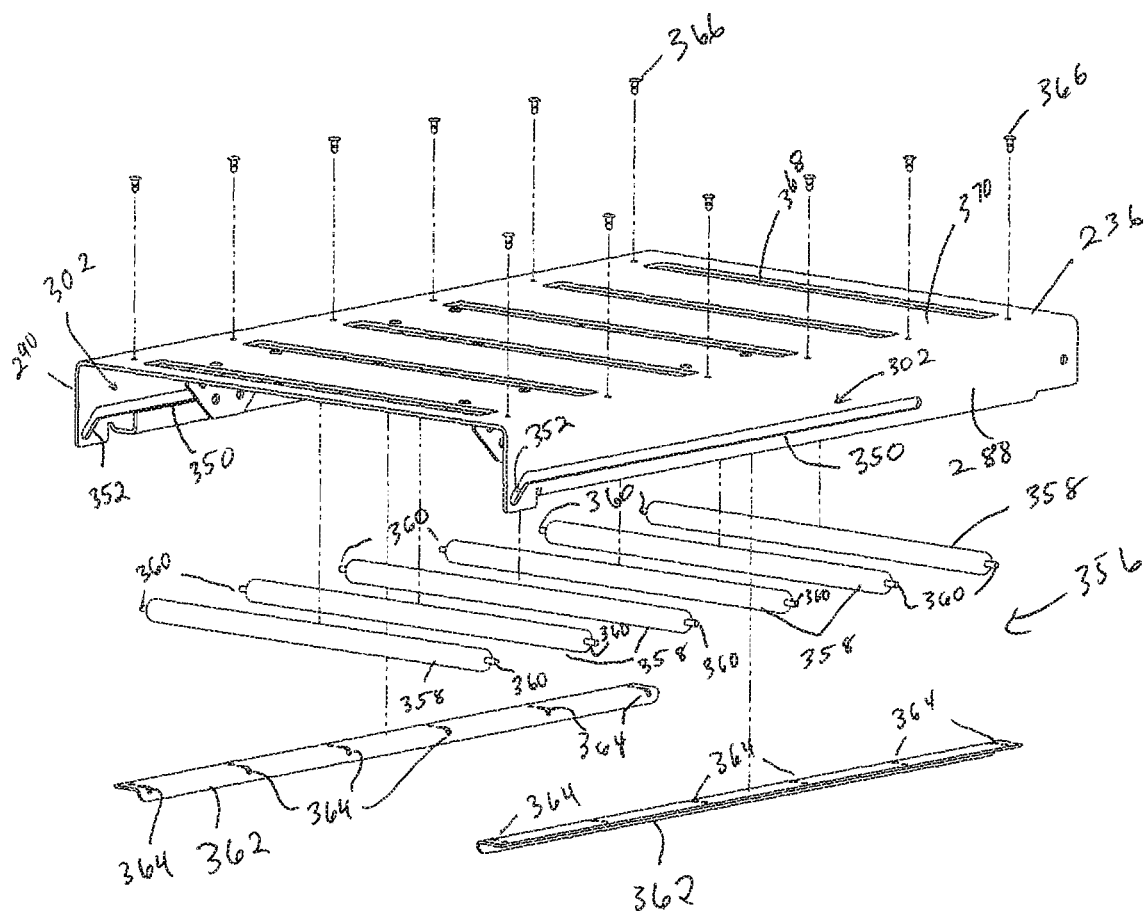
FIG. 59 is an exploded view of the pivoting panel conveyor section.

As shown in FIGS. 57, 58, and 59, sidewall 288 (as well as sidewall 290 on the other side) of pivoting panel conveyor section 236 includes slot rail 302. These slot rails are located on both sides of pivoting panel conveyor section 236. As shown herein, each of slot rails 302 include a linear portion 350 and an angled portion 352 in communication with linear portion 350. Linear portion 350 essentially runs along the longitudinal extent of pivoting panel conveyor section 236. This allows panel ramp 248 to extend and retract with respect to pivoting panel conveyor section 236 between use and stowed positions. In particular, it provides the telescoping nesting effect such as that shown in FIGS. 46 and 50 for example. The effect of this is that panel ramp 248 may be used as an extender for pivoting panel conveyor section 236 to extend its reach. Also, panel ramp 248 may be retracted over (in alternate embodiments—under) permitting pivoting panel conveyor section 236 to reduce the footprint of reinforced pivoting conveyor section 238 so it may be moved and pivoted more easily to its stowed possession. To create this movement, roller 304 is located on each side of panel ramp 248 (see FIGS. 45 and 46) to engage tracks 326 as previously discussed with respect to FIG. 46. Rollers 304 also keep pivoting panel conveyor section 236 separated from panel ramp 248 sufficient that each of their respective conveyor pins do not engage each other. In order to allow panel ramp 248 to pivot with respect to pivoting panel conveyor section 236, angled portion 352 of slot rail 302 provides a space to accommodate pin 320 (see FIG. 46). This allows panel ramp 248 to pivot in directions 54 and 56 with respect to pivoting panel conveyor section 236.

Another aspect of reinforced conveyor assembly 234 is the conveyor roller assemblies that assist in making it easier to move parcels or other materials along extension section 252, pivoting panel conveyor section 236 and panel ramp 248. In an illustrative embodiment, conveyor roller assemblies 356 are shown in several of the views, including FIG. 44, to be located on extension section 252, pivoting panel conveyor section 236, and panel ramp 248. It is appreciated that conveyor roller assemblies 356 may be located on any of the other surfaces in cargo area 6 of vehicle 2.

A partially exploded view of pivoting panel conveyor section 326 is shown in FIG. 59. In an illustrative embodiment, conveyor roller assemblies 356 may include one or more pin rollers 358, bounded by axles 360, located on each side thereof. These pin rollers 358 are bounded by pin brackets 362, one of which is located on each side of pin rollers 358. As shown herein, each of pin brackets 362 includes a plurality of spaced apart openings 364 which are regularly spaced along the longitudinal extent of each of pin brackets 362. Each of openings 364 are sized to receive an axle 360 extending from pin roller 358 to provide support for each of pin rollers 358 and allow same to rotate therewith. Illustratively, fasteners 366 may be disposed through pivoting panel conveyor section 236 to secure each of roll pin rollers 358 to the underside of pivoting panel conveyor section 236 and slots 368 may be disposed through top surface 370 of pivoting panel conveyor section 236. Slots 368 may be regularly spaced coinciding with the positioning of pin rollers 358 rotatably coupled to pin brackets 362. The net effect is that a portion of each of pin rollers 358 extend above top surface 370 of pivoting panel conveyor section 236 to provide a plurality of rolling bearing surfaces for parcels or other materials that are set on top of pivoting panel conveyor section 236. This same configuration including pin rollers 358, pin brackets 362, and slots 368, in addition to the other corresponding structures, may be employed on extension section 252 and panel ramp 248 as shown in several of the views including FIG. 44.

Figure 60:
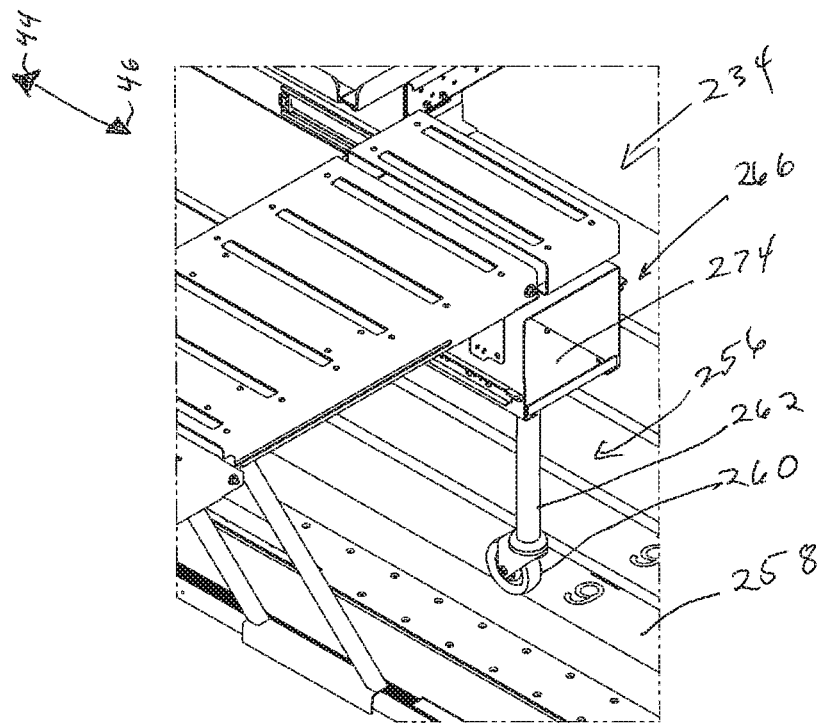
FIG. 60 is a perspective detail view of portions of the conveyor assembly.
Figure 61:
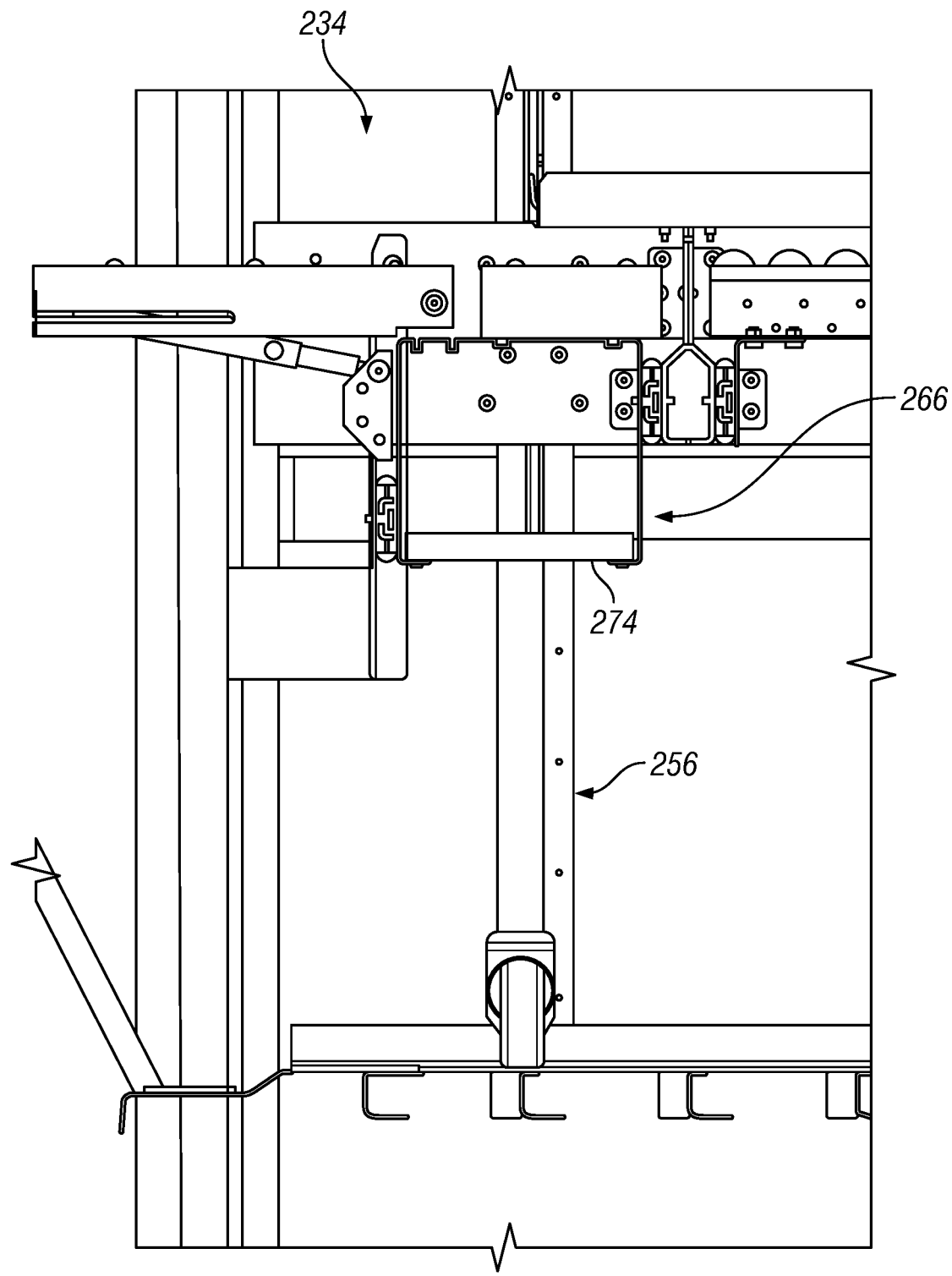
FIG. 61 is a side detail view of the conveyor assembly.

Perspective detail views of reinforced conveyor assembly 234 are shown in FIGS. 60 and 61. These views particularly show support leg assembly 256 attached to base panel 274 of support bracket 266. These views further demonstrate how castor 260, attached to rod 262, rolls along flooring 258 to provide support to reinforced conveyor assembly 234 when extending and retracting between use and stowed position in directions 44 and 46.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional Patent Application differs from the priority Application, the disclosure from this non-provisional Patent Application controls.

What is claimed:

1. A vehicle having a cargo area and a cab area, wherein the cargo area includes a conveyor assembly, the conveyor assembly comprises:
   a conveyor assembly section and a pivotable conveyor assembly section;
   wherein the conveyor assembly section includes:
      a plurality of conveyor shelf panels, each of which include a support surface, wherein the support surface includes a plurality of roller bearing assemblies supported by a frame, wherein the frame is supported by at least one first slideout assembly which includes at least one movable bar that moves with respect to the cargo area between a first use position and a first stowed position;
   wherein the each of the plurality of conveyor shelf panels are independently movable with respect to each other;
   wherein at least one of the plurality of conveyor shelf panels is movable adjacent to the pivotable conveyor assembly section;
   wherein the pivotable conveyor assembly section includes:
      a bracket having at least a top surface and side surface, wherein the top surface of the bracket supports a pivotable conveyor panel, and the side surface is attached to at least one second slideout assembly which includes at least one movable bar that moves with respect to the cargo area between the first use position and the first stowed position;
      a bearing member attached to a rod which is attached to the bracket, wherein the bearing member is movable along a floor of the cargo area, and wherein the bearing member and rod support the bracket;
      wherein the pivotable conveyor panel is pivotable with respect to the bracket to move the pivotable conveyor panel between a second use position and a second stowed position, wherein the second use position locates at least a portion of the pivotable conveyor panel exterior of the cargo area and the second stowed position locates the pivotable conveyor panel interior of the cargo area;
      a ramp that is pivotally attached, and linearly slidable, relative to the pivotable conveyor panel;
      at least one piston assembly attached to the pivotable conveyor panel at a first end and the bracket at a second end, wherein the at least one piston assembly limits a velocity at which the pivotable conveyor panel moves to the second use position; and
      a support member that includes at least one extension bar that is pivotally attached to the pivotable conveyor panel and is selectively engageable with a portion of the cargo area to support the pivotable conveyor panel when located in the second use position.

2. The vehicle of claim 1, wherein the at least one first slideout assembly further includes at least a second bar telescopingly engageable with the at least one movable bar that moves with respect to the cargo area between the first use position and the first stowed position.

3. The vehicle of claim 1, wherein each of the plurality of roller bearing assemblies includes an axle supported by the frame and a plurality of roller bearings supported on the axle.

4. The vehicle of claim 1, wherein each of the plurality of roller bearing assemblies include at least one axle supported at each end by at least one roller bracket, wherein the at least one roller bracket is supported by the one of the plurality of conveyor shelf panels, and wherein at least one roller bearing is supported by the axle.

5. The vehicle of claim 4, wherein the at least one roller bracket is attached to an underside of the support surface, wherein the at least one roller bracket supports the axle at the underside of the support surface, wherein the support surface includes an opening disposed therethrough, and wherein at least a portion of the at least one roller bearing supported by the axle extends through the opening to a topside of the support surface opposite the underside of the support surface.

6. The vehicle of claim 1, wherein each of the plurality of conveyor shelf panels are independently movable adjacent a wall of the cargo area to the first stowed position and away from the wall of the cargo area to the first use position.

7. The vehicle of claim 1, wherein the pivotable conveyor panel is pivotable with respect to the bracket to move the pivotable conveyor panel between the second use position that forms a linear pathway with at least one of the plurality of conveyor shelf panels, and the second stowed position that orients the pivotable conveyor panel transverse to the at least one of the plurality of conveyor shelf panels and no longer locates any portion of the pivotable conveyor panel exterior of the cargo area.

8. The vehicle of claim 7, wherein the bracket is movable adjacent a wall of the cargo area to the first stowed position and away from the wall of the cargo area to the first use position.

9. The vehicle of claim 1, wherein the bearing member attached to the rod is selected from the group consisting of at least one of a castor, a wheel, and a bearing surface.

10. The vehicle of claim 1, further comprising a ramp extender having a surface located adjacent the ramp and movable relative to the ramp.

11. The vehicle of claim 10, wherein the ramp includes at least one sidewall that includes a slot sized to fit at least one fastener that selectively loosens and tightens to selectively allow the ramp extender to move or hold with respect to the ramp.

12. The vehicle of claim 10, wherein the ramp extender further comprises at least one magnet to selectively hold the ramp extender to a structure spaced apart from the cargo area.

13. The vehicle of claim 1, wherein the support member includes a plurality of extension bars that are pivotally attached to the pivotable conveyor panel and are selectively engageable with a portion of the cargo area to support the pivotable conveyor panel when located in the second use position.

14. The vehicle of claim 1, wherein the pivotable conveyor panel is pivotable with respect to the bracket to move the pivotable conveyor panel to the second use position that forms a linear pathway with at least one of the plurality of conveyor shelf panels when the at least one of the plurality of conveyor shelf panels is located in its first use position.

15. A vehicle having a cargo area and a cab area, wherein the cargo area includes a conveyor assembly, the conveyor assembly comprises:
a conveyor assembly section and a pivotable conveyor assembly section;
wherein the conveyor assembly section includes:
at least one conveyor shelf panel which includes a support surface, wherein the support surface is supported by at least one movable bar that moves with respect to the cargo area between a first use position and a first stowed position;
wherein the at least one conveyor shelf panel is movable adjacent to the pivotable conveyor assembly section;
wherein the pivotable conveyor assembly section includes:
a bracket that supports a pivotable conveyor panel;
a second at least one movable bar that moves the bracket with respect to the cargo area between the first use position and the first stowed position; and
a bearing member attached to a rod which is attached to the bracket, wherein the bearing member is movable along a floor of the cargo area, and wherein the bearing member and rod supports the bracket.

16. The vehicle of claim 15, wherein the pivotable conveyor panel is pivotable with respect to the bracket to move the pivotable conveyor panel between a second use position and a second stowed position, wherein the second use position locates at least a portion of the pivotable conveyor panel exterior of the cargo area and the second stowed position locates the pivotable conveyor panel interior of the cargo area.

17. A vehicle having a cargo area and a cab area, wherein the cargo area includes a conveyor assembly, the conveyor assembly comprises:
a conveyor assembly section and a pivotable conveyor assembly section;
wherein the conveyor assembly section includes:
at least one conveyor shelf panel which includes a support surface, wherein the support surface is supported by at least one movable bar that moves with respect to the cargo area between a first use position and a first stowed position;
wherein the at least one conveyor shelf panel is movable adjacent to the pivotable conveyor assembly section;
wherein the pivotable conveyor assembly section includes:
a bracket that supports a pivotable conveyor panel;
a second at least one movable bar that moves the bracket with respect to the cargo area between the first use position and the first stowed position; and
a ramp that is pivotally attached, and linearly slidable, relative to the pivotable conveyor panel.

18. A vehicle having a cargo area and a cab area, wherein the cargo area includes a conveyor assembly, the conveyor assembly comprises:
a conveyor assembly section and a pivotable conveyor assembly section;
wherein the conveyor assembly section includes:
at least one conveyor shelf panel which includes a support surface, wherein the support surface is supported by at least one movable bar that moves with respect to the cargo area between a first use position and a first stowed position;
wherein the at least one conveyor shelf panel is movable adjacent to the pivotable conveyor assembly section;

wherein the pivotable conveyor assembly section includes:
a bracket that supports a pivotable conveyor panel;
a second at least one movable bar that moves the bracket with respect to the cargo area between the first use position and the first stowed position; and
at least one piston assembly attached to the pivotable conveyor panel at a first end and the bracket at a second end, wherein the at least one piston assembly limits a velocity at which the pivotable conveyor panel moves to the second use position.

\* \* \* \* \*